(12) United States Patent
Hunstable et al.

(10) Patent No.: US 12,341,393 B2
(45) Date of Patent: Jun. 24, 2025

(54) SYSTEM FOR AN ELECTRICAL MOTOR WITH A SEGMENTED ROTOR AND A SEGMENTED STATOR

(71) Applicant: Linear Labs, Inc., Granbury, TX (US)

(72) Inventors: Fred Eugene Hunstable, Granbury, TX (US); Cessar Aguirre, Granbury, TX (US); Erik Hatch, Frisco, TX (US)

(73) Assignee: Linear Labs, Inc., Granbury, TX (US)

( * ) Notice: Subject to any disclaimer, the term of this patent is extended or adjusted under 35 U.S.C. 154(b) by 0 days.

(21) Appl. No.: 18/949,817

(22) Filed: Nov. 15, 2024

(65) Prior Publication Data

US 2025/0079927 A1    Mar. 6, 2025

Related U.S. Application Data

(63) Continuation-in-part of application No. 18/913,841, filed on Oct. 11, 2024, and a continuation-in-part of
(Continued)

(51) Int. Cl.
| | |
|---|---|
| H02K 3/50 | (2006.01) |
| H02K 1/278 | (2022.01) |
| H02K 1/30 | (2006.01) |
| H02K 3/04 | (2006.01) |
| H02K 3/28 | (2006.01) |
| H02K 5/22 | (2006.01) |
| H02K 21/14 | (2006.01) |

(52) U.S. Cl.
CPC .............. *H02K 3/50* (2013.01); *H02K 1/278* (2013.01); *H02K 1/30* (2013.01); *H02K 3/04* (2013.01); *H02K 3/28* (2013.01); *H02K 5/225* (2013.01); *H02K 21/14* (2013.01)

(58) Field of Classification Search
CPC ............ H02K 1/18; H02K 1/02; H02K 1/146; H02K 15/0062; H02K 1/27; H02K 11/30; H02K 21/12; H02K 21/145; H02K 15/095; H02K 3/522; H02K 11/33; H02K 16/02; H02K 3/47
See application file for complete search history.

(56) References Cited

U.S. PATENT DOCUMENTS 6,891,306 B1 *   5/2005   Soghomonian ..........  H02K 1/27
                                                  310/266
2008/0278020 A1 * 11/2008 Ley ...................... H02K 21/222
                                                  310/156.01

* cited by examiner

*Primary Examiner* — Leda T Pham
(74) *Attorney, Agent, or Firm* — Run8 Patent Group, LLC; Peter Miller; Alexander Rodriguez

(57) ABSTRACT

A system includes: a segmented rotor assembly; magnetic elements; and a stator. The segmented rotor assembly includes a set of pole pieces arranged radially about an axis. Each pole piece defines: a rim extending about a periphery of the pole piece; a first recess arranged on a first side of the pole piece; and a second recess arranged on a second side, opposite the first side, of the pole piece. Each pair of adjacent pole pieces, in the segmented rotor assembly, defines a pair of linearly-offset and angularly-offset rims that cooperate to define a tapered annular interstice in a radial array of tapered annular interstices. Each magnetic element is nested within a tapered annular interstice in the radial array of tapered annular interstices. The stator: encompasses the segmented rotor assembly; and includes windings configured to inductively couple to the magnetic elements to rotate the segmented rotor assembly about the axis.

11 Claims, 25 Drawing Sheets

Related U.S. Application Data application No. 18/782,955, filed on Jul. 24, 2024, and a continuation-in-part of application No. 18/652,712, filed on May 1, 2024, and a continuation-in-part of application No. 18/628,593, filed on Apr. 5, 2024, said application No. 18/782,955 is a continuation of application No. 18/099,115, filed on Jan. 19, 2023, now Pat. No. 12,081,090, said application No. 18/913,841 is a continuation of application No. 18/086,508, filed on Dec. 21, 2022, now Pat. No. 12,149,141, which is a continuation-in-part of application No. 17/979,615, filed on Nov. 2, 2022, now Pat. No. 11,784,529, said application No. 18/652,712 is a continuation of application No. 17/962,076, filed on Oct. 7, 2022, now Pat. No. 12,009,717, said application No. 18/099,115 is a continuation of application No. 17/831,337, filed on Jun. 2, 2022, now Pat. No. 11,588,366, said application No. 18/628,593 is a continuation of application No. 17/412,043, filed on Aug. 25, 2021, now abandoned, said application No. 17/979,615 is a continuation of application No. 17/003,855, filed on Aug. 26, 2020, now Pat. No. 11,532,963, said application No. 17/962,076 is a continuation of application No. 17/003,905, filed on Aug. 26, 2020, now Pat. No. 11,502,570.

(60) Provisional application No. 63/599,916, filed on Nov. 16, 2023, provisional application No. 63/252,868, filed on Oct. 6, 2021, provisional application No. 63/195,764, filed on Jun. 2, 2021, provisional application No. 63/199,097, filed on Dec. 7, 2020, provisional application No. 62/989,653, filed on Mar. 14, 2020, provisional application No. 62/958,213, filed on Jan. 7, 2020, provisional application No. 62/942,736, filed on Dec. 2, 2019, provisional application No. 62/902,961, filed on Sep. 19, 2019, provisional application No. 62/895,498, filed on Sep. 4, 2019, provisional application No. 62/895,481, filed on Sep. 3, 2019, provisional application No. 62/891,949, filed on Aug. 26, 2019.

SYSTEM FOR AN ELECTRICAL MOTOR WITH A SEGMENTED ROTOR AND A SEGMENTED STATOR

CROSS-REFERENCE TO RELATED APPLICATIONS

This Application claims the benefit of U.S. Provisional Application No. 63/599,916, filed on 16 Nov. 2023, which is hereby incorporated in its entirety by this reference.

This Application is a continuation-in-part application of U.S. Non-Provisional application Ser. No. 18/782,955, filed on 24 Jul. 2024, which is a continuation of U.S. Non-Provisional application Ser. No. 18/099,115, 19 Jan. 2023, which is a continuation of U.S. Non-Provisional application Ser. No. 17/831,337, filed on 2 Jun. 2022, which claims the benefit of U.S. Provisional Application Nos. 63/195,764, filed on 2 Jun. 2021, and 63/252,868, filed on 6 Oct. 2021, each of which is hereby incorporated in its entirety by this reference.

This Application is a continuation-in-part application of U.S. Non-Provisional application Ser. No. 18/913,841, filed on 11 Oct. 2024, which is continuation of U.S. patent application Ser. No. 18/086,508, filed on 21 Dec. 2022, which is a continuation-in-part of U.S. Non-Provisional application Ser. No. 17/979,615, filed on 2 Nov. 2022, which is a continuation of U.S. Non-Provisional application Ser. No. 17/003,855, filed on 26 Aug. 2020, each of which is hereby incorporated in its entirety by this reference.

U.S. Non-Provisional application Ser. No. 17/003,855 claims the priority and benefit of the filing date of the following U.S. Provisional Application Nos. 62/902,961, filed on 19 Sep. 2019; 62/942,736, filed on 2 Dec. 2019; 62/958,213, filed on 7 Jan. 2020; 62/989,653, filed on 14 Mar. 2020; 62/891,949, filed on 26 Aug. 2019; 62/895,481, filed on 3 Sep. 2019; and 62/895,498, filed on 4 Sep. 2019, each of which is hereby incorporated in its entirety by this reference.

This Application is also a continuation-in-part of U.S. Non-Provisional application Ser. No. 18/652,712, filed on 1 May 2024, which is a continuation of U.S. Non-Provisional application Ser. No. 17/962,076, filed on 7 Oct. 2022, which is a continuation of U.S. Non-Provisional application Ser. No. 17/003,905, filed on 26 Aug. 2020, which claims the benefit of U.S. Provisional Application Nos. 62/902,961, filed on 19 Sep. 2019, 62/942,736, filed on 2 Dec. 2019, 62/958,213, filed on 7 Jan. 2020, 62/989,653, filed on 14 Mar. 2020, 62/891,949, filed on 26 Aug. 2019, 62/895,481, filed on 3 Sep. 2019, 62/895,498, filed on 4 Sep. 2019, each of which is hereby incorporated in its entirety by this reference.

This Application is also a continuation-in-part of U.S. Non-Provisional application Ser. No. 18/628,593, filed 5 Apr. 2024, which is a continuation of U.S. Non-Provisional application Ser. No. 17/412,043, filed on 25 Aug. 2021, which claims the benefit of U.S. Provisional Application No. 63/199,097, filed 7 Dec. 2020, each of which is hereby incorporated in its entirety by this reference.

TECHNICAL FIELD

This invention relates generally to the field of electric motors and more specifically to a new and useful first system for an electric motor with a segmented rotor 130 and a segmented stator 110 in the field of electric motors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First System: Embedded Winding Motor

Figure 1:
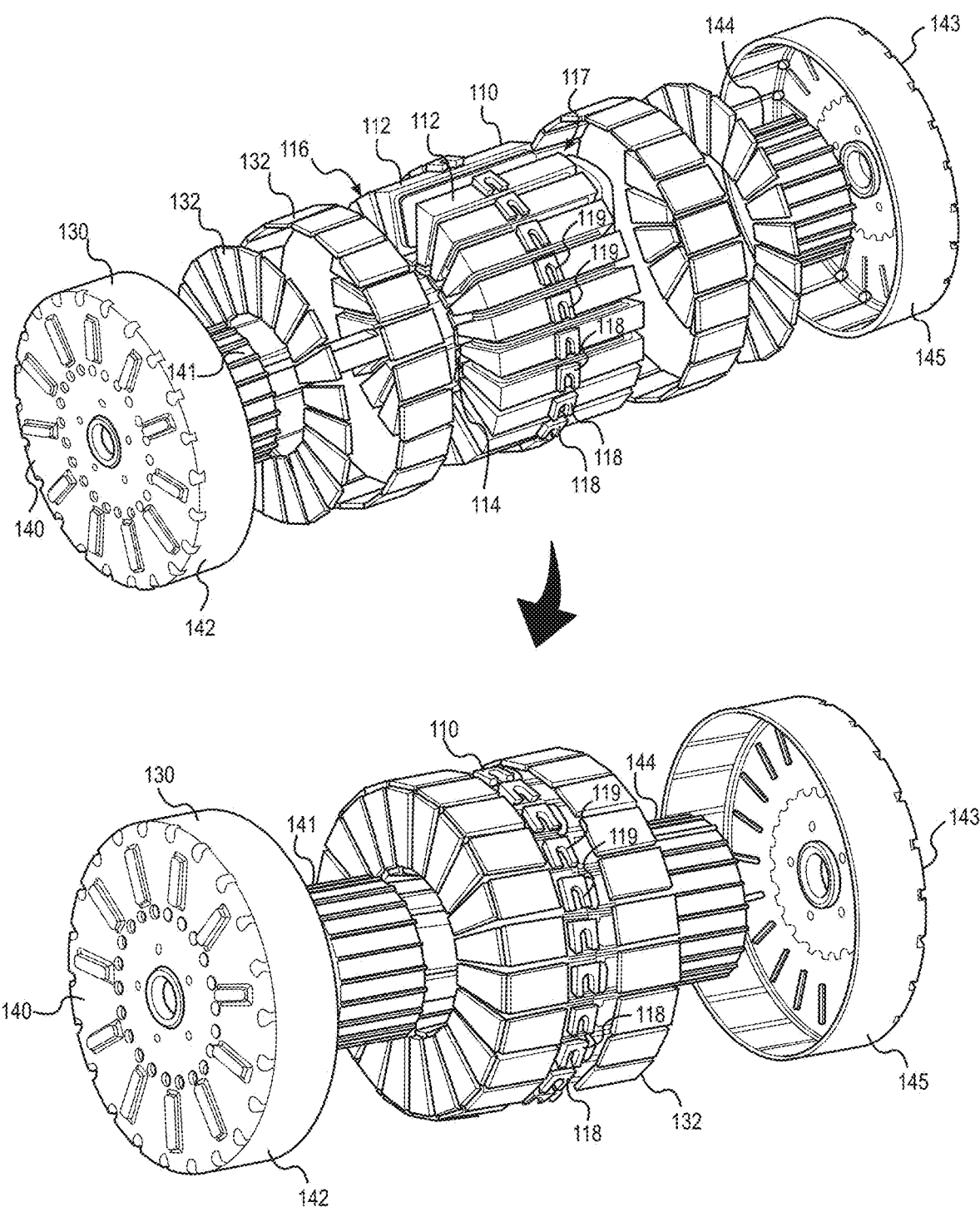
FIG. 1 is a schematic representation of a first system.
Figure 2:
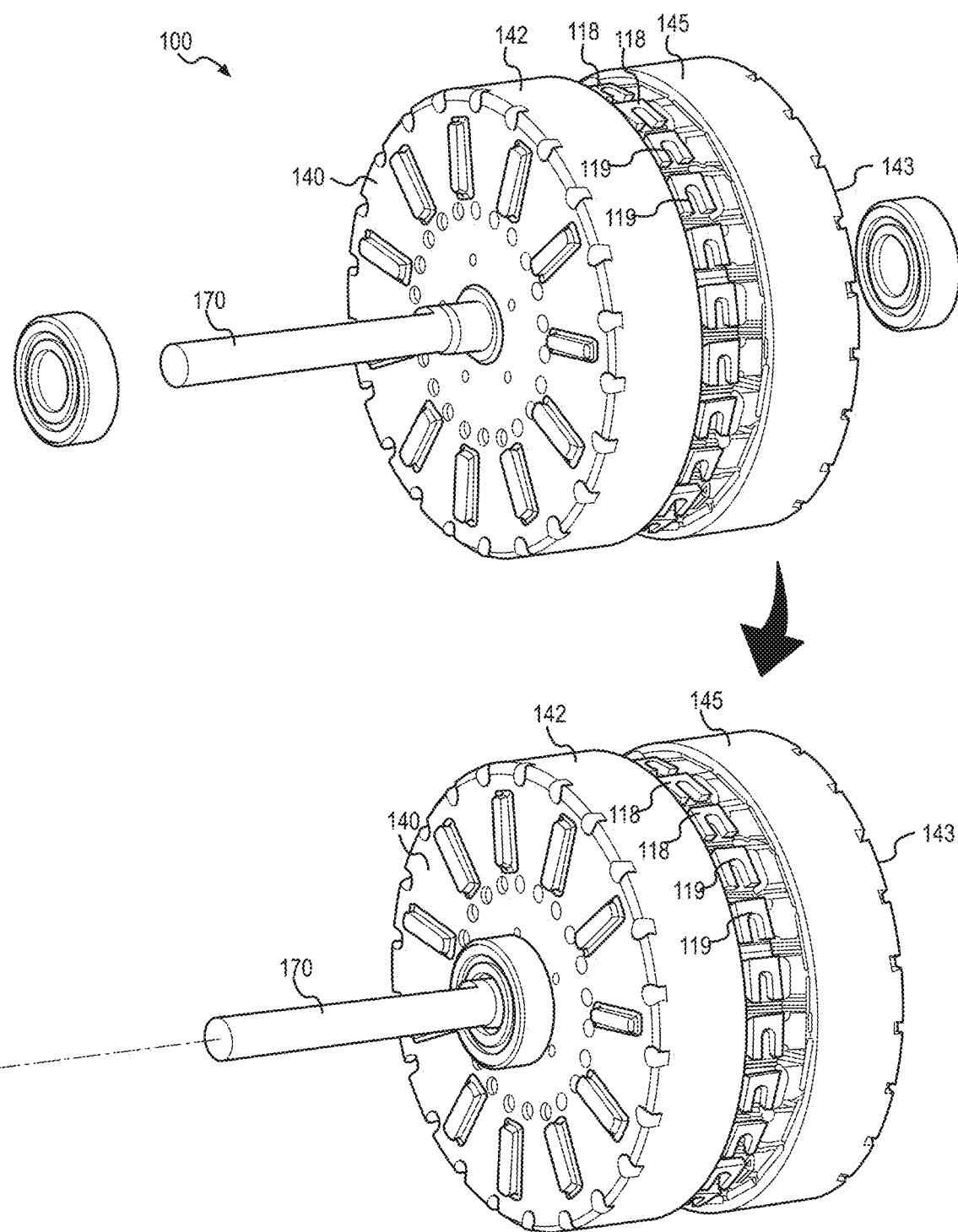
FIG. 2 is a schematic representation of the first system.
Figure 3:
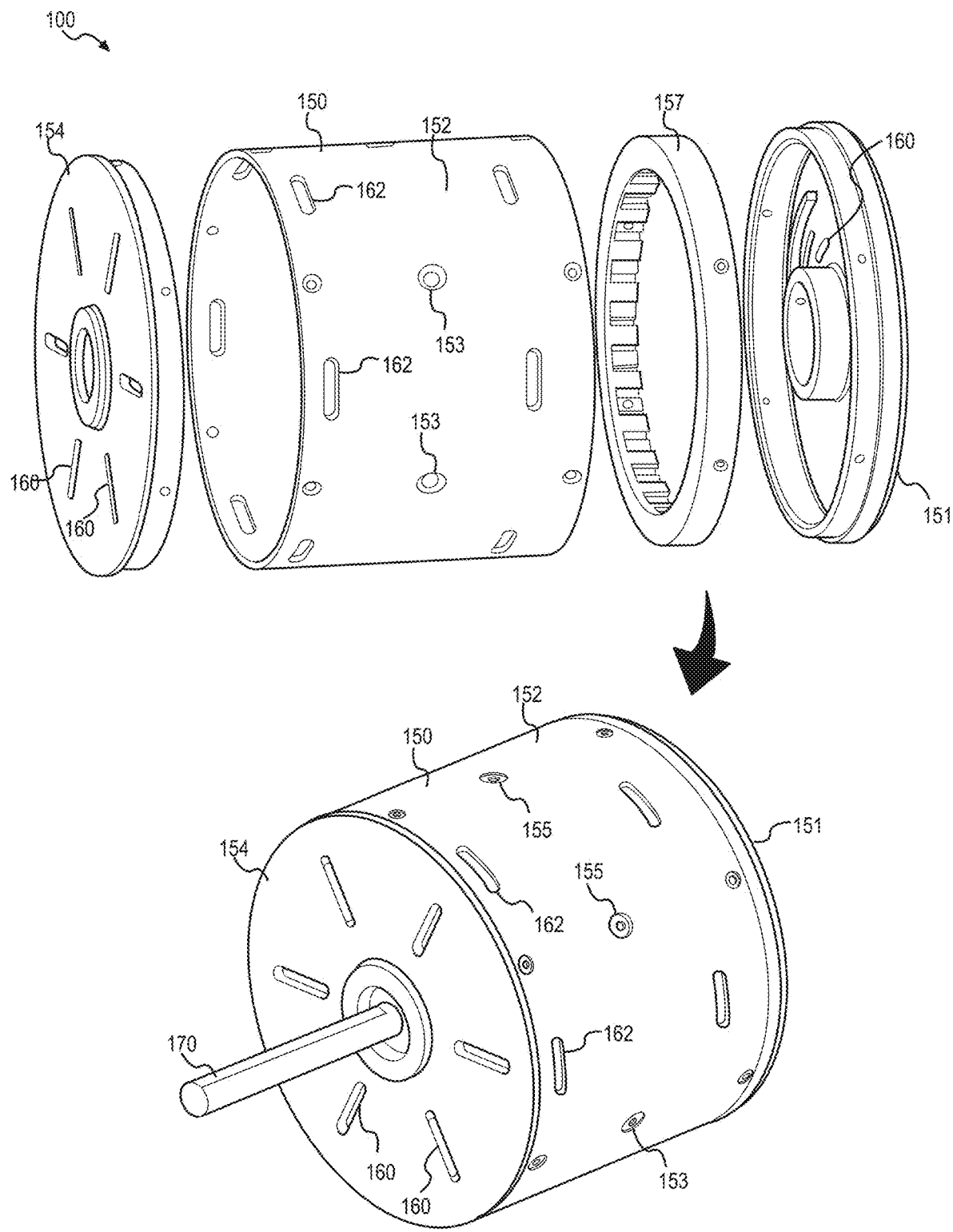
FIG. 3 is a schematic representation of the first system.
Figure 4:
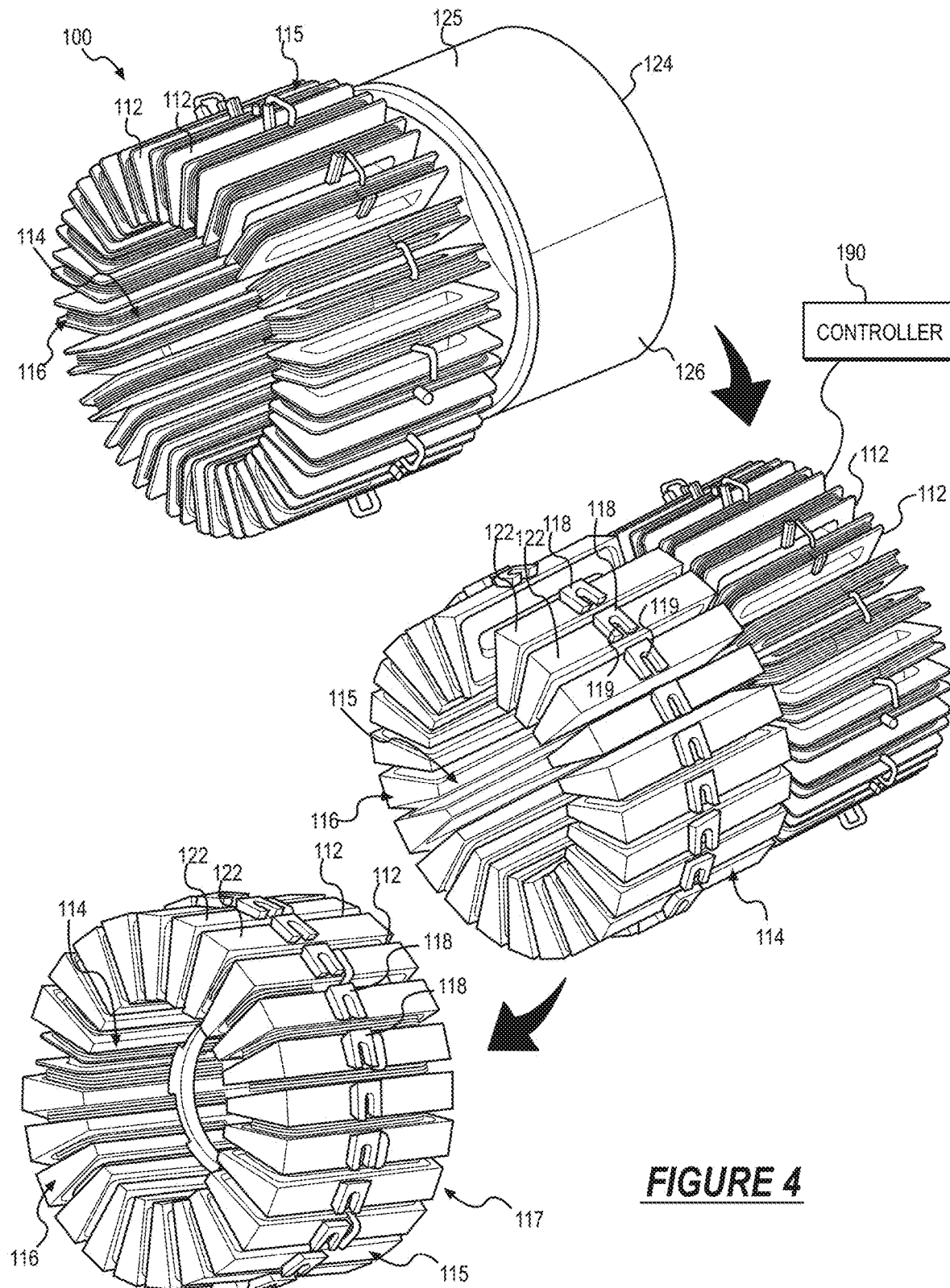
FIG. 4 is a schematic representation of the first system.
Figure 5:
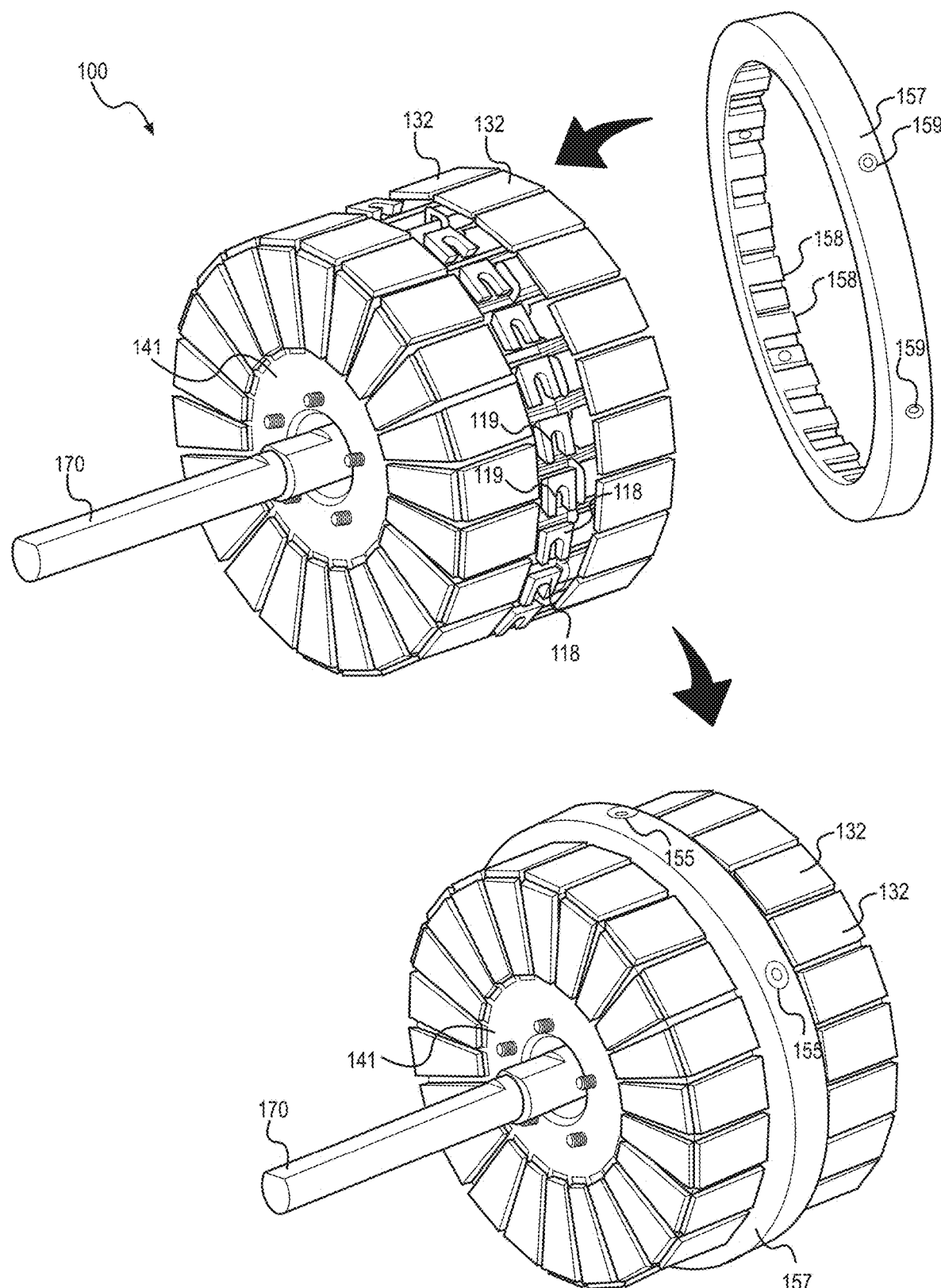
FIG. 5 is a schematic representation of the first system.
Figure 6:
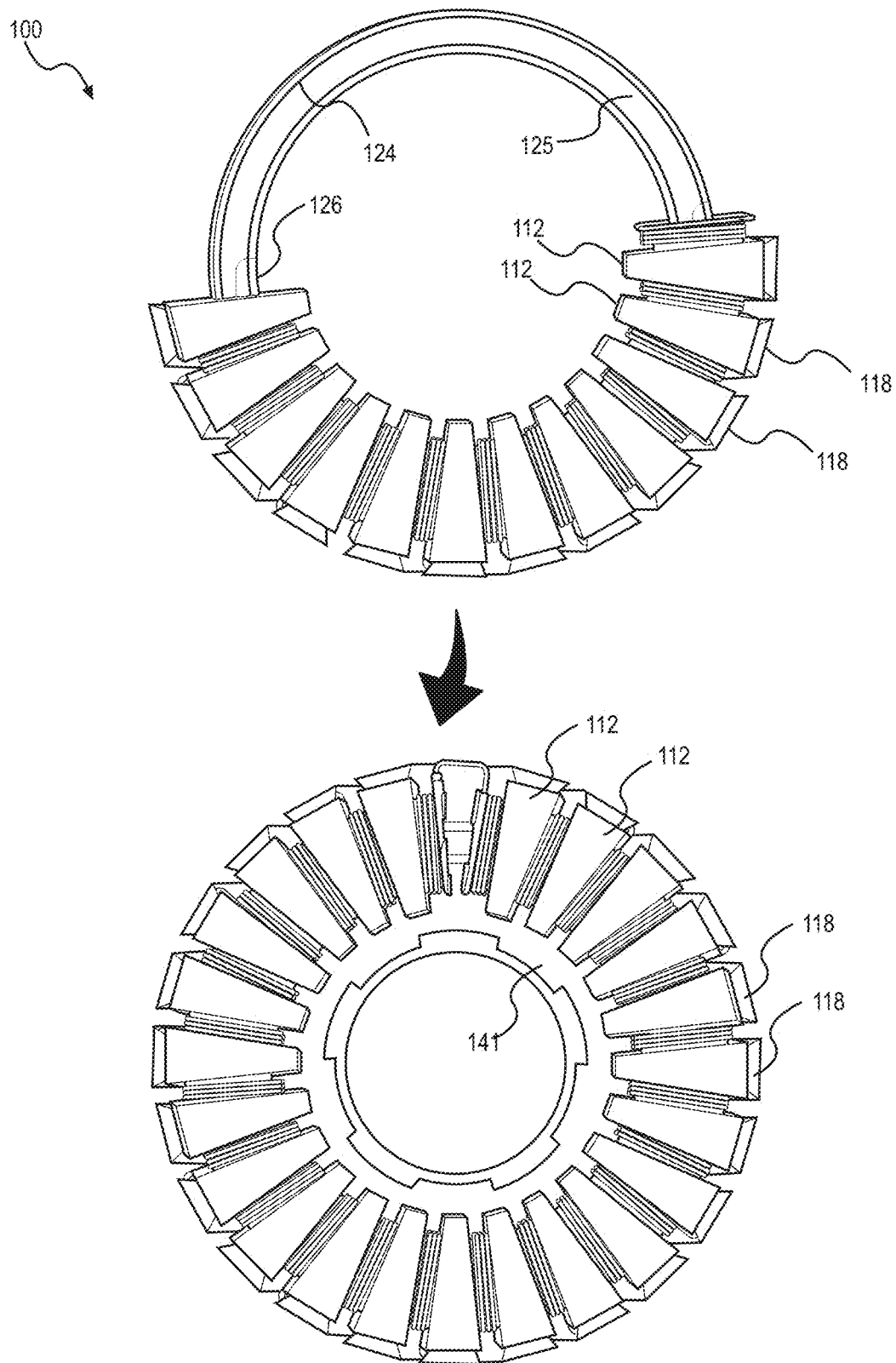
FIG. 6 is a schematic representation of the first system.
Figure 7A:
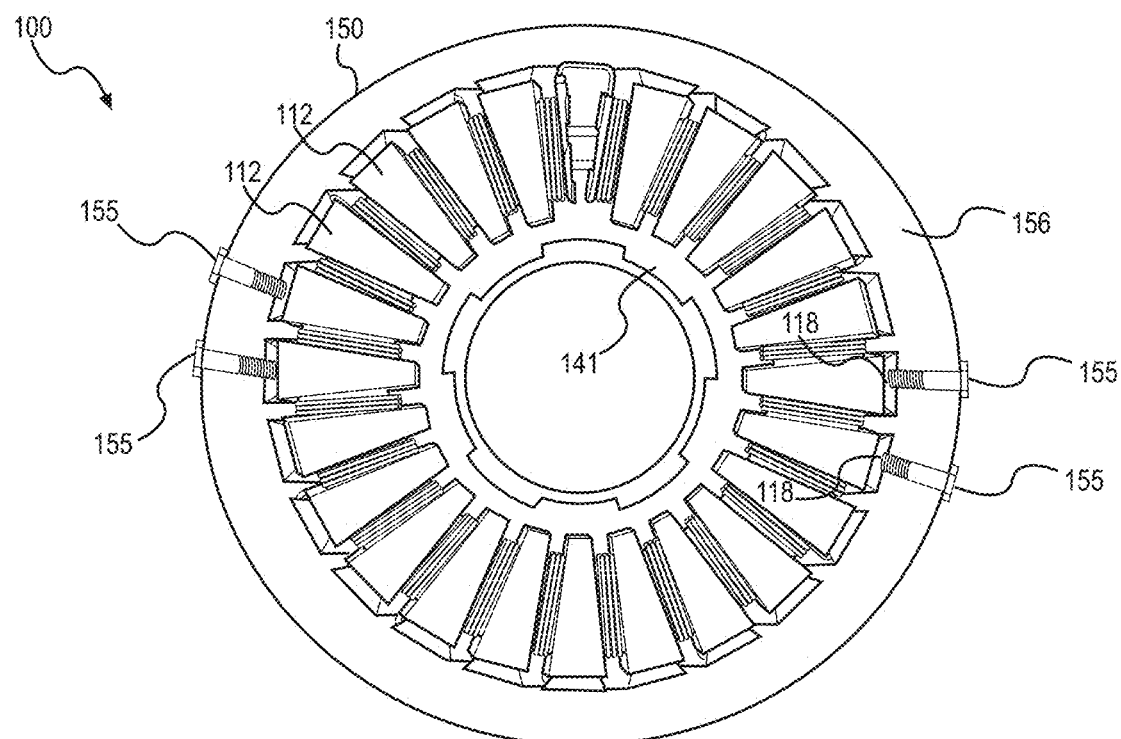
FIGS. 7A and 7B are schematic representations of the first system.
Figure 7B:
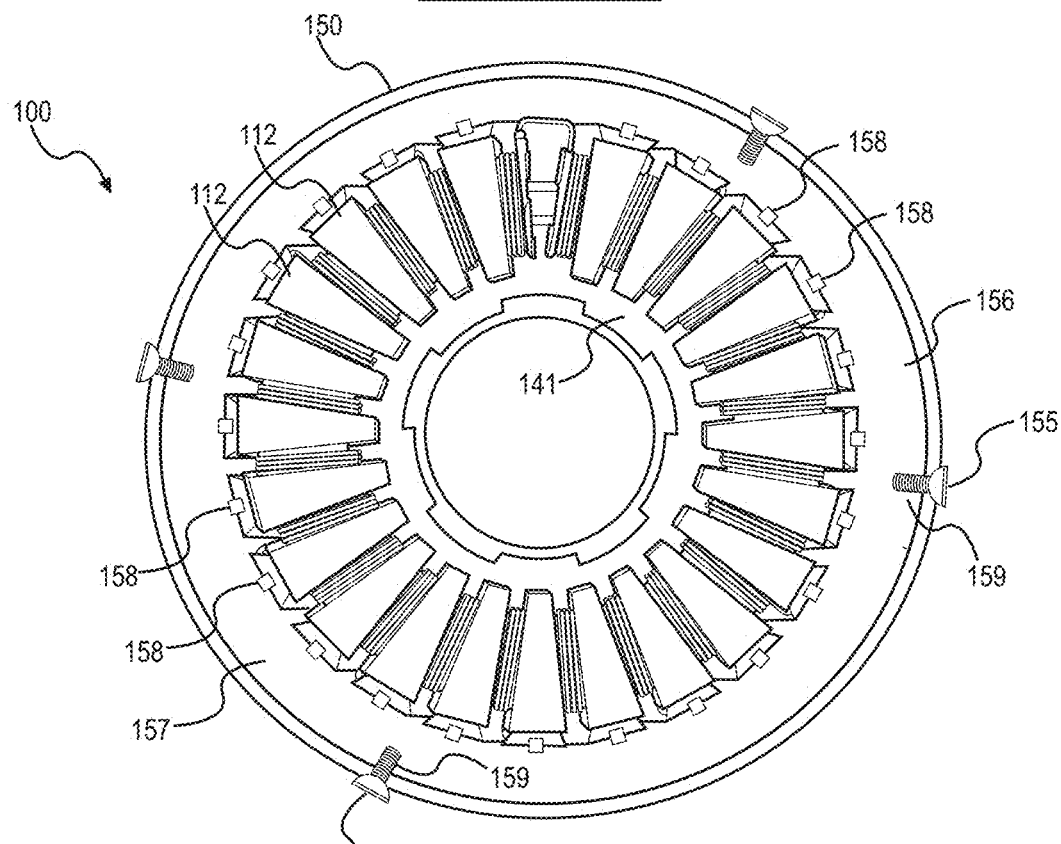
Figure 8:
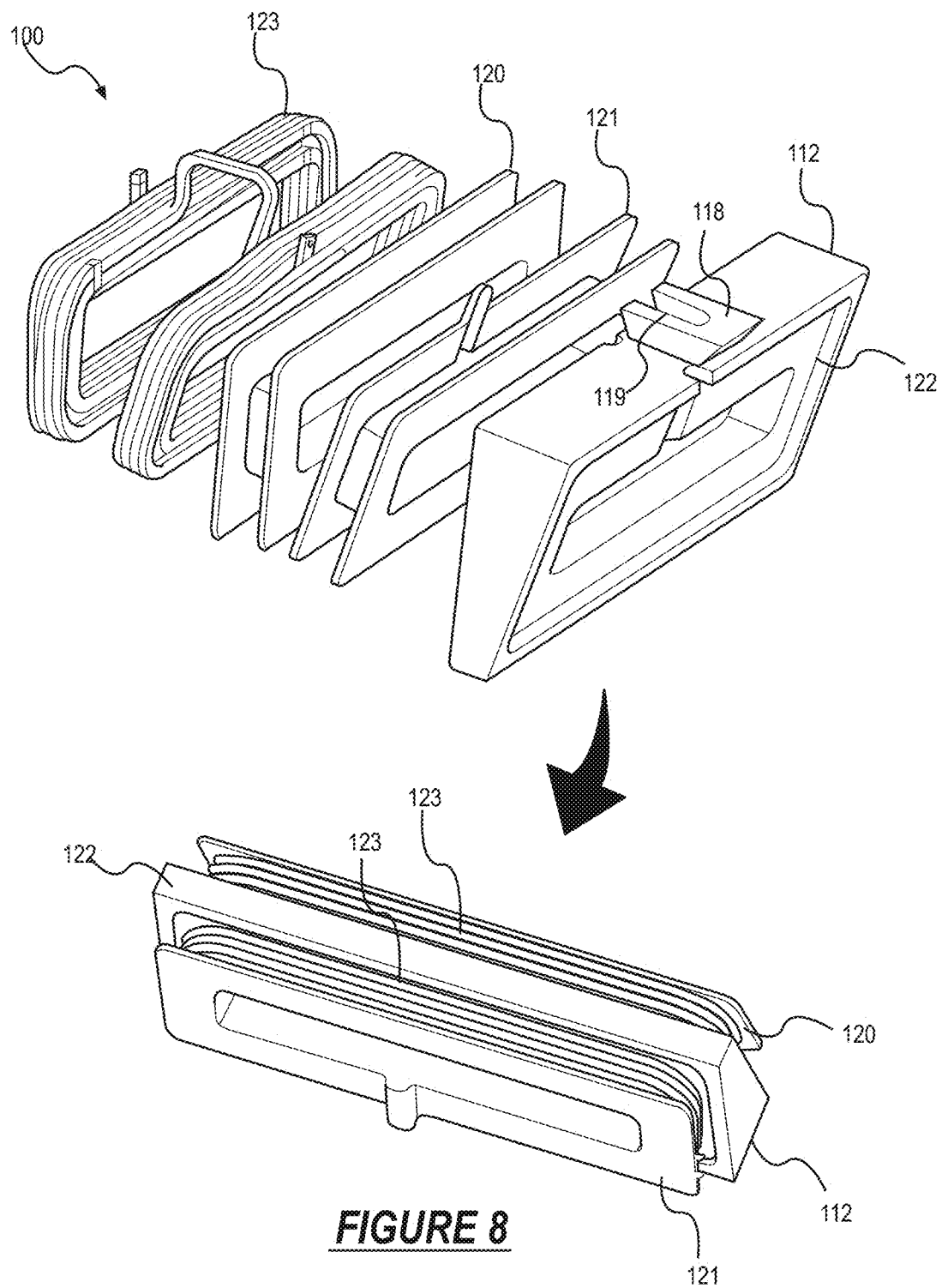
FIG. 8 is a schematic representation of the first system.
Figure 9:
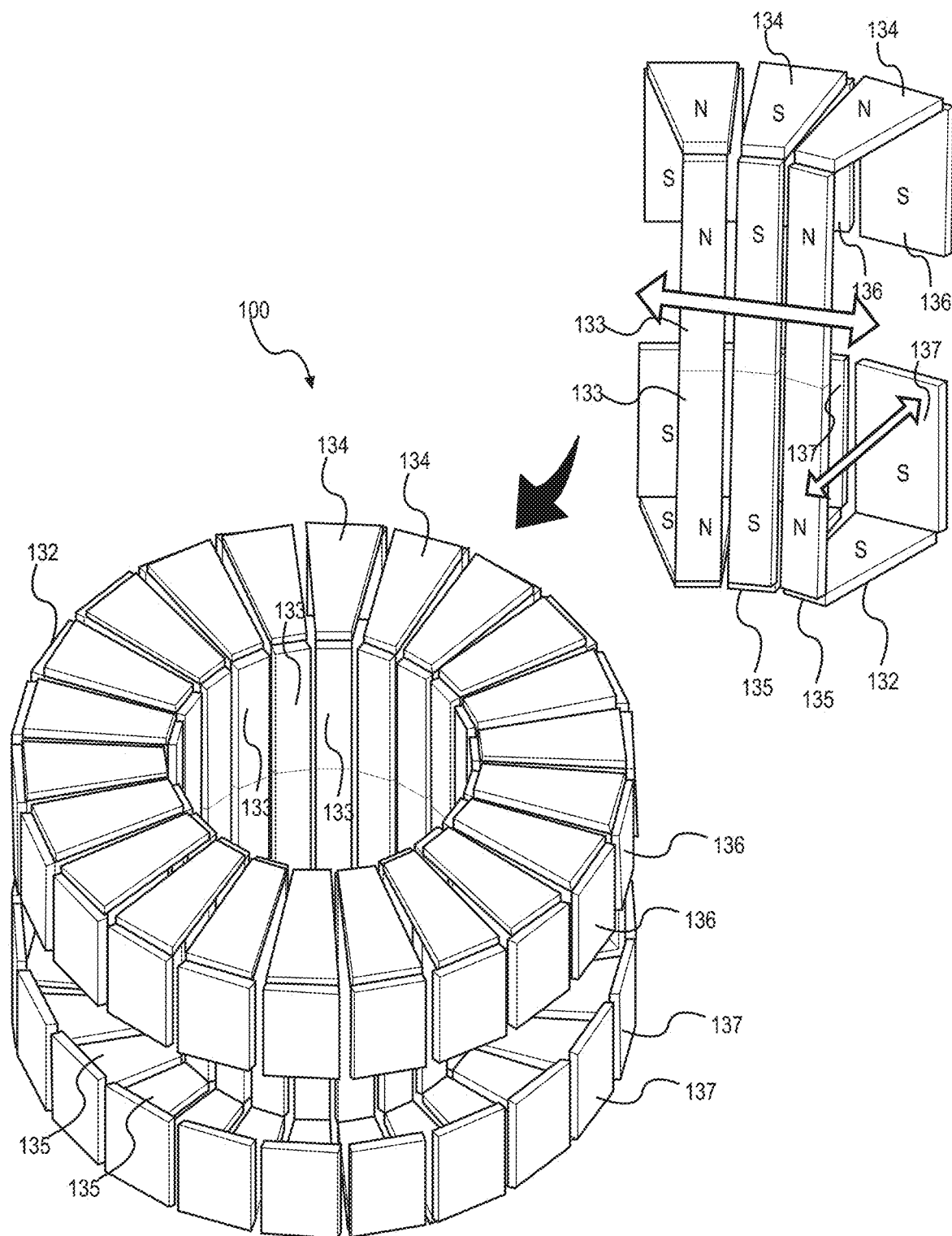
FIG. 9 is a schematic representation of the first system.
Figure 10:
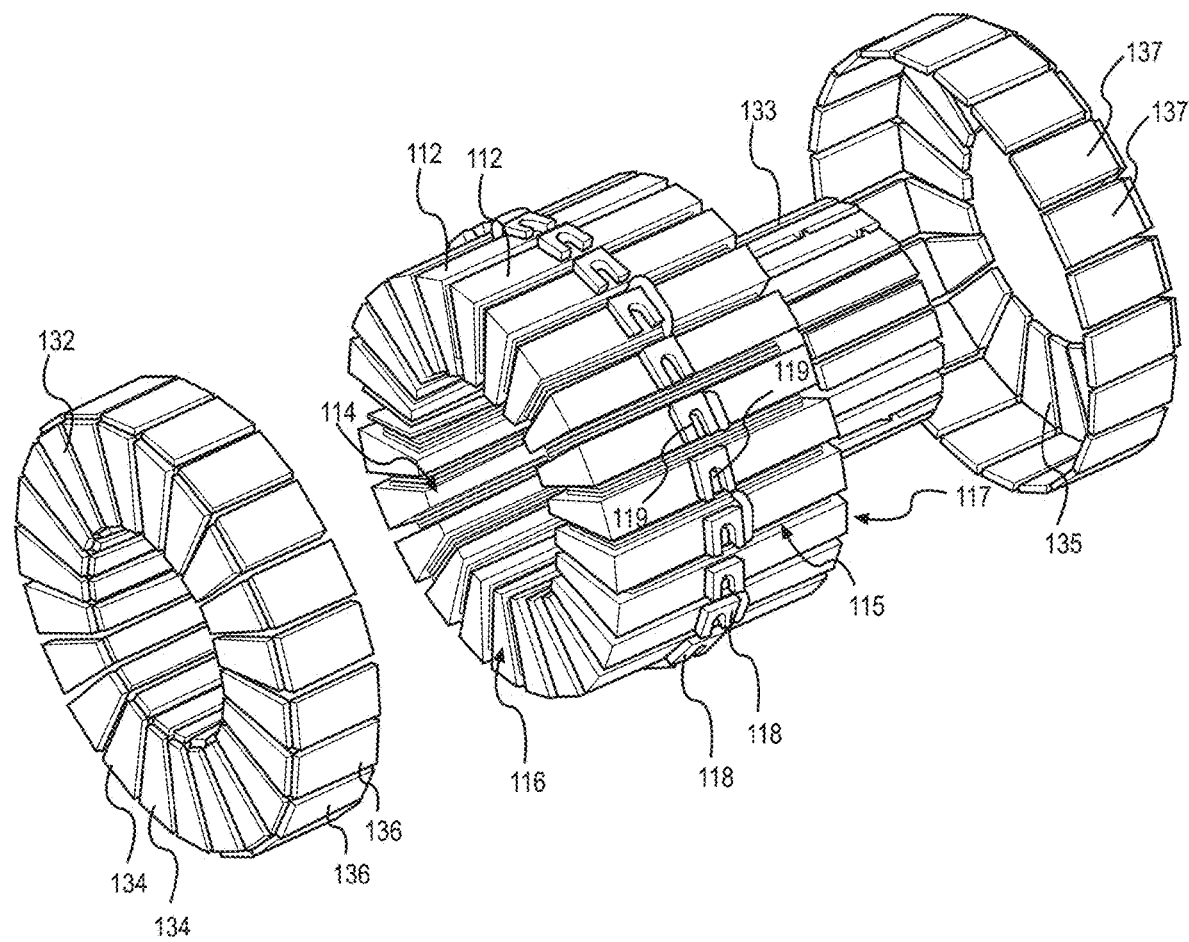
FIG. 10 is a schematic representation of the first system.

As shown in FIG. 1, a first system 100 for an electric motor includes: a stator 110; a rotor 130; a housing 150; and a controller 190. The stator 110 includes a set of coil assemblies (or "windings") 112: radially arranged about a motor axis 105; and defining an inner radial facet 114, an outer radial facet 115, a first axial facet 116, and a second axial facet 117 opposite the first axial facet 116. Additionally, each coil assembly in the set of coil assemblies 112 includes a receiving member 118 arranged at the outer radial facet 115 of the coil assembly.

Furthermore, the rotor 130 includes a set of magnetic elements 132: encompassing the inner radial facet 114, the outer radial facet 115, the first axial facet 116, and the second axial facet 117 of the set of coil assemblies 112; defining a radial magnetic tunnel about the motor axis 105; and configured to generate a flux density distribution focused toward the set of coil assemblies 112.

The housing 150: contains the stator 110 and the rotor 130; engages the receiving member 118 of each coil assembly, in the set of coil assemblies 112 to couple the housing 150 to the stator 110; and includes a shaft 170 coaxial with the motor axis 105 and coupled to the rotor 130.

The controller 190 is configured to drive current through the set of coil assemblies 112 to generate a toroidal magnetic field tunnel configured to sequentially and magnetically couple the set of magnetic elements 132 contained within the housing 150.

1.1 Segmented Stator Assembly

In one variation shown in FIGS. 1, 11, 12, and 13, the first system 100 includes: a segmented stator assembly 110; a set of windings 123; and a rotor 130.

The segmented stator assembly 110 includes a set of pole pieces 180 arranged radially about a motor axis 105. Each pole piece in the set of pole pieces 180 defines: a rim 181 extending about a periphery of the pole piece; a recess 182 arranged on a first side of the pole piece; and a shoulder 183 arranged on a second side, opposite the first side, of the pole piece. Additionally, each pair of adjacent pole pieces—in the segmented stator assembly 110—defines a pair of linearly-offset and angularly-offset rims that cooperate to define a tapered annular interstice in a radial array of tapered annular interstices.

Each winding in the set of windings 123 is arranged about a tapered annular interstice in the radial array of tapered annular interstices.

The rotor 130: encompasses the segmented stator assembly 110; and includes a set of magnetic elements 132 configured to magnetically couple to the set of windings 123 to rotate the rotor 130 about the motor axis 105.

1.2 Applications

Generally, the first system 100 can function as an electric motor for heating, ventilation, and air conditioning (hereinafter "HVAC") applications and includes a rotor 130 configured to direct magnetic fields across all surfaces of a stator 110 contained within the rotor 130. In particular, the stator 110 includes a set of coil assemblies 112 radially arranged about a motor axis 105 to define a cylindrical stator ring. Additionally, the rotor 130 includes a set of magnetic elements 132 arranged about axial facets and radial facets of the cylindrical stator ring, thereby encompassing the stator 110 within a magnetic flux tunnel. Furthermore, the first system 100 includes a housing 150: containing the rotor 130 and the stator 110; rigidly coupled to the set of coil assemblies 112 of the stator 110 contained within the housing 150; and including a shaft 170 coupled to the rotor 130. A controller 190 can then drive current (e.g., DC current, AC current) through the set of coil assemblies 112 in order to generate magnetic fields to then induce magnetic flux linkage between the rotor 130 and the stator 110 across all facets (i.e., axial facets and radial facets) of the rotor 130, thereby enabling the rotor 130 to rotate freely (e.g., at 1500 rpms) within the housing 150. Thus, the first system 100 defines a rigid outer housing 150 and can therefore be easily integrated into existing HVAC first system 100s with minimal dismantling of the existing HVAC first system 100.

In one example, each coil assembly in the set of coil assemblies 112 includes a receiving member 118 arranged at the outer radial facet 115 of the set of coil assemblies 112. In this example, the receiving member 118 can define a protrusion at the outer radial facet 115 and includes a threaded cavity 119 that faces an interior radial wall of the housing 150 containing the rotor 130 and the stator 110. Additionally, the set of magnetic elements 132 of the rotor 130 envelops the set of coil assemblies 112 to define a radial slot—about the outer radial facet 115 of the set of coil assemblies 112—that exposes the receiving member 118 of each coil assembly in the set of coil assemblies 112. The housing 150 can include: a base 151; a cylindrical body 152 extending from the base 151; and a cover 154 arranged opposite from the base 151 to define a cavity that contains the set of coil assemblies 112 and the set of magnetic elements 132 therein. Furthermore, the cylindrical body 152 can include a set of fastening members 155 arranged at an inner side of the cylindrical body 152 that: couple the receiving member 118 of each coil assembly in the set of coil assemblies 112; and defines an interstice 156 between the set of magnetic elements 132 enveloping the set of coil assemblies 112 and the inner side of the cylindrical body 152. Thus, the first system 100 can rigidly maintain the stator 110 and the housing 150 during rotation of the rotor 130—and thereby the shaft 170—within the housing 150.

In another example, the first system 100 further includes a coupling ring 157: interposed between the outer radial facet 115 of the set of coil assemblies 112 and the inner wall of the housing 150; and defining an interstice 156 between the set of magnetic elements 132 and the inner wall of the housing 150. In this example, the coupling ring 157 can include a set of fastening members 155 arranged within an inner radial side of the coupling ring 157; and mounted to the receiving member 118 of each coil assembly, in the set of coil assemblies 112, to rigidly couple the ring about the set of coil assemblies 112. Additionally, the housing 150 can include a set of apertures 153 arranged about the cylindrical body 152 of the housing 150 that are in alignment with a set of threaded cavities 159 arranged about the outer radial side of the coupling ring 157. The first system 100 can then further include a set of fastening members 155, received through the set of apertures 153 at the housing 150, and coupled to the set of threaded cavities 159 of the coupling ring 157, thereby rigidly mounting the housing 150 to the set of coil assemblies 112.

Therefore, the first system 100 can include a housing 150: containing a set of coil assemblies 112 and a set of magnetic elements 132 encompassing the set of coil assemblies 112; and mounted to the set of coil assemblies 112 to define an interstice 156 between the set of magnetic elements 132 and the inner wall of the housing 150, thereby enabling the rotor 130 to rotate freely within the housing 150 while simultaneously inducing magnetic flux linkage on all facets (i.e., radial facets, axial facets) on the set of coil assemblies 112.

1.2.1 Applications: Segmented Stator Assembly

Figure 11:
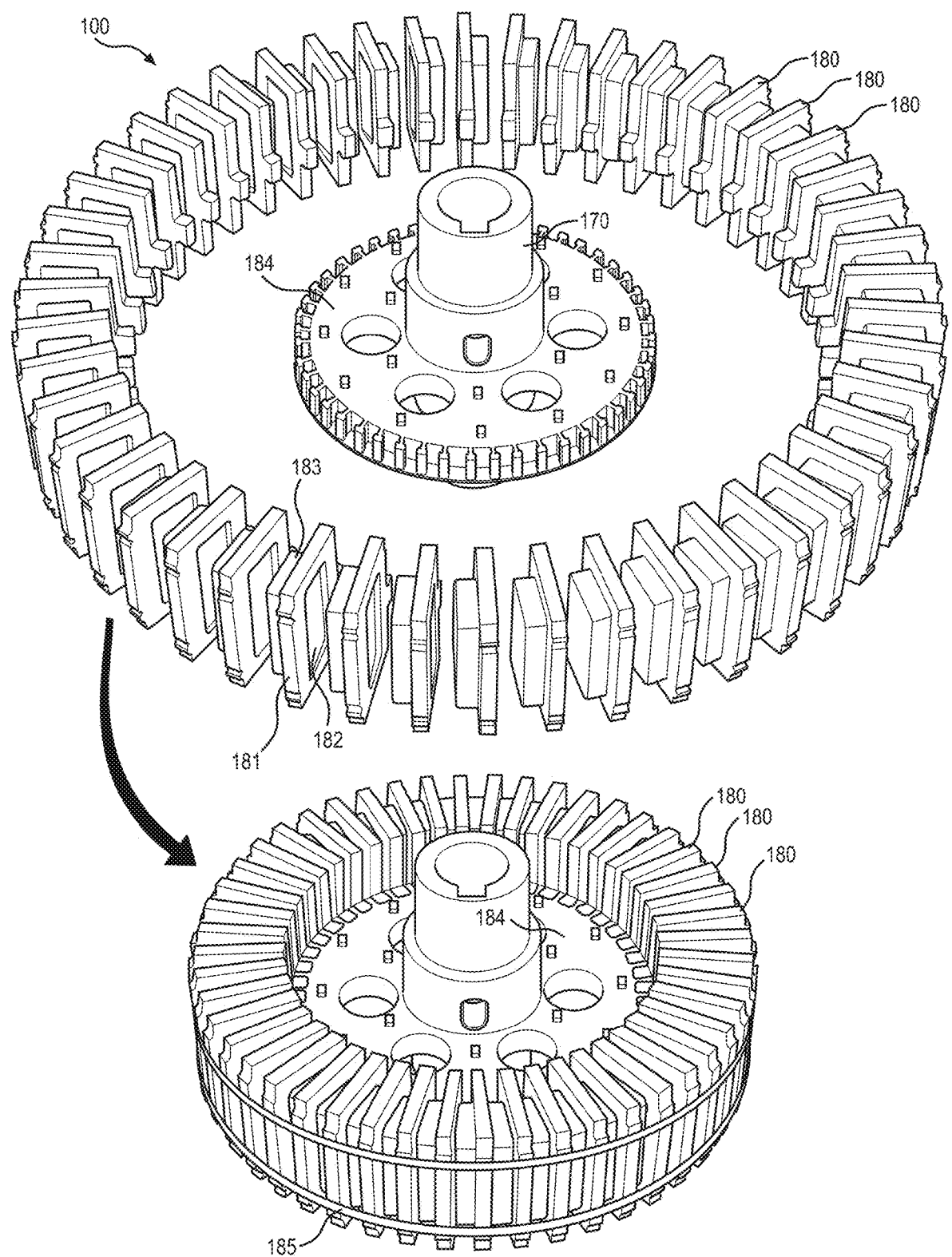
FIG. 11 is a schematic representation of the first system.
Figure 12:
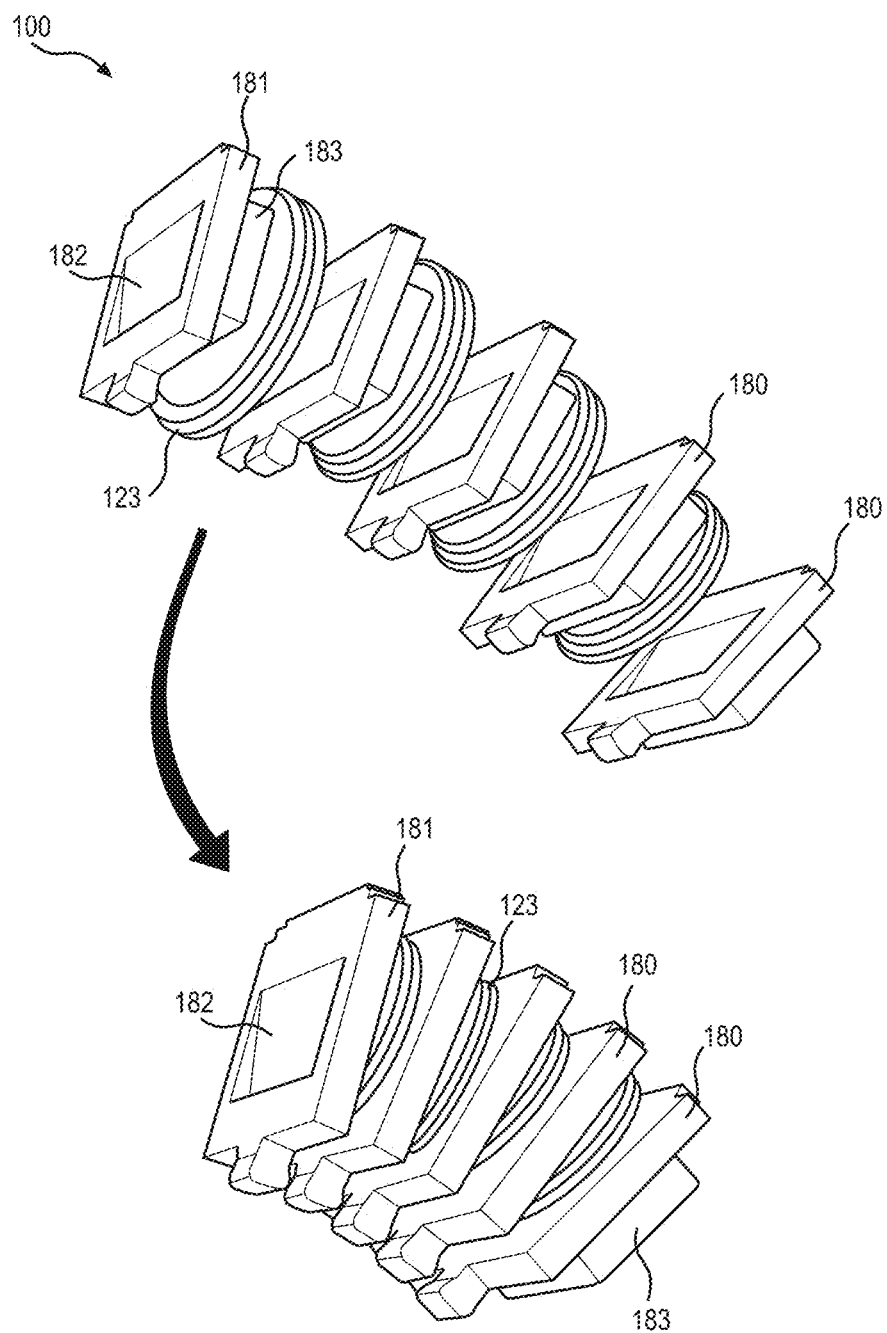
FIG. 12 is a schematic representation of the first system.
Figure 13:
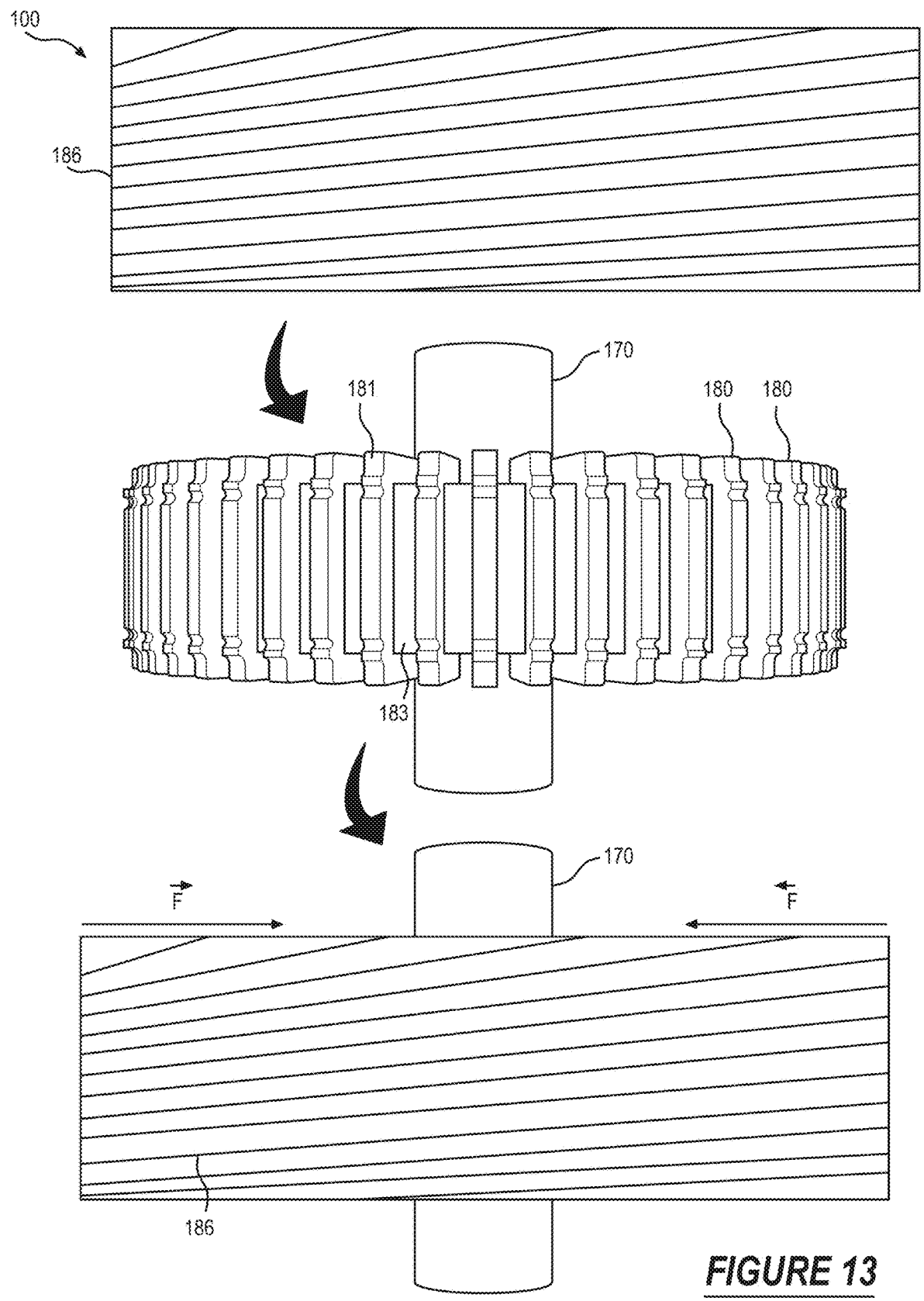
FIG. 13 is a schematic representation of the first system.

As shown in FIGS. 11, 12, and 13, the first system 100 includes: a segmented stator assembly 110; and a rotor 130 configured to direct magnetic fields across all surfaces of a segmented stator assembly 110 contained within the rotor 130. More specifically, the segmented stator assembly 110 includes a set of pole pieces 180 radially arranged about a motor axis 105 to define a yoke configured to exhibit reduced magnetic saturation across the set of pole pieces 180 and exhibit increased magnetic field strength during rotation of the rotor about the segmented stator assembly. Additionally, the rotor 130 includes a set of magnetic elements 132: arranged about axial facets and radial facets of the cylindrical stator yoke; and encompassing the stator 110 within a magnetic flux tunnel.

The set of pole pieces 180 are configured to assemble into a cylindrical stator yoke that defines a radial array of tapered annular interstices about the motor axis. Additionally, the first system 100 includes a set of coil windings: arranged at the radial array of tapered annular interstices; and connected to a controller 190 configured to sequentially drive current across the set of windings 123 in order to generate a sequential magnetic field about the set of pole pieces 180 across the cylindrical stator yoke that magnetically couple the set of magnetic elements 132 of the rotor 130. More specifically, each pole piece—in the segmented stator assembly 110—defines a unitary structure that includes: a rim 181 extending about a periphery of the pole piece; and a shoulder 183 extending from a first side of the pole piece and configured to couple within a recess 182 of an adjacent pole piece to form an arc segment (e.g., splayed H-bridge structure) of the cylindrical stator yoke.

In one example, the segmented stator assembly 110 includes a first pole piece defining: a first rim extending about a periphery of the pole piece; a first shoulder including a rectilinear geometry extending from the first side of the first pole piece; and a first recess defining a tapered geometry (e.g., trapezoid) inset from the second side of the pole piece. Additionally, the segmented stator assembly 110 includes a second pole piece arranged adjacent the first pole piece and defining: a second rim extending about a periphery of the second pole piece; and a second shoulder extending from a first side of the second pole piece and configured to partially nest within the first recess of the first pole piece, thereby forming a first arc segment (e.g., splayed H-bridge structure) defining an interstice 156 between the first pole piece and the second pole piece.

Accordingly, the first system 100 includes a coil winding: arranged about the interstice 156 between the first pole piece and the second pole piece; and electrically connected to a controller 190 (e.g., via a set of leads and/or a controller 190 module interface) configured to drive current through the coil winding in order to generate a toroidal magnetic field at the first pole piece and the second pole piece. The first system 100 can then repeat this structure across the segmented stator assembly 110 in order to form the cylindrical stator yoke including a set of pole pieces 180 and a set of coil windings interposed between the set of pole pieces 180 about the cylindrical stator yoke. For example, system can further include a retention ring defining a set of grooves configured to mate with retention features across the set of pole pieces to retain the set of pole pieces radially arranged about the motor axis.

Therefore, the first system 100 includes a set of pole pieces 180 configured to assemble into a cylindrical stator yoke that substantially eliminates air gaps between coil assemblies arranged about the yoke and the set of magnetic elements 132 about the rotor 130. Accordingly, the first system 100 can exhibit reduced magnetic saturation across the set of pole pieces 180 and exhibit increased magnetic field strength during rotation of the rotor about the segmented stator assembly.

Although the system 100 includes a segmented stator assembly 110 and a rotor 130, other variations of this system 100 can include a segmented stator 110 and/or segmented rotor 130. For example, rather than locating a winding 123 arranged within the tapered annular interstice, the system 100 can include a magnetic element 132 arranged within the tapered annular interstice to form a segmented rotor 130. In this example, the set of windings 123 can be arranged on a rotor core encompassing the segmented stator 110.

1.3 Stator

Generally, the first system 100 includes a stator 110 including: a set of coil assemblies 112 arranged in a radial pattern about a motor axis 105; and a stator yoke 124 supporting the set of coil assemblies 112 in the radial pattern about the motor axis 105. In particular, each coil assembly, in the set of coil assemblies 112 can include: a first bobbin 120 coupled to the stator yoke 124; a winding 123 wound about a winding 123 receiving slot of the first bobbin 120 and including a first set of leads; and a stator pole 122 arranged adjacent the first bobbin 120 at the stator pole 122 and formed of a ferrous material (e.g., steel, cast iron, wrought iron, aluminum, copper, lead). Each coil assembly is then coupled to the stator yoke 124 to form a cylindrical stator ring about the motor axis 105 that defines: an inner radial facet 114; an outer radial facet 115; a first axial facet 116; and a second axial facet 117 opposite the first axial facet 116. The first system 100 can further include a controller 190: connected to the first set of leads for each coil assembly 112, in the set of coil assemblies 112; and configured to sequentially drive current (e.g., AC current, DC current) through the set of coil assemblies 112 in order to sequentially generate a toroidal magnetic field that then couples the set of magnetic elements 132 of the rotor 130.

1.3.1 Coil Assemblies

In one implementation, the first system 100 includes each coil assembly 112, in the set of coil assemblies 112 including: a first bobbin 120; a second bobbin 121, a stator pole 122; and a winding 123. In this implementation, the first bobbin 120, the second bobbin 121, the stator pole 122, and the winding 123 cooperate with each other to form a pole tunnel segment of the cylindrical stator ring. In particular, the first bobbin 120 can define: a first aperture (e.g., a circular opening); and a first winding receiving slot (e.g., a recessed channel) about an exterior of the first bobbin 120. The second bobbin 121: is arranged opposite the first bobbin 120; defines a second aperture (e.g., circular opening) in alignment with the first aperture of the first bobbin 120; and defines a second winding 123 receiving slot (e.g., recessed channel) about an exterior of the second bobbin 121.

In the aforementioned implementation, the stator pole 122: is formed of a ferrous material (e.g., steel, cast iron, wrought iron, aluminum, copper, lead); is interposed between the first bobbin 120 and the second bobbin 121; defines a third aperture (e.g., circular opening) in alignment with the first aperture of the first bobbin 120 and the second aperture of the second bobbin 121, which forms the pole tunnel segment for the cylindrical stator ring; and includes the receiving member 118 arranged at an outer radial side of the stator pole 122, which faces an inner wall of the housing 150 when the cylindrical stator ring is contained within the housing 150. In one example, the receiving member 118: defines a protrusion (e.g., U-shaped protrusion, O-Shaped protrusion) extending from the outer radial side of the stator pole 122; and includes a threaded cavity configured to receive a fastening element (e.g., bolt, threaded fastener). Furthermore, the winding 123: is coiled about the first winding receiving slot of the first bobbin 120 and the second winding 123 receiving slot of the second bobbin 121; and includes a first set of leads that are then coupled to the controller 190.

The first system 100 can then replicate this structure for each coil assembly 112, in the set of coil assemblies 112, and mount the set of coil assemblies 112 to the stator yoke 124 to then form the cylindrical stator ring. The controller 190 is then connected to the first set of leads of each coil assembly 112, in the set of coil assemblies 112, which then enables for the first system 100 to selectively drive current through the set of coil assemblies 112.

In one example, the first system 100 can include twenty-one coil assemblies, each mounted to the stator yoke 124, to define the cylindrical stator ring. In this example, each of the coil assemblies, in the twenty-one coil assemblies, includes a set of leads that are coupled to the controller 190. The controller 190 can then sequentially drive current through each coil assembly 112, in the set of coil assemblies 112, to then generate a toroidal magnetic field that couples the set of magnetic elements 132 of the rotor 130, thereby enabling rotation of the rotor 130 enveloping the set of coil assemblies 112.

Therefore, the first system 100 can include a set of coil assemblies 112 that define a cylindrical stator ring configured to generate a toroidal magnetic field that couples the set of magnetic elements 132 arranged at each facet (e.g., radial facets and axial facets) of the cylindrical stator ring, thereby enabling rotation of the rotor 130.

1.3.2 Stator Yoke

In one implementation, the first system 100 includes the set of coil assemblies 112 mounted to a stator yoke 124 to define the cylindrical stator ring. In this implementation, the stator yoke 124: defines a cylindrical body 152 about the motor axis 105; and receives each coil assembly 112, in the set of coil assemblies 112, via the pole tunnel segment. Each coil assembly 112, in the set of coil assemblies 112, is then mounted to the stator yoke 124 to form the cylindrical stator ring.

In one example, the stator yoke 124 includes: a first yoke segment 125; and a second yoke segment 126. In this example, the first yoke segment 125: defines a first semi-circular arc; and extends radially about the motor axis 105. Additionally, the second yoke segment 126: defines a second semi-circular arc; extends radially about the motor axis 105; is coupled to a first end and a second end of the first yoke segment 125; and cooperates with the first yoke segment 125 to define a cylindrical stator yoke 124. In this example, the set of coil assemblies 112 includes: a first subset of coil assemblies 112 defining a first tunnel segment configured to receive the first yoke segment 125; and a second subset of coil assemblies 112 defining a second tunnel segment and configured to receive the second yoke segment 126.

In the aforementioned example, the first subset of coil assemblies 112 can be assembled onto the first yoke segment 125 and the second subset of coil assemblies 112 can be assembled onto the second yoke segment 126 independently from one another. Subsequently, the assembled first stator yoke 124 can be coupled to the first end and the second end of the assembled second stator yoke 124, such as by welding, pressure sensitive adhesives, and/or fastening, thereby forming the cylindrical stator ring.

Therefore, the first system 100 can include a stator yoke 124 to support and maintain the set of coil assemblies 112 in a circular configuration, thereby enabling the formation of a toroidal magnetic field responsive to driving current through the set of coil assemblies 112 during operation of the first system 100.

1.3.3 3-Phase Configuration: 120 Degrees

In one implementation, the first system 100 includes a set of coil assemblies 112 including: a first subset of coil assemblies 112; a second subset of coil assemblies 112; and a third subset of coil assemblies 112. In this implementation, the first subset of coil assemblies 112, the second subset of coil assemblies 112, and the third subset of coil assemblies 112 cooperate to form a 3-phase configuration for the electric motor. In particular, the first system 100 can sequentially drive current through the first subset of coil assemblies 112, the second subset of coil assemblies 112, and the third subset of coil assemblies 112 to magnetically couple the set of magnetic elements 132 of the rotor 130 in a 3-phase configuration (e.g., delta configuration, wye configuration).

For example, the first system 100 can include a first subset of coil assemblies 112 defining a first phase winding 123 for the electric motor and including: a first set of bobbins arranged radially about the motor axis 105; a first set of windings 123 wound about the first set of bobbins; a first set of stator poles 122 interposed between the first set of bobbins; and a first set of leads coupled to the controller 190. Additionally, the first system 100 can include a second subset of coil assemblies 112 defining a second phase winding 123, different from the first phase winding 123, of the electric motor and including: a second set of bobbins arranged radially about the motor axis 105 adjacent the first set of bobbins; a second set of windings 123 wound about the second set of bobbins; a second set of stator poles 122 interposed between the second set of bobbins; and a second set of leads coupled to the controller 190. Furthermore, the first system 100 can include a third subset of coil assemblies 112 defining a third phase winding 123, different from the first phase winding 123 and the second phase winding 123, of the electric motor. The third subset of coil assemblies 112 includes: a third set of bobbins arranged radially about the motor axis 105 adjacent the first set of bobbins and the second set of bobbins; a third set of windings 123 wound about the third set of bobbins; a third set of stator poles 122 interposed between the third set of bobbins; and a third set of leads coupled to the controller 190. In this example, the third subset of coil assemblies 112 cooperates with the first subset of coil assemblies 112, the second subset of coil assemblies 112, and the third subset of coil assemblies 112 to define a 3-phase configuration for the electric motor.

Thus, the first system 100 can sequentially drive current through the first subset of coil assemblies 112, the second subset of coil assemblies 112, and the third subset of coil assemblies 112, thereby sequentially and magnetically coupling the set of magnetic elements 132 of the rotor 130 to enable rotation of the rotor 130.

1.3.4 3-Phase Configuration: 180 Degrees

In another implementation, these subsets of coil assemblies can include coil assemblies connected in series to each other and arranged at opposing angular offsets (i.e., 180-degree offset) about the stator yoke 124. As a result, the first system 100 can then sequentially drive current to these subsets of coil assemblies in order to sequentially generate the magnetic fields directed to the set of magnetic elements 132 of the rotor 130.

For example, the set of coil assemblies 112 can include a first subset of coil assemblies 112 including: a first coil assembly; and a second coil assembly connected in series with the first coil assembly and arranged 180 degrees opposite the first coil assembly. Additionally, the set of coil assemblies 112 can include a second subset of coil assemblies 112 including: a third coil assembly angularly offset from the first coil assembly; and a fourth coil assembly arranged 180 degrees opposite the third coil assembly and connected in series with the third coil assembly. In this example, the controller 190 can then sequentially drive current to the first subset of coil assemblies 112 and the second subset of coil assemblies 112 to sequentially generate magnetic fields about the rotor 130 that couple the set of magnetic elements 132 about the rotor 130 to enable rotation of the rotor 130.

Additionally, the set of coil assemblies 112 can also include a third subset of coil assemblies 112 arranged in a similar configuration as described above to form the three-phase configuration for the set of coil assemblies 112 of the stator 110.

Therefore, the first system 100 can: sequentially generate opposing magnetic fields at the set of coil assemblies 112 directed to each surface of the rotor 130 in order to sequentially induce magnetic flux coupling to the rotor 130 within the set of coil assemblies 112, thereby continuously urging the stator poles of the set of coil assemblies 112 to align with the set of magnetic elements 132 of the rotor 130 to spin the rotor 130 about the set of coil assemblies 112.

1.4 Segmented Stator Assembly

Generally, the first system 100 includes a set of pole pieces 180 configured to assemble into a segmented stator assembly 110 about a motor axis 105. More specifically, each pole piece in the set of pole pieces 180: is formed of a ferrous material (e.g., powdered metal); defines a rim 181 extending about a periphery of the pole piece; defines a shoulder 183 extending from a first side of the pole piece; and defines a recess 182 inset from a second side, opposite the first side, of the pole piece configured to receive a shoulder 183 of an adjacent pole piece. Thus, the first system 100 enables coupling of adjacent pole pieces, in the segmented stator assembly 110, in a radial pattern about the motor axis 105, thereby forming a cylindrical structure which: defines a set of interstices interposed between the set of pole pieces 180 and configured to receive a set of coil windings; defines a set of flux distribution segments about a motor axis 105 configured to direct magnetic flux from these coil windings toward the rotor; and forms a cylindrical stator yoke that substantially eliminates air gaps between the set of coil windings and the set of magnetic elements 132, thereby reducing flux saturation during operation of the first system 100.

1.4.1 Unitary Pole+Yoke Segment

In one implementation, the first system 100 includes the segmented stator assembly 110 is formed of individually manufactured pole pieces (e.g., fabricated in a stator assembly 110 mold) that join together to define a unitary structure. More specifically, the pole piece can include: a rim 181 defining a first rectangular geometry of a first thickness and extending about a periphery of the pole piece; a shoulder 183 extending from a first side of the pole piece and defining a second rectangular geometry of a second thickness greater than the first thickness; and a recess 182 fabricated on a second side of the pole piece and configured to receive an adjacent pole piece, in the segmented stator assembly 110, to form an arc section of a segmented stator assembly 110. In this implementation, the recess 182 defines: a trapezoidal geometry inset from the second side of the pole piece configured to receive the shoulder 183 of an adjacent pole piece in the segmented stator assembly 110; and a radial distance about a motor axis 105 defined when the segmented stator assembly 110 are formed into a cylindrical stator yoke. The trapezoidal geometry of the recess 182 enables the formation of an arc when a pole piece, in the segmented stator assembly 110, is coupled to an adjacent pole piece in the segmented stator assembly 110.

Accordingly, a first pole piece cooperates with a second pole piece in the segmented stator assembly 110 to form a yoke section (e.g., circular section) of a cylindrical stator yoke about a motor axis 105. More specifically, a shoulder 183 of the second pole piece is inserted within the recess 182—defining the trapezoidal geometry—of the first pole piece arranged adjacent the second pole piece in order to form: a first arc section of a cylindrical stator yoke about a motor axis 105; a first interstice interposed between a first pole piece and a second pole piece; and a combined yoke and pole structure configured to locate a coil winding about the interstice 156 between the first pole piece and the second pole piece.

The first system 100 can then repeat this pattern for the segmented stator assembly 110 to form the cylindrical stator yoke that defines: a set of poles arranged about the motor axis 105; and a set of interstices interposed between the set of poles about the motor axis 105. Therefore, the segmented stator assembly 110 form a cylindrical stator yoke that substantially eliminates air gaps between stator poles and coil windings coupled to the cylindrical stator yoke, which in turn results in increased magnetization properties during operation of the electric machine.

In one example, the first system 100 forms an electric machine including a set of twenty-four stator poles about a motor axis 105. Accordingly, in this example, the segmented stator assembly 110 includes a set of twenty-four pole pieces coupled to each other, as described above, to form a cylindrical stator yoke including: a set of twenty-four pole pieces about the motor axis 105; and a set of twenty-four interstices about the motor axis 105. In this example, the formed cylindrical stator yoke can be implemented to form a three-phase electric machine, such as by dividing the cylindrical stator yoke into three sets of eight pole pieces and three sets of eight interstices. Accordingly, the torque output by the electric machine is directly proportional to the geometry of the segmented stator assembly 110 (e.g., volume) and therefore proportional to a volume of the cylindrical stator yoke. Therefore, the segmented stator assembly 110 can be manufactured according to a target torque output in order to form a cylindrical stator yoke that achieves the target torque output of an electric machine.

1.4.1.1 H-Bridge

In one implementation, each pair of adjacent pole pieces—in the segmented stator assembly 110—defines a shoulder 183 interposed between a pair of linearly-offset and angularly-offset rims that cooperate to define a splayed H-bridge structure in a radial array of H-bridge structures. In this implementation, the shoulder 183 of an adjacent pole piece: is interposed between a set of rims to define the tapered annular interstice; and defines a bobbin configured to receive a winding 123. Accordingly, the pair of adjacent pole pieces in the splayed H-bridge configuration locates the winding 123 within the tapered annular interstice in the radial array of tapered annular interstices.

1.4.1.2 Tapered Recess

In one implementation, each pole piece—in the set of pole pieces 180—includes: a rectilinear shoulder extending from a first side of the pole piece; and a tapered recess (e.g., trapezoid) inset from a second side, opposite the first side, of the pole piece. In this implementation, the tapered recess of a pole piece is configured to receive a rectilinear shoulder of an adjacent pole piece in order to locate the adjacent pole piece linearly-offset and angularly-offset from the pole piece. Accordingly, the set of pole pieces 180 are arranged to form the radial array of splayed H-bridge structures that is configured to receive the set of windings 123.

In one example, a pair of pole pieces—in the segmented stator assembly 110—includes a first pole piece defining: a first rim extending about a periphery of the first pole piece; and a tapered mating recess arranged on a first side of the first pole piece. Additionally, the pair of pole pieces—in the segmented stator assembly 110—can include a second pole piece defining: a second rim extending about a periphery of the second pole piece; and a rectilinear shoulder arranged on a second side of the second pole piece, the second side facing the first side of the first pole piece. Accordingly, this rectilinear shoulder is configured to insert into the tapered mating recess to: locate the second rim linearly-offset and angularly-offset from the first rim; and form a tapered annular interstice, in the radial array of tapered annular interstices, between the second rim and the first rim.

Therefore, each pole piece—in the set of pole pieces 180—can be individually and repeatably manufactured, such as via powder metallurgy and/or press-and-sinter techniques.

1.4.1.3 Tapered Shoulder

In one implementation, each pole piece—in the set of pole pieces 180—includes: a tapered shoulder (e.g., trapezoid) extending from a first side of the pole piece; and a rectilinear recess inset from a second side, opposite the first side, of the pole piece. In this implementation, the tapered shoulder of a pole piece is configured to insert into a rectilinear recess of an adjacent pole piece in order to locate the adjacent pole piece linearly-offset and angularly-offset from the pole piece. Accordingly, the set of pole pieces 180 are arranged to form the radial array of splayed H-bridge structures that is configured to receive the set of windings 123.

In one example, a pair of pole pieces—in the segmented stator assembly 110—includes a first pole piece defining: a first rim extending about a periphery of the first pole piece; and a rectilinear mating recess arranged on a first side of the pole piece. Additionally, the pair of pole pieces—in the segmented stator assembly 110—can include a second pole piece defining: a second rim extending about a periphery of the second pole piece; and a tapered shoulder arranged on a second side of the second pole piece, the second side facing the first side of the first pole piece. Accordingly, this tapered shoulder is configured to insert into the rectilinear mating recess to: locate the second rim linearly-offset and angularly-offset from the first rim; and form a tapered annular interstice, in the radial array of tapered annular interstices, between the second rim and the first rim.

Therefore, each pole piece—in the set of pole pieces 180—can be individually manufactured, such as via powder metallurgy, press-and-sinter, or die-casting techniques.

1.4.2 Assembling Segmented Stator Assembly: Radial Retention Ring

In one implementation, the first system 100 includes a radial retention ring 184: arranged within an inner radius of the cylindrical stator yoke formed by the segmented stator assembly 110; and coupled to the segmented stator assembly 110 to locate the segmented stator assembly 110 radially about the motor axis 105. In this implementation, the segmented stator assembly 110: defines an inner radial side about the pole piece; defines an outer radial side, opposite the inner radial side, about the pole piece; and includes a denticulation extending from the inner radial side of the pole piece.

Accordingly, the first system 100 can repeat this structure in the segmented stator assembly 110, in order to form a set of denticulations arranged about an inner radius of the cylindrical stator yoke. Additionally, the radial retention ring 184: defines a diameter that cooperates with an internal diameter of the cylindrical stator yoke; and defines a set of slots about a periphery of the radial retention ring 184 configured to receive the set of dentations about the inner radius of the cylindrical stator yoke. Therefore, the radial retention ring 184 cooperates with the segmented stator assembly 110 to: locate the segmented stator assembly 110—and therefore the set of pole pieces 180—radially about the motor axis 105; and maintain the stator yoke in a cylindrical configuration about the motor axis 105.

In one example, the segmented stator assembly 110 is coupled to the radial retention ring 184 in order to form the cylindrical stator yoke about the motor axis 105. In another example, the segmented stator assembly 110 are coupled to each other, as described above, to form the cylindrical stator yoke, and the radial retention ring 184 is then arranged within (e.g., slid into) the inner radius of the cylindrical stator yoke in order to maintain the cylindrical configuration.

1.4.2.1 Dovetail

In one implementation, each pole piece—in the set of pole pieces 180—further defines a retention feature (e.g., dovetail feature) arranged on the rim 181 extending about the periphery of the pole piece. In this implementation, the retention ring 184: is arranged coaxial with the motor axis 105; is nested within an inner radial of the segmented stator assembly 110; and defines a set of grooves (e.g., dovetail grooves) arranged about a periphery of the retention ring 184. Accordingly, the set of grooves is configured to mate with the retention features about the set of pole pieces 180 to retain the set of pole pieces 180 about the motor axis 105.

Therefore, during operation of the first system 100, the set of grooves mate with the retention features of the set of pole pieces 180 to: prevent lateral motion of the set of pole pieces 180 about the motor axis 105; prevent separation of the set of pole pieces 180 from the retention ring 184; and retain the set of pole pieces 180 in a radial arrangement about the motor axis 105.

1.4.3 Assembly Segmented Stator Assembly: Tambour Link

In one implementation, the first system 100 includes a retention (e.g., flexible ferrous filament 186): coupled to the segmented stator assembly 110 about an outer radial side of the cylindrical stator yoke; and configured to maintain the segmented stator assembly 110 in the cylindrical configuration responsive to application of a taut force applied about the outer radial side of the segmented stator assembly 110. In this implementation, the segmented stator assembly 110 includes a groove: arranged about the outer radial side, opposite the inner radial side, of the pole piece; and configured to receive the retention at the groove, such as by adhesively coupling the retention to the groove of the pole piece or by welding the retention to the pole piece at the groove. Furthermore, the set of pole pieces 180 define a set of linearly-offset and angularly-offset grooves that cooperate to define a radial channel about an outer radial of the segmented stator assembly 110. The retention can then: be wound about this radial channel; and configured to compress the set of pole pieces 180 to maintain the set of pole pieces 180 radially about the motor axis 105.

Accordingly, the first system 100 can then repeat this structure for the segmented stator assembly 110 in order to form a flexible link across the set of coil assemblies 112. Additionally, the first system 100 can include: a retention wrapped taut about the outer radial side of the cylindrical stator yoke formed by the segmented stator assembly 110; and a radial retention ring 184, as described above, arranged within the inner radius of the cylindrical stator yoke and cooperating with the retention in order to maintain the segmented stator assembly 110 in a cylindrical configuration about the motor axis 105.

In one example, the first system 100 can include: a first segmented stator assembly 110 cooperating to form a first semi-circular arc of a stator yoke; and a second segmented stator assembly 110 cooperating to form a second semi-circular arc of the stator yoke configured to couple the first semi-circular arc in order to form the cylindrical stator yoke. In this example, the first segmented stator assembly 110 and the second segmented stator assembly 110: can be assembled independently from each other to form the semi-circular arcs of the cylindrical stator yoke; and, once assembled into the semi-circular arcs, coupled to each other—such as via the radial retention ring 184 and the retention as described above—to form the cylindrical stator yoke of the first system 100.

More specifically, the first system 100 can include a first retention: coupled to an outer radial side of each pole piece in the first segmented stator assembly 110; and wrapped taut about the first segmented stator assembly 110 in order to engage adjacent pole pieces, in the first segmented stator assembly 110, to form the first semi-circular arc. Similarly, the first system 100 can include a second retention: coupled to an outer radial side of each pole piece in the second segmented stator assembly 110; and wrapped taut about the second segmented stator assembly 110 in order to engage adjacent pole pieces, in the second segmented stator assembly 110, to form the second semi-circular arc.

Accordingly, the first semi-circular arc can then be coupled to the second semi-circular arc by: coupling a first shoulder at a first end of the first semi-circular arc to a first recess at a first end of the second semi-circular arc; and coupling a second shoulder at a second end of the first semi-circular arc to a second recess at a second end of the second semi-circular arc, thereby forming the cylindrical configuration for the stator yoke. Subsequently, the first system 100 can include the radial retention ring 184: arranged within the inner radius of the cylindrical stator yoke and coupled to the first segmented stator assembly 110 and the second segmented stator assembly 110; and cooperating with the first retention encircling the first segmented stator assembly 110 and the second retention encircling the second segmented stator assembly 110 in order to maintain the stator yoke in the cylindrical configuration during operation of the first system 100 as an electric machine.

Therefore, the first system 100 can enable formation of a cylindrical stator yoke defining a set of pole pieces 180 about the motor axis 105 that substantially eliminates air gaps across the cylindrical stator yoke, thereby enabling decreased flux saturation during operation of the first system 100. Similarly, the first system 100 can implement the structure and assembly techniques described above in order to form multiple sets of pole pieces (e.g., two sets, three sets, four sets), each forming arcs (e.g., 2 semi-circular arcs, three 120-degree arcs, four quadrant arcs) of a cylindrical stator yoke.

1.4.4 Filament+Compression Sleeve

In one implementation, the first system 100 further includes a filament sleeve 186: wound (e.g., helically wound, spirally wound) about an outer radial side of the segmented stator assembly 110 to evenly compress the set of pole pieces 180 about the motor axis 105; and including a coating (e.g., epoxy coating) configured to electrically insulate the set of windings from the set of magnetic elements during rotation of the rotor 130 about the segmented stator assembly 110. In this implementation, once the set of pole pieces 180 are radially arranged about the motor axis 105—such as via the retention ring 184—the filament sleeve 186 is wound about the segmented stator assembly 110 to maintain a uniform radial configuration of the set of pole pieces 180 about the motor axis 105.

Therefore, the first system 100 can include a filament sleeve 186 wound about the segmented stator assembly 110 that functions as a compression sleeve that applies even pressure about the set of pole pieces 180 to maintain concentricity of the set of pole pieces 180 about the motor axis 105, and thus ensure uniform magnetic coupling between the set of windings 123 and the set of magnetic elements 132.

1.5 Coil Integration

Generally, the first system 100 includes: a segmented stator assembly 110 configured to assemble into a cylindrical stator yoke including a set of pole pieces 180 and a set of interstices arranged between the set of pole pieces 180; and a set of coil windings arranged at the set of interstices between the set of pole pieces 180 at the cylindrical stator yoke. More specifically, the segmented stator assembly 110 can be initially assembled into the cylindrical stator yoke and subsequently receive coupling of the set of coil windings between the set of pole pieces 180. Alternatively, the segmented stator assembly 110 can include the coil winding arranged about a shoulder 183 of the segmented stator assembly 110. The segmented stator assembly 110—including the set of coil windings—can then be assembled into the cylindrical stator yoke. Thus, the first system 100 can include a controller 190 coupled to the set of coil windings and configured to drive current across the set of windings 123 in order to induce a sequential toroidal magnetic field about the set of pole pieces 180 at the cylindrical stator yoke.

1.5.1 Coil+Rotor Assembly

In one implementation, the first system 100 includes: a first pole piece and a first shoulder extending from the first pole piece; and a second pole piece and a second shoulder arranged within a first recess at the first pole piece to define an interstice 156 between the first pole piece and the second pole piece. In this implementation, the first system 100 further includes a coil winding wound about the interstice 156 between the first pole piece and the second pole piece. More specifically, the recess 182 at the first pole piece defines a volume in order to partially nest the second shoulder of the second pole piece within the recess 182, thereby exposing the second shoulder in the interstice 156 between the first pole piece and the second pole piece.

Accordingly, the first system 100 includes the coil winding: wound about the second shoulder to occupy the interstice 156 between the first pole piece and the second pole piece; and defines a set of leads electrically coupled to a controller 190 configured to drive current across the coil winding, thereby generating a toroidal magnetic field about the first pole piece and the second pole piece. Thus, the first system 100 can include: the segmented stator assembly 110 forming a cylindrical stator yoke including a set of interstices; and a set of coil windings arranged at the set of interstices of the cylindrical stator yoke.

In another implementation, the first system 100 includes a segmented stator assembly 110 that includes a coil winding arranged about a shoulder 183 prior to arranging the segmented stator assembly 110 in the cylindrical yoke configuration. More specifically, the first system 100 can include a first pole piece including: a first rim extending about a periphery of the pole piece; a first shoulder extending from the first side of the first pole piece; a first coil winding partially wound about the first shoulder and including a first set of leads; and a first recess inset from the second side of the first pole piece. Additionally, the first system 100 can include a second pole piece including: a second rim extending about a periphery of the second pole piece; a second shoulder extending from the first side of the second pole piece; and a second coil winding wound partially about the second shoulder and including a second set of leads.

Accordingly, in this implementation, the second shoulder—including the second coil winding—is coupled within the first recess at the first pole piece, thereby forming a circular arc of a cylindrical stator yoke that includes: a first coil winding arranged adjacent a first pole piece; and a second coil winding interposed between the first pole piece and the second pole piece. Additionally, the first system 100 can include the first set of leads and the second set of leads coupled to a controller 190 configured to drive current across the first coil winding and the second coil winding, thereby forming a toroidal magnetic field about the first pole piece and the second pole piece.

Thus, the first system 100 can include: a pole piece including a shoulder 183 and a rim 181 defining a unitary structure; and a coil winding coupled to the segmented stator assembly 110 about the shoulder 183 of the segmented stator assembly 110. Accordingly, the first system 100 can repeat this structure across a segmented stator assembly 110 that form a cylindrical stator yoke including a set of pole pieces 180 and a set of coil windings interposed between the set of pole pieces 180.

In one example, during a manufacturing process, the segmented stator assembly 110 is fabricated (e.g., molded) as a unitary structure defining the shoulder 183, the pole piece, and the recess 182. Subsequently, the segmented stator assembly 110 is then arranged at a coil winding machine in order to locate a coil winding about the shoulder 183 of the segmented stator assembly 110. In this example, the process can be repeated to achieve a target segmented stator assembly 110 (e.g., 24 pole pieces) to form a cylindrical stator yoke. The segmented stator assembly 110— including the coil windings—can then be packaged (e.g., within a delivery box) for future assembly of the first system 100.

In another example, the segmented stator assembly 110 and the coil windings are packaged separately for future assembly of the first system 100. In this example, an operator can initially assemble the segmented stator assembly 110 into the cylindrical stator yoke and subsequently arrange the coil windings about interstices at the cylindrical stator yoke.

Therefore, the first system 100 includes a segmented stator assembly 110 configured to assemble into a cylindrical stator yoke that: includes a set of pole pieces 180 arranged about a motor axis 105; includes a set of coil windings interposed between the set of pole pieces 180 about the cylindrical stator yoke; and eliminates air gaps between the set of coil windings and the set of pole pieces 180, thereby resulting in decreased magnetic saturation during operation fourth the first system 100.

1.5.2 Example: Assembling Three-Phase Configuration

In one example, the first system 100 includes: a first segmented stator assembly 110 configured to assemble into a first arc (120-degree arc) of a cylindrical stator yoke corresponding to a first phase configuration of the first system 100; a second segmented stator assembly 110 configured to assemble into a second arc (e.g., 120-degree arc) of the cylindrical stator yoke corresponding to a second phase configuration, offset the first phase configuration, of the first system 100; and a third segmented stator assembly 110 configured to assemble into a third arc (e.g., 120-degree arc) of the cylindrical stator yoke corresponding to a third phase configuration, offset the first phase configuration and the second phase configuration, of the first system 100. In this example, the first segmented stator assembly 110, the second segmented stator assembly 110, and the third segmented stator assembly 110 are then coupled to form the cylindrical stator yoke of a three-phase configuration.

More specifically, the first segmented stator assembly 110 can include: eight pole pieces coupled to form the first arc defining eight pole pieces and eight interstices about the first arc; and eight coil windings electrically connected in series and arranged at the eight interstices at the first arc. Accordingly, the eight windings are then coupled to a controller 190 (e.g., via a set of leads and/or a controller 190 interface module) configured to drive current in the first phase configuration across the set eight windings, thereby generating a toroidal magnetic field about the eight pole pieces across the first arc. Therefore, the first system 100 can: repeat this structure across the second segmented stator assembly 110 and the third segmented stator assembly 110; and trigger the controller 190 to sequentially drive current across the first arc, the second arc, and the third arc to operate the first system 100 in a three-phase configuration.

1.6 Rotor

Generally, the first system 100 includes a rotor 130 including a set of magnetic elements 132: encompassing the set of coil assemblies 112; defining a radial magnetic tunnel about the motor axis 105; and configured to generate a flux density distribution focused toward the set of coil assemblies 112. In particular, the set of magnetic elements 132 are arranged across the inner radial facet 114, the outer radial facet 115, the first axial facet 116, and the second axial facet 117 of the set of coil assemblies 112, thereby enveloping the set of coil assemblies 112 to form the radial magnetic tunnel. Thus, when the first system 100 drives current through the set of coil assemblies 112, the stator poles of the set of coil assemblies 112 magnetically couple the set of magnetic elements 132 at each facet of the cylindrical stator ring, thereby rotating the rotor 130.

1.6.1 Magnetic Flux Tunnel

In one implementation, the first system 100 includes the set of magnetic elements 132: encompassing the inner radial facet 114, the outer radial facet 115, the first axial facet 116, and the second axial facet 117 of the cylindrical stator ring; and defining a radial slot about the outer radial facet 115 of the cylindrical stator ring exposing the receiving member 118 of each coil assembly, in the set of coil assemblies 112. In this implementation, the set of magnetic elements 132 can form a C-shape configuration that partially extends across the outer radial facet 115 of the cylindrical stator ring to define the radial slot. Thus, when the set of coil assemblies 112 and the set of magnetic elements 132 are contained within the housing 150, the receiving member 118s of each coil assembly face the inner wall of the housing 150.

In one example, the first system 100 includes a set of magnetic elements 132 including: a subset of inner radial magnetic elements 133 arranged in a radial pattern about the inner radial facet 114 of the set of coil assemblies 112; a first subset of axial magnetic elements 134 arranged in a radial pattern about the first axial facet 116 of the set of coil assemblies 112; and a second subset of axial magnetic elements 135 arranged in a radial pattern about the second axial facet 117 of the set of coil assemblies 112. Additionally, the set of magnetic elements 132 can include a first subset of outer radial magnetic elements 136: arranged normal the first subset of axial magnetic elements 134; and extending partially across the outer radial facet 115 of the set of coil assemblies 112. Furthermore, the set of magnetic elements 132 includes a second subset of outer radial magnetic elements 137: arranged normal the second subset of axial magnetic elements 135; extending partially across the outer radial facet 115 of the set of coil assemblies 112; and cooperating with the first subset of outer radial magnetic elements 136 to define a radial slot exposing the receiving member 118 of each coil assembly, in the set of coil assemblies 112, arranged about outer radial facet 115.

Therefore, the first system 100 includes a set of magnetic elements 132 encompassing the facets of the cylindrical stator ring and defining a radial slot exposing the receiving member 118 of each coil assembly, in the set of coil assemblies 112, in order to: enable magnetic flux linkage about each facet of the set of coil assemblies 112 during operation of the electric motor; and enable the housing 150 to rigidly couple the set of coil assemblies 112 at the receiving member 118 of the coil assembly.

1.6.2 Halbach Configuration

In one implementation, as described in U.S. application Ser. No. 17/979,615, the first system 100 can include a set of magnetic elements 132: arranged in a Halbach array configuration about the inner radial facet 114, the outer radial facet 115, the first axial facet 116, and the second axial facet 117 of the set of coil assemblies 112; and configured to generate a flux density distribution directed toward the set of coil assemblies 112.

In one example, the first system 100 includes a set of inner radial magnetic elements: arranged in a first Halbach array configuration about the inner radial facet 114 of the stator 110; and defining a first flux density distribution focused toward the inner radial facet 114. Additionally, the first system 100 includes a set of outer radial magnetic elements: arranged in a second Halbach array configuration, in alignment with the first Halbach array configuration, about the outer radial facet 115 of the stator 110; and defining a second flux density distribution focused toward the outer radial facet 115.

In the aforementioned example, the first system 100 further includes a first set of axial magnetic elements: arranged in a third Halbach array configuration about the first axial facet 116 of the stator 110; and defining a third flux density distribution focused toward the first axial facet 116. Furthermore, the first system 100 includes a second set of axial magnetic elements: arranged in a fourth Halbach array configuration, in alignment with the third Halbach array configuration, about the second axial facet 117 of the stator 110; defining a fourth flux density distribution focused toward the second axial facet 117; and cooperating with the set of inner radial magnetic elements, the set of outer radial magnetic elements, and the first set of axial magnetic elements to form a magnetic flux tunnel enveloping the set of coil assemblies 112.

Therefore, the first system 100 can include a set of magnetic elements 132 configured to direct a flux density distribution at each facet of the cylindrical stator ring, thereby increasing strength of the magnetic coupling between the stator poles of the set of coil assemblies 112 and the set of magnetic elements 132 of the rotor 130.

1.6.3 Unitary Rotor Core

In one implementation, the first system 100 includes a rotor core: encompassing the set of coil assemblies 112; and supporting the set of magnetic elements 132 to face the inner radial facet 114, the outer radial facet 115, the first axial facet 116, and the second axial facet 117. In this implementation, the rotor core includes a set of receiving slots configured to receive the set of magnetic elements 132, and locates the set of magnetic elements 132 to face the set of coil assemblies 112 to define the radial magnetic tunnel. In this implementation, the rotor core can define a C-shaped structure that: encompasses the set of coil assemblies 112; and defines the radial slot to expose the receiving member 118 of each coil assembly.

For example, the first system 100 can include the rotor 130 including an inner rotor core: arranged within an inner radius of the set of coil assemblies 112; defining a set of inner slots arranged about the inner rotor core; and including a subset of inner radial magnetic elements, in the set of magnetic elements 132, arranged at the set of inner slots and facing the inner radial facet 114 of the set of coil assemblies 112. Additionally, the rotor 130 includes an outer rotor core including: a first outer plate, a second outer plate, and an outer radial wall. The first outer plate: is coupled to the inner rotor core; defines a first set of outer slots; and includes a first subset of axial magnetic elements 134, in the set of magnetic elements 132, arranged at the first set of outer slots and facing the first axial facet 116 of the set of coil assemblies 112. Additionally, the second outer plate: is arranged opposite the first outer plate; defines a second set of outer slots; and includes a second subset of axial magnetic elements 135, in the set of magnetic elements 132, arranged at the second set of outer slots and facing the second axial facet 117 of the set of coil assemblies 112. Furthermore, the outer radial wall: is interposed between the first outer plate and the second outer plate; defines a set of outer slots arranged about the outer radial wall; and includes a subset of outer radial magnetic elements, in the set of magnetic elements 132, arranged at the set of outer slots and facing the outer radial facet 115 of the set of coil assemblies 112.

In the aforementioned example, the shaft 170 is rigidly coupled to the inner rotor core and set in alignment with the motor axis 105. Thus, the first system 100 can drive current through the set of coil assemblies 112 to generate a toroidal magnetic field that magnetically couples the set of magnetic elements 132 facing each facet of the set of coil assemblies 112, thereby rotating the rotor 130.

1.6.4 Dual Rotor Core

In one implementation, the first system 100 includes an upper rotor core: spanning the first axial facet 116 of the set of coil assemblies 112; and partially extending across the inner radial facet 114 and the outer radial facet 115 of the set of coil assemblies 112. Additionally, the first system 100 includes a lower rotor core: arranged opposite the upper rotor core; spanning the second axial facet 117 of the set of coil assemblies 112; and partially extending across the inner radial facet 114 and the outer radial facet 115 of the set of coil assemblies 112. In this implementation, the upper rotor core and the lower rotor core cooperate to define the radial slot exposing the receiving member 118 of each coil assembly. Furthermore, the upper rotor core and the second rotor core are coupled to each other such that when the first system 100 drives current through the set of coil assemblies 112, the upper rotor core and the lower rotor core simultaneously rotate about the motor axis 105.

In one example, the first system 100 includes a rotor 130 including a first radial plate 140: encompassing the first axial facet 116 of the set of coil assemblies 112; and including a first subset of axial magnetic elements 134, in the set of magnetic elements 132, arranged in a radial pattern facing a first axial facet 116 of the set of coil assemblies 112. Additionally, the rotor 130 includes a first inner rotor core 141: arranged within an inner radius of the set of coil assemblies 112; extending a first length less than a length of the inner radial facet 114 of the set of coil assemblies 112; centrally coupled to the first radial plate 140; and including a first subset of inner radial magnetic elements, in the set of magnetic elements 132, arranged in a radial pattern facing the inner radial facet 114 of the set of coil assemblies 112. Furthermore, the rotor 130 includes a first outer radial wall 142: extending about an outer radius of the first radial plate 140; partially encompassing the outer radial facet 115 of the set of coil assemblies 112; and including a first subset of outer radial magnetic elements 136, in the set of magnetic elements 132, arranged in a radial pattern facing the first axial facet 116 of the set of coil assemblies 112. In this example, the shaft 170 of the housing 150: extends outwardly from the first radial plate 140 coaxial with the motor axis 105; and is rigidly coupled to the first inner rotor core 141.

In the aforementioned example, the rotor 130 further includes a second radial plate 143: arranged opposite the first radial plate 140; encompassing the second axial facet 117 of the set of coil assemblies 112; and including a second subset of axial magnetic elements 135, in the set of magnetic elements 132, arranged in a radial pattern facing a second axial facet 117 of the set of coil assemblies 112. Additionally, the rotor 130 includes a second inner rotor core 144: arranged opposite the first inner rotor core 141 within the inner radius of the set of coil assemblies 112; extending a second length, matching the first length of the first inner rotor core 141, and less than the length of the inner radial facet 114 of the set of coil assemblies 112; centrally coupled to the second radial plate 143; and including a second subset of inner radial magnetic elements, in the set of magnetic elements 132, arranged in a radial pattern facing the inner radial facet 114 of the set of coil assemblies 112. Furthermore, the rotor 130 includes a second outer radial wall 145: extending about an outer radius of the second radial plate 143; partially encompassing the outer radial facet 115 of the set of coil assemblies 112; including a second subset of outer radial magnetic elements 137, in the set of magnetic elements 132, arranged in a radial pattern facing the second axial facet 117 of the set of coil assemblies 112; and cooperating with the first outer radial wall 142 to define a radial slot exposing the receiving member 118 of each coil assembly, in the set of coil assemblies 112, arranged about the outer radial facet 115. In this example, the shaft 170 of the housing 150 is also coupled to the second inner rotor core 144.

Therefore, the first system 100 can include an upper rotor core and a lower rotor core that: envelops the set of coil assemblies 112; supports the set of magnetic elements 132 to face the set of coil assemblies 112; and defines a radial slot about the outer radial facet 115 of the set of coil assemblies 112 to expose the receiving member 118 of each coil assembly, thereby enabling the housing 150 to directly couple the receiving member 118 of the coil assembly when containing the set of coil assemblies 112 and the set of magnetic elements 132.

1.7 Controller

In one implementation, the first system 100 includes the controller 190 configured to drive current (e.g., AC current, DC current) through the set of coil assemblies 112 to generate a magnetic field at the set of stator poles coupling the set of magnetic elements 132 of the rotor 130, thereby rotating the rotor 130 about the set of coil assemblies 112.

In one example, the controller 190 can be configured to switch polarity of current supplied to the set of coil assemblies 112 in order to enable rotation of the rotor 130. Furthermore, the controller 190 can be configured to modulate frequency and amplitude of the current supplied to the set of coil assemblies 112, thereby modifying speed and direction of rotation for the shaft 170 coupled to the rotor 130 in order to satisfy a particular mode of operation (e.g., pump motor operation, vehicle motor operation, HVAC operation) for the electric motor.

1.8 Housing

Generally, the first system 100 includes a housing 150 that contains the set of coil assemblies 112 and the set of magnetic elements 132. In particular, the housing 150 includes: a base 151, a cylindrical body 152 extending from the base 151; and a cover 154. The cover 154: is arranged opposite the base 151; is coupled to a distal end of the cylindrical body 152 to define a cavity configured to locate the set of coil assemblies 112 and the rotor 130 within the housing 150; and including a shaft 170 opening that receives the shaft 170 in alignment with the motor axis 105. The housing 150 locates the set of coil assemblies 112 within the cavity such that the receiving member 118 of each coil assembly, in the set of coil assemblies 112, faces an inner wall of the cylindrical body 152. The housing 150 can then include a set of fastening members 155 that is inserted about the cylindrical body 152 of the housing 150 and couples the receiving member 118 of the coil assembly. Thus, when the first system 100 drives current through the set of coil assemblies 112 to rotate the rotor 130, the housing 150 maintains rigid coupling to the stator 110, thereby: rotating the rotor 130 within the cavity of the housing 150; and simultaneously rotating the shaft 170 coupled to the rotor 130 located within the housing 150.

1.8.1 Housing Integration: Fastener

In one implementation, the first system 100 includes the housing 150 directly coupled to the receiving member 118 of each coil assembly, in the set of coil assemblies 112, located within the cavity of the housing 150. In this implementation, the first system 100 includes: the set of coil assemblies 112 located within the housing 150 and including the set of receiving members 118 of each coil assembly facing an inner wall of the cylindrical body 152; the rotor 130 located within the housing 150 and encompassing the set of coil assemblies 112 to define a radial slot exposing the receiving member 118 of each coil assembly; and a set of fastening members 155 received about the cylindrical body 152 of the housing 150 and coupling the receiving member 118 of each coil assembly to define an interstice 156 between the rotor 130 and the inner wall of the cylindrical body 152.

In the aforementioned implementation, the receiving member 118 of each coil assembly protrudes outwardly from the outer radial facet 115 of the cylindrical stator ring and defines a threaded cavity 119 that faces the inner wall of the cylindrical body 152 of the housing 150. The set of fastening members 155 are then coupled to the threaded cavity 119 of the receiving member 118 in order to rigidly couple the housing 150 to the set of coil assemblies 112. Thus, when the controller 190 drives current through the set of coil assemblies 112 to rotate the rotor 130, the rotor 130 freely spins within the cavity without direct contact to the inner wall of the cylindrical body 152.

In one example, the first system 100 includes the housing 150 including a set of apertures 153: radially arranged about a cylindrical body 152 of the housing 150; and aligned with the receiving member 118 of each coil assembly, in the set of coil assemblies 112. Additionally, the first system 100 includes the set of fastening members 155 received through the set of apertures 153 at the cylindrical body 152. The set of fastening members 155 then engages the threaded cavity 119 of the receiving member 118 of each coil assembly, in the set of coil assemblies 112 to: rigidly couple the housing 150 to the stator 110; and define an interstice 156 between an inner radial wall of the housing 150 and a subset of outer radial magnetic elements, in the set of magnetic elements 132, encompassing the outer radial facet 115 of the set of coil assemblies 112.

Therefore, the first system 100 includes a housing 150: locating the set of coil assemblies 112 and the rotor 130 within a cavity of the housing 150; and maintaining rigid coupling between the set of coil assemblies 112 and the housing 150, thereby enabling free rotation of the rotor 130 within the cavity of the housing 150.

1.8.2 Housing Integration: Coupling Ring

In one implementation, the first system 100 includes a housing 150 including a coupling interposed between the outer radial facet 115 of the cylindrical stator ring and the inner wall of the cylindrical body 152 of the housing 150. In this implementation, the coupling ring 157: envelops the set of coil assemblies 112; is coupled to the receiving member 118 of each coil assembly; and abuts with the inner wall of the cylindrical body 152, thereby defining the interstice 156 between the rotor 130 enveloping the set of coil assemblies 112 and the inner wall of the cylindrical body 152.

In the aforementioned implementation, the first system 100 includes: the rotor 130 enveloping the set of coil assemblies 112 to define a radial slot about the outer radial facet 115 of the cylindrical stator ring; and the coupling ring 157 located about the radial slot and coupled to the receiving member 118 of each coil assembly, in the set of coil assemblies 112. The coupling ring 157 can then define a ring diameter greater than a diameter of the rotor 130 enveloping the set of coil assemblies 112 and less than a diameter of the cylindrical body 152, such that the coupling ring 157 is maintained abutting with the inner wall of the cylindrical housing 150 when the rotor 130 and stator 110 are contained within the housing 150.

In one example, the first system 100 includes the housing 150 including a coupling ring 157: interposed between the outer radial facet 115 of the set of coil assemblies 112 and an inner radial wall of the housing 150; and defining an interstice 156 between the inner radial wall of the housing 150 and a subset of outer radial magnetic elements, in the set of magnetic elements 132, encompassing the outer radial facet 115 of the set of coil assemblies 112. Additionally, the coupling ring 157 includes: a first set of coupling members 158 radially arranged about an inner radius of the coupling ring 157 and coupled to the receiving member 118 of each coil assembly, in the set of coil assemblies 112; and a first set of threaded cavities 159 arranged about an outer radius of the coupling ring 157. Furthermore, the first system 100 includes a set of fastening members 155 coupled to the first set of threaded cavities 159 to rigidly couple the housing 150 to the set of coil assemblies 112.

Therefore, the first system 100 can include: a housing 150 containing the set of coil assemblies 112 and the rotor 130; and a coupling ring 157 interposed between the set of coil assemblies 112 and an inner wall of the housing 150 to define an interstice 156 between the rotor 130 and an inner wall of the housing 150, thereby allowing for the rotor 130 to spin freely within the cavity of the housing 150 during operation of the first system 100.

1.8.3 Heat Dissipation

During operation of the first system 100, the rotor 130 spins within the housing 150 and generates heat that can degrade performance of the first system 100. Thus, the first system 100 can implement fluid cooling, heatsinks, vents, baffles, and/or fans in order to reduce temperature during operation of the first system 100.

In one implementation, the first system 100 includes the coupling ring 157: interposed between the set of coil assemblies 112 and the housing 150; and configured to form a heat sink configured to draw heat from the set of coil assemblies 112 to the base 151, cylindrical body 152, and cover 154 of the housing 150. In this implementation, the first system 100 can then dissipate heat transferred to the housing 150, such as by conduction, natural convection, forced convection, and/or thermal radiation, to a lower temperature region (e.g., ambient air). Additionally, the coupling ring 157 can include a thermal conductive coating, such as thermal heatsink paste and/or a thermal pad enveloping outer surfaces of the coupling ring 157 and configured to reduce the operating temperature of the first system 100.

In another implementation, the first system 100 can include temperature sensors (e.g., heat cameras) coupled to the housing 150 and configured to read temperature values of the housing 150 during operation of the first system 100. The first system 100 can then implement thermal analysis techniques to the temperatures read from the temperature sensor to determine an operating temperature range of the first system 100. In one example, the first system 100 can determine a temperature range that exceeds the operating temperature range of the first system 100. Thus, the first system 100 can modify (e.g., reduce) current sent to the set of coil assemblies 112 in order to reduce the operating temperature of the first system 100.

In another implementation, the housing 150 can be formed of a thermal conductive material configured to reduce operating temperature of the first system 100. For example, the housing 150 can be formed of copper and/or aluminum.

In another implementation, the first system 100 can further include a housing 150 including an arrangement of cooling fins configured to reduce thermal resistance between the coupling ring 157 and the housing 150.

In another implementation, the first system 100 includes the housing 150: containing the set of coil assemblies 112 and the rotor 130; and submerged in a cooling liquid. For example, system 100 includes the set of coil assemblies 112 partially and/or fully submerged in oil (e.g., mineral oil) configured to form an immersion-cooling medium for the set of coil assemblies 112. In another example, the liquid cooling medium is formed of a dielectric fluid configured to function as a coolant and provide electric insulation for the set of coil assemblies 112, such that electrical discharges or arching are suppressed.

1.8.4 Example: Totally Enclosed Fan-Cooled HVAC Electric Motor

In one implementation, the first system 100 can form a totally enclosed fan-cooled (TEFC) HVAC electric motor. In this implementation, the housing 150 entirely encloses the rotor 130 and the stator 110, thereby restricting air to circulate through the interior of the housing 150. Thus, the first system 100 can include: an external fan configured to direct air to an exterior of the housing 150 in order to reduce the operating temperature of the first system 100. For example, the external fan is: coupled to the shaft 170; located at an exterior of the housing 150; and configured to direct air to outer surfaces of the housing 150 to reduce the operating temperature of the first system 100. In another example, the first system 100 includes an internal fan: located within the housing 150; and configured to direct air toward the set of coil assemblies 112 and the rotor 130 contained within the housing 150 to reduce operating temperature of the first system 100.

1.8.5 Example: Open Drip Proof HVAC Electric Motor

In one implementation, the first system 100 can form an open drip proof (ODP) HVAC electric motor. In this implementation, the housing 150 includes vents configured to direct air exterior to the housing 150 toward the interior of the housing 150 in order to reduce the operating temperature of the first system 100. The housing 150 can include vents radially arranged at the base 151, cylindrical body 152 and the cover 154.

For example, the first system 100 can include a housing 150 including a base 151 including a first set of intake vents 160 radially arranged about the base 151. Additionally, the housing 150 includes a cover 154: arranged opposite the base 151; and including a second set of intake vents 160 radially arranged about the cover 154. Furthermore, the housing 150 includes a cylindrical body 152: interposed between the base 151 and the cover 154 to define a cavity configured to locate the rotor 130 and the stator 110 within the housing 150; and including a set of outtake vents 162 radially arranged about the cylindrical body 152. In this example, during operation of the first system 100, air about the exterior of the housing 150 is directed toward an interior of the housing 150 by way of the first set of intake vents 160 and the second set of intake vents 160. Additionally, the air directed to the interior of the housing 150 flows through the set of coil assemblies 112 and the rotor 130, thereby reducing operating temperature of the first system 100. The air within the interior of the housing 150 is then dispersed throughout the set of outtake vents 162.

2. Second System: Embedded Magnet Motor

Figure 14:
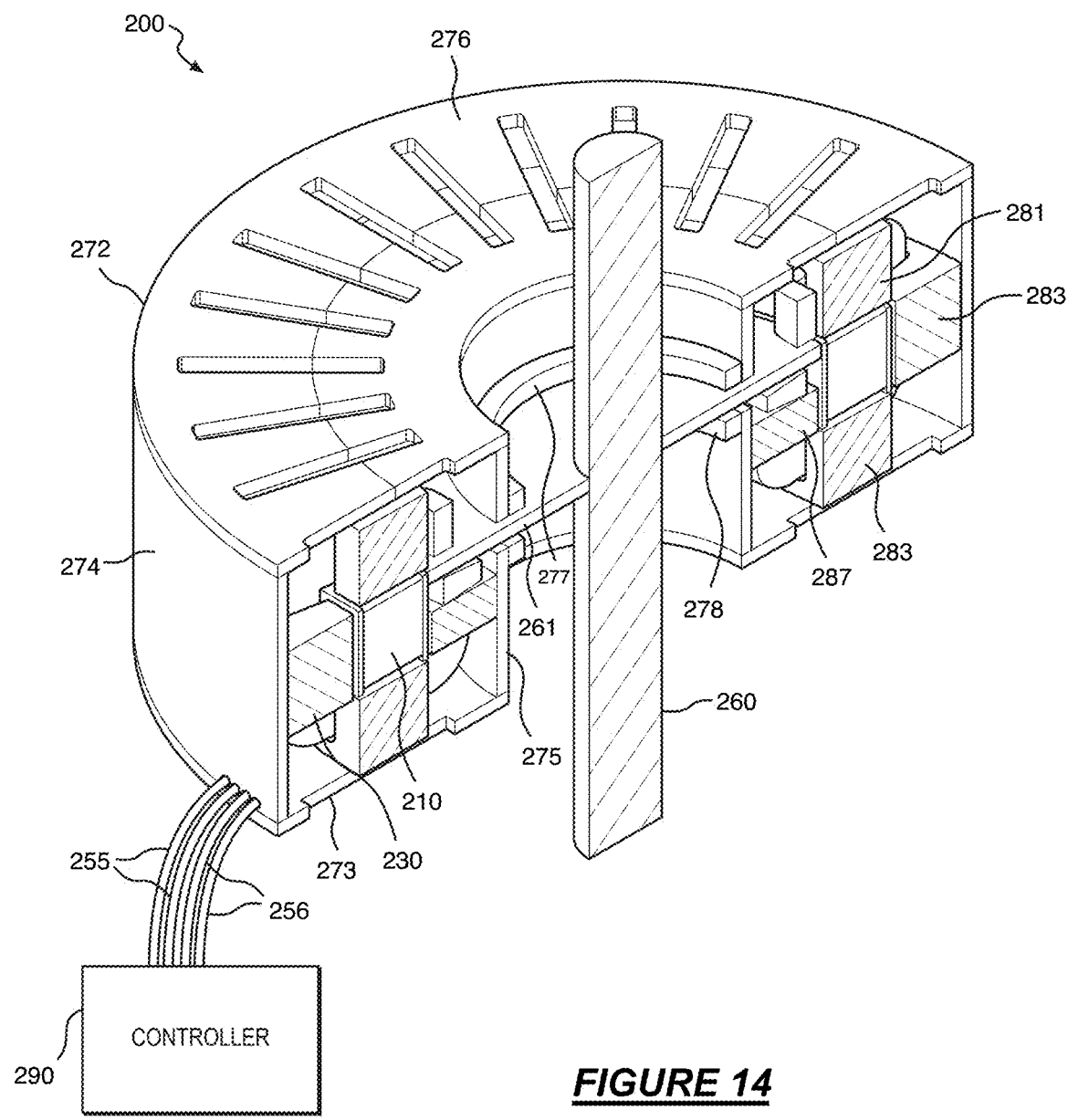
FIG. 14 is a schematic representation of a second system.

As shown in FIG. 14, a system 200 includes a rotor 210 including a set of magnetic elements 212 arranged radially about a motor axis within a body 215. The body 215 of the rotor 210 defines an inner radial surface 216, an outer radial surface 217, a first axial face 218, and a second axial face 219 opposite the first axial face 218. The system 200 further includes a stator 230 including a set of coil assemblies 231 arranged in a radial pattern about the rotor 210. Each coil assembly in the set of coil assemblies 231 includes an outer hook element 233 including a first set of leads 255 and an inner hook element 243 including a second set of leads 256. The outer hook element 233 extends across the first axial face 218 and the outer radial surface 217 of the rotor 210. The inner hook element 243: extends across the second axial face 219 of the rotor 210; extends partially across the inner radial surface 216 of the rotor 210; and is arranged normal to the outer hook segment to define a throat configured to locate the rotor 210 within the coil assembly. Additionally, the system 200 includes a shaft 260 coupled to the inner radial surface 216 of the rotor 210 and aligned to the motor axis. Furthermore, the system 200 includes a controller 290 configured to drive current through the set of coil assemblies 231 to generate a toroidal magnetic field configured to envelop the rotor 210 and couple the set of magnetic elements 212 of the rotor 210, thereby rotating the rotor 210 embedded within the set of coil assemblies 231.

Figure 20:
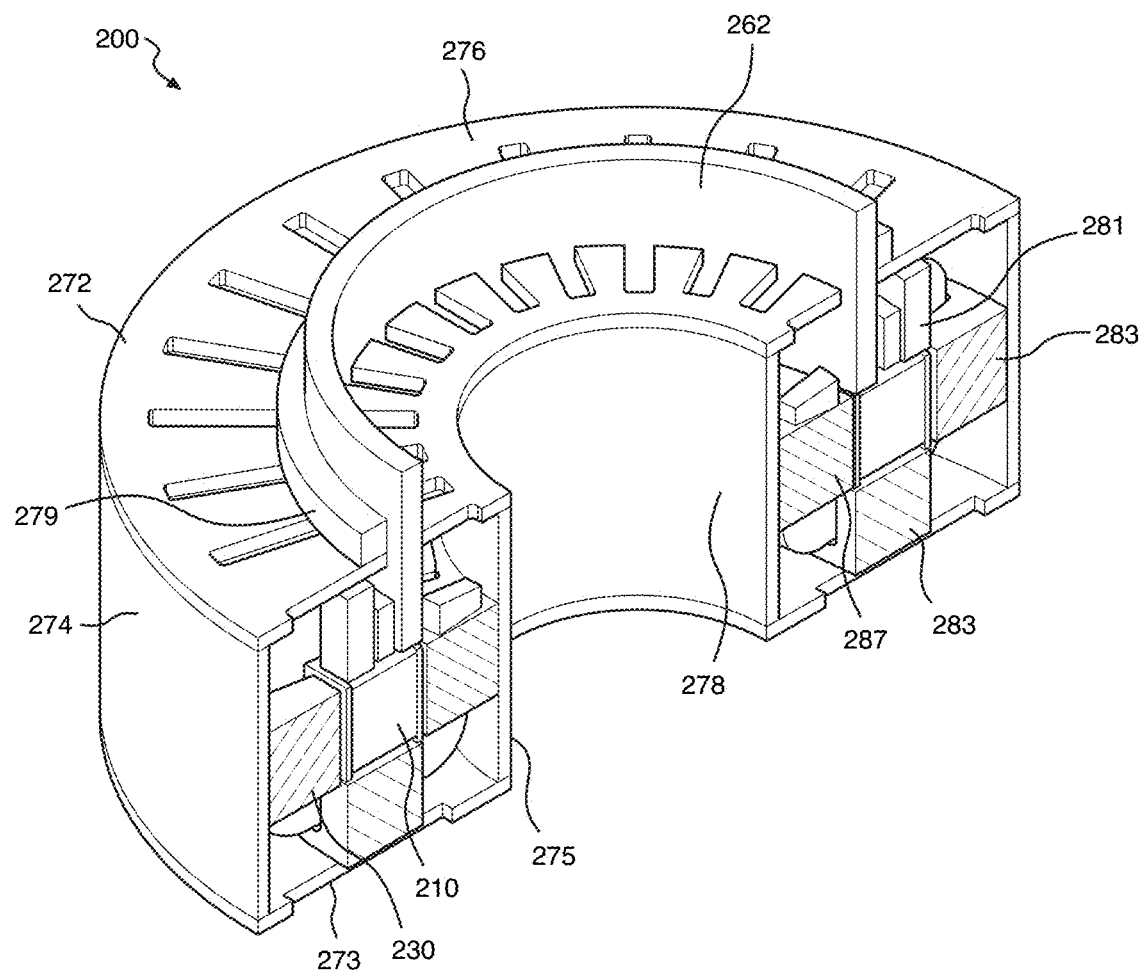
FIG. 20 is a schematic representation of the second system.
Figure 21:
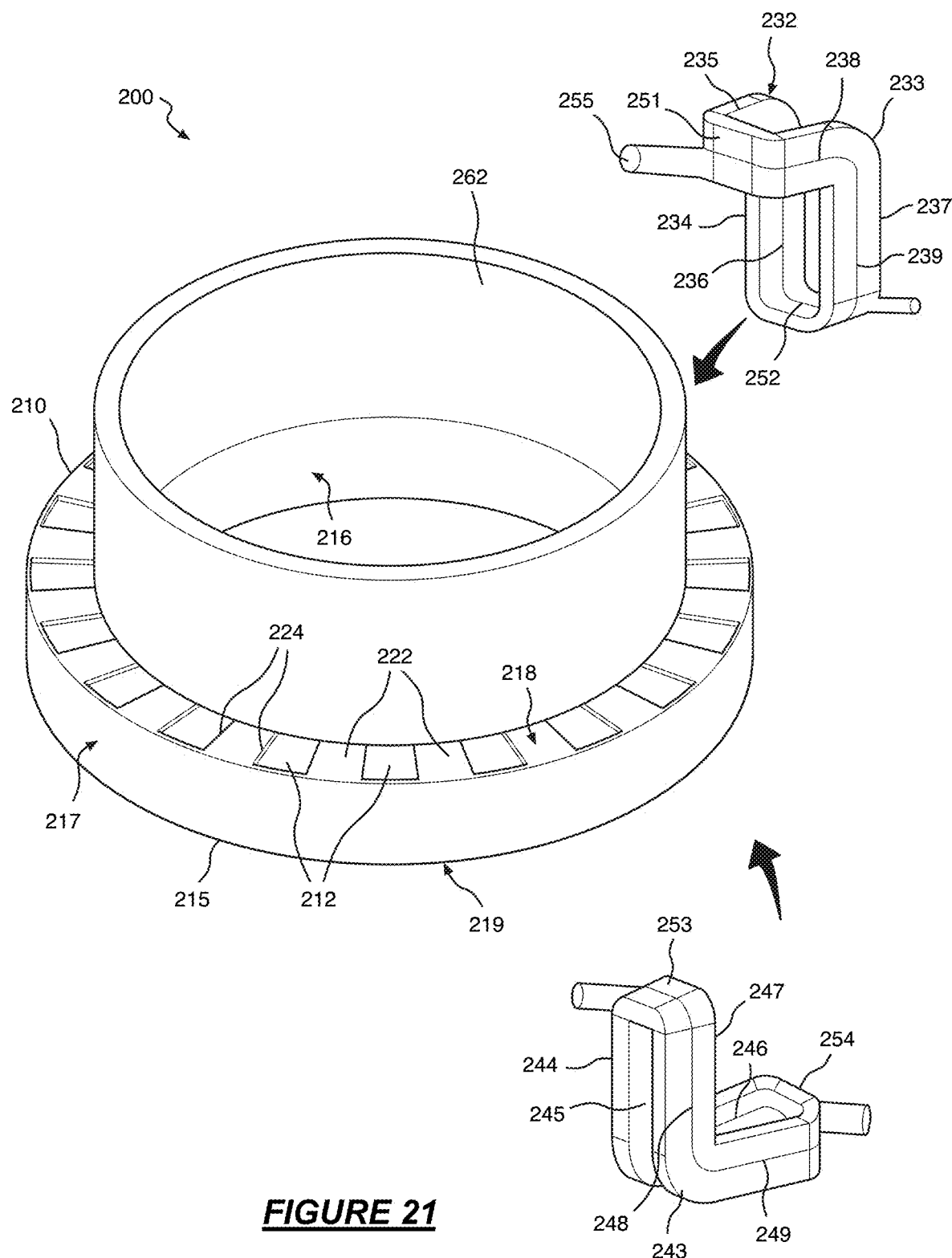
FIG. 21 is a schematic representation of the second system.

As shown in FIGS. 20 and 21, a variation of the system 200 includes a rotor 210 including a set of magnetic elements 212 arranged radially about a motor axis within a body 215. The body 215 of the rotor 210 defines an inner radial surface 216, an outer radial surface 217, a first axial face 218, and a second axial face 219 opposite the first axial face 218. The system 200 further includes a stator 230 including a set of coil assemblies 231 arranged in a radial pattern about the rotor 210. Each coil assembly in the set of coil assemblies 231 includes an outer hook element 233 including a first set of leads 255 and an inner hook element 243 including a second set of leads 256. The outer hook element 233 extends: partially across the first axial face 218 of the rotor 210; and across the outer radial surface 217 of the rotor 210. The inner hook element 243: extends across the second axial face 219 and the inner radial surface 216 of the rotor 210; and is arranged normal to the outer hook element 233 to define a throat configured to locate the rotor 210 within the coil assembly. Additionally, the system 200 includes a tubular structure arranged about the first axial face 218 of the rotor 210 and aligned to the motor axis. Furthermore, the system 200 includes a controller 290 configured to drive current through the set of coil assemblies 231 to generate a toroidal magnetic field configured to envelop the rotor 210 and couple to the set of magnetic elements 212 of the rotor 210, thereby rotating the rotor 210 while embedded within the set of coil assemblies 231.

2.1 Segmented Rotor Assembly

In one variation shown in FIGS. 14, 24, 25 and 26, the second system 200 includes: a segmented rotor assembly 210; a set of magnetic elements 212; and a stator 230.

The segmented rotor assembly 210 includes a set of pole pieces 291 arranged radially about a motor axis 205. Each pole piece 291 in the set of pole pieces 291 defines: a rim 292 extending about a periphery of the pole piece 291; a first recess 293 arranged on a first side of the pole piece; and a second recess 294 arranged on a second side, opposite the first side, of the pole piece. Additionally, each pair of adjacent pole pieces—in the segmented rotor assembly 210—defines a pair of linearly-offset and angularly-offset rims that cooperate to define a tapered annular interstice in a radial array of tapered annular interstices.

Each magnetic element in the set of magnetic elements 212 is nested within a tapered annular interstice in the radial array of tapered annular interstices.

The stator 230: encompasses the segmented rotor assembly 210; and includes a set of coil assemblies (or "windings") 231 configured to inductively couple to the set of magnetic elements 212 to rotate the segmented rotor assembly 210 about the motor axis 205.

2.2 Applications

Generally, the system 200 can function as an electric motor including a stator 230 configured to direct magnetic fields across all surfaces of a rotor 210 located within the stator 230. In particular the stator 230 includes a set of coil assemblies 231 arranged radially about the rotor 210, each coil assembly in the set of coil assemblies 231 extending across axial faces and radial surfaces of the rotor 210. Additionally, the rotor 210 includes a set of magnetic elements 212 arranged within a body 215 of the rotor 210 configured to couple the magnetic fields generated at the set of coil assemblies 231. Furthermore, the system 200 can include a shaft 260, rigidly mounted to the rotor 210 (e.g., mounted to an inner radial of rotor), and configured to rotate about a motor axis. A controller 290 can then drive current (e.g., DC current, AC current) through the set of coil assemblies 231 in order to generate these magnetic fields to then induce magnetic flux linkage between the rotor 210 and the stator 230 across all surfaces (i.e., axial faces and radial surfaces) of the rotor 210, thereby rotating the shaft 260 rigidly mounted to the rotor 210.

In one example, each coil assembly in the set of coil assemblies 231 includes an outer hook element 233 including a first set of leads 255 and an outer hook portion including a second set of leads 256. In this example, the outer hook element 233 is formed into a first L-shaped winding structure extending across a top axial face of the rotor 210 and an outer radial face of the rotor 210. Additionally, the inner hook element 243 is formed into a second L-shaped winding structure extending across a bottom axial face of the rotor 210 and extends across an inner radial surface 216 of the rotor 210. The outer hook element 233: can be connected in series with the inner hook element 243;

and is arranged normal to the inner hook element 243 to define a throat locating the rotor 210 within the coil assembly.

Therefore, the system 200 can: locate the rotor 210 entirely within the set of coil assemblies 231; generate a toroidal-tunnel of magnetic fields coupling all surfaces of the rotor 210 in order to rotate the rotor 210 within the set of coil assemblies 231; and, therefore, increase speed and torque of the electric motor without increasing a quantity of copper for the set of coil assemblies 231.

The system 200 can also include a housing 272 defining a cavity configured to locate the stator 230 and the rotor 210 within the housing 272. The system 200 can also include a set of ferrous elements 281 arranged about axial and radial sides of the set of coil assemblies 231 in order to: rigidly support the stator 230 within the cavity of the housing 272; and define sets of stator poles configured to direct magnetic fields toward the rotor 210 within the set of coil assemblies 231.

For example, the housing 272 can include: a base 273; an outer radial wall 274 arranged about an outer circumference of the base 273; an inner radial wall 275 arranged about an inner circumference of the base 273; and a cover 276 arranged over the base 273 and coupled to the outer radial wall 274 and inner radial wall 275 to define the cavity locating the stator 230 and rotor 210 within the housing 272. Furthermore, the stator 230 can include a first ferrous element 282: arranged about a bottom axial side of the set of coil assemblies 231; abutting with the base 273 of the housing 272; and defining a first set of stator poles 283 directed to the top axial face of the rotor 210. A second ferrous element 284 is: arranged about the top axial side of the set of coil assemblies 231; abutting with the cover 276 of the housing 272; and defining a second set of stator poles 285 directed to the bottom axial face of the rotor 210.

Therefore, the system 200 can: induce balanced axial forces about opposing axial forces of the rotor 210; and rigidly support the top and bottom axial of the stator 230 within the housing 272, thereby reducing vertical propagation of the rotor 210 and stator 230 within the housing 272. Furthermore, the structure of the housing 272 allows for a cooling system (e.g., liquid cooling, air cooling) to apply coolant about each surface of the housing 272, thereby rapidly reducing an internal temperature of the housing 272.

Additionally or alternatively, the system 200 can include sets of ferrous elements arranged about radial sides of the stator 230 in order to: rigidly support the stator 230 and rotor 210 within the housing 272; and define sets of radial stator poles directed to radial surfaces of the rotor 210.

In one example application, the system 200 can function as a 25-kilowatt submerged pump motor for municipal applications configured to operate at 4500 rpm. In this implementation, the system 200 can leverage the water enveloping the submerged pump motor to internally cool the rotor 210 and stator 230 within the housing 272 during operation.

2.2.1 Applications: Segmented Rotor Assembly

The second system 200 includes: a segmented rotor assembly 210; and a stator 230 configured to direct an induced magnetic field across all surfaces of the segmented rotor assembly 210 contained within the stator 230. More specifically, the segmented rotor assembly 210 includes a set of pole pieces 291 radially arranged about a motor axis 205 to define a unitary cylindrical structure configured to exhibit reduced magnetic saturation across the set of pole pieces 291 and exhibit increased magnetic field strength during rotation of the segmented rotor assembly 210 about the stator 230.

Additionally, the rotor includes a set of coil assemblies 231 arranged about axial facets and radial facets of the segmented rotor assembly 210; and encompassing the segmented rotor assembly 210 with an induced magnetic flux tunnel.

The set of pole pieces 291 are configured to assemble into a cylindrical rotor that defines a radial array of tapered annular interstices about a motor axis 205. Additionally, the second system 200 includes a set of magnetic elements 212: arranged at the radial array of tapered annular interstices; and configured to magnetically couple to the set of coil assemblies 231 in order to generate a sequential magnetic field about the set of pole pieces 291 to rotate the segmented rotor assembly 210 about the motor axis 205. More specifically, each pole piece 291—in the segmented rotor assembly 210—defines a unitary structure that includes: a rim 292 extending about a periphery of the pole piece 291; and a first recess 293 inset from a first side of the pole piece 291 and configured to nest a magnetic element, in the set of magnetic elements 212, that also nests within a second recess 294 inset from a second side of an adjacent pole piece to form an arc segment (e.g., splayed H-bridge structure) of the segmented rotor assembly 210.

In one example, the segmented rotor assembly 210 includes a first pole piece defining: a first rim extending about a periphery of the pole piece; and a first recess 293 (e.g., tapered recess) inset from a first side of the first pole piece. Additionally, the segmented rotor assembly 210 includes a second pole piece arranged adjacent the first pole piece and defining: a second rim extending about a periphery of the second pole piece; and a second recess 294 (e.g., tapered recess) inset from a second side, facing the first side, of the second pole piece. Furthermore, the set of magnetic elements 212 can include a first magnetic element: nested within the first recess 293 of the first pole piece 291 and the second recess 294 of the second pole piece 291; interposed between the first rim of the first pole piece 291 and the second rim of the second pole piece 291; and cooperating with the first pole piece 291 and the second pole piece 291 to form a first arc segment (e.g., splayed H-bridge structure) of the segmented rotor assembly 210.

The second system 200 can include an analogous structure—arranged across the segmented rotor assembly 210—that forms a cylindrical rotor including: a set of magnetic elements 212 radially arranged about the motor axis 205 and encompassed by the stator 230; and a set of pole pieces 291 configured to distribute magnetic flux generated by the set of magnetic elements 212 toward the stator 230. For example, the second system 200 can further include a retention ring defining a set of grooves configured to mate with retention features across the set of pole pieces 291 to retain the set of pole pieces 291 radially arranged about the motor axis 205.

Therefore, the second system 200 includes a set of pole pieces 291 configured to assemble into a cylindrical rotor that substantially eliminates air gaps between coil assemblies 231 arranged about the stator 230 and magnetic elements about the segmented rotor assembly 210.

Accordingly, similar to the first system 100 described above, the second system 200 can exhibit reduced magnetic saturation across the set of pole pieces 291 and exhibit increased magnetic field strength duration rotation of the segmented rotor assembly 210 about the stator 230.

Although the system 200 includes a segmented rotor assembly 210 and a stator 230, other variations of this system 200 can include a segmented stator 230 and/or segmented rotor 210. For example, rather than locating a magnetic element 212 arranged within the tapered annular interstice, the system 100 can include a winding 231 arranged within the tapered annular interstice to form a segmented stator 130. In this example, the set of magnetic elements 212 can be arranged on the rotor 210.

2.3 Rotor

Generally, the system 200 includes a rotor 210 including a set of magnetic elements 212 arranged radially about a motor axis within a body 215 (e.g., a toroidal cylinder fabricated from iron, nickel, cobalt, or a combination thereof).

In one implementation, the body 215 defines: a first axial face 218 (e.g., a front face of the electric motor), a second axial face 219 opposite the first axial face 218 (e.g., a rear face of the electric motor), an inner radial surface 216; and an outer radial surface 217. The body 215 can further define a set of slots 224 fabricated (e.g., punched, cut) into the body 215 and configured to receive the set of magnetic elements 212. Additionally, the body 215 can define a set of pole spacers 222, each pole spacer arranged intermediately between slots of the rotor 210. In this implementation, the set of magnetic elements 212 are arranged in an alternating pole orientation (e.g., a pseudo Halbach array) within the body 215 of the rotor 210 configured to distribute magnetic flux on each of the first axial face 218, second axial face 219, inner radial surface 216, and outer radial surface 217 of the rotor 210.

For example, the set of magnetic elements 212 includes a subset of magnetic elements 212 including: a first magnetic element 213 of a first pole orientation (e.g., north-south) arranged within a first slot of the rotor 210 and adjacent a first pole spacer; and a second magnetic element 214 of a second pole orientation (e.g., south-north) arranged within a second slot of the rotor 210 adjacent the first pole spacer, such that, the opposing south pole of each magnetic element are opposing each other and therefore distribute magnetic flux evenly across all four surfaces of the first pole spacer (e.g., an top surface, bottom surface, inner surface, and outer surface of the first pole spacer). Accordingly, each of the magnetic elements in the set of magnetic elements 212 can be arranged in this alternating pole orientation about the body 215 of the rotor 210, thereby evenly distributing magnetic flux across the surfaces of the rotor 210. Additionally, in this example, the set of pole spacers 222: includes a set of sheets (e.g., soft metallic laminated sheets) arranged parallel to the flux distribution applied to the pole spacers and perpendicular a direction of rotation for the rotor 210, thereby reducing the number of Eddy currents formed within the body 215 of the rotor 210, which can reduce speed and torque of the rotor 210. Alternatively, the set of pole spacers 222 can be manufactured from iron powders to reduce formations of Eddy currents within the body 215 of the rotor 210.

Therefore, the set of magnetic elements 212 arranged within the body 215 of the rotor 210 distribute magnetic flux from the magnetic elements evenly across the first axial face 218, second axial face 219, inner radial surface 216, and the outer radial surface 217 of the rotor 210. The magnetic flux in the rotor 210 from the set of magnetic elements 212 couples with the magnetic flux generated from the set of coil assemblies 231 and therefore results in rotation of the rotor 210 within the set of coil assemblies 231.

In one implementation, each magnetic element in the set of magnetic elements 212 defines a particular shape configured to cooperate with a particular shape of the set of pole spacers 222 in order to achieve even distribution of magnetic flux across the surfaces of the rotor 210.

In one example, each magnetic element in the set of magnetic elements 212 defines a rectangular shape (e.g., a parallelepiped) congruent with a shape of the set of slots 224 on the body 215 of the rotor 210 that receives each of the magnetic elements. In this example, the set of pole spacers 222 arranged intermediate the set of magnetic elements 212 defines a trapezoidal shape. Therefore, the body 215 of the rotor 210 maintains a toroidal cylindrical configuration and the magnetic flux resulting from the pole orientations of the magnetic elements are distributed evenly across all surfaces of the pole spacers. Alternatively, each magnetic element in the set of magnetic elements 212 defines a trapezoidal shape and the set of pole spacers 222 arranged intermediate the set of magnetic elements 212 define a rectangular shape (e.g., a parallelepiped).

In one implementation, the set of magnetic elements 212 within the rotor 210 and the set of coil assemblies 231 defines a ratio wherein a quantity of magnetic elements in the set of magnetic elements 212 is greater than a quantity of coil assemblies in the set of coil assemblies 231. In this implementation the quantity of magnetic elements and coil assemblies for this ratio depend on the desired torque and desired speed for the shaft 260. For example, an increase in the quantity of magnetic elements in the ratio can result in an increase in torque and decrease in speed for the shaft 260. Alternatively, a decrease in the quantity of magnetic elements in the ratio can result in a decrease in torque and increase in speed of the shaft 260.

Therefore, the rotor 210 can be fabricated to achieve a target torque and a target speed with a relatively low number of magnetic elements (e.g., 20 magnetic elements), thereby reducing costs of manufacturing the system 200.

2.3.1 Shaft

Figure 15:
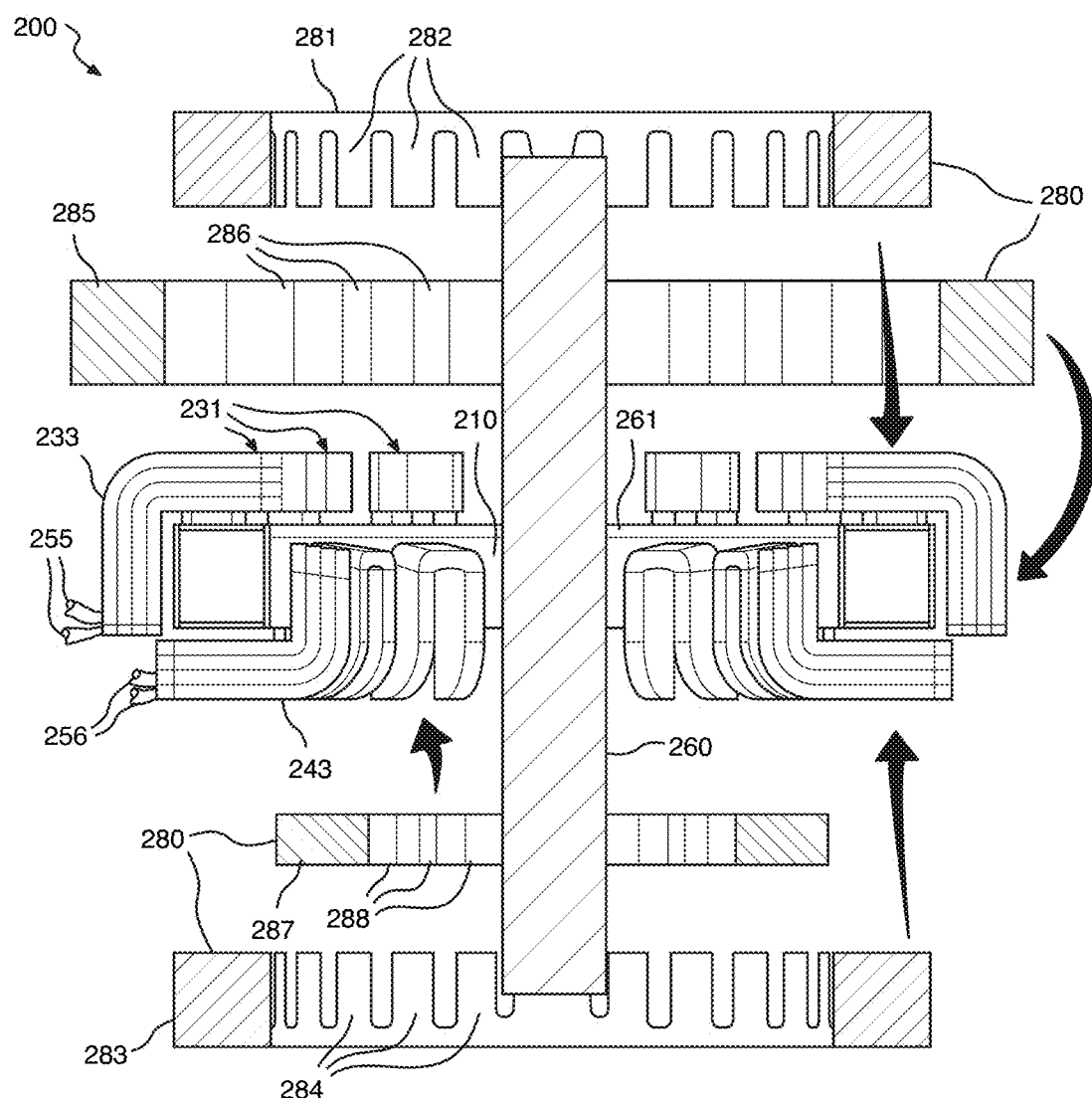
FIG. 15 is a schematic representation of the second system.
Figure 17:
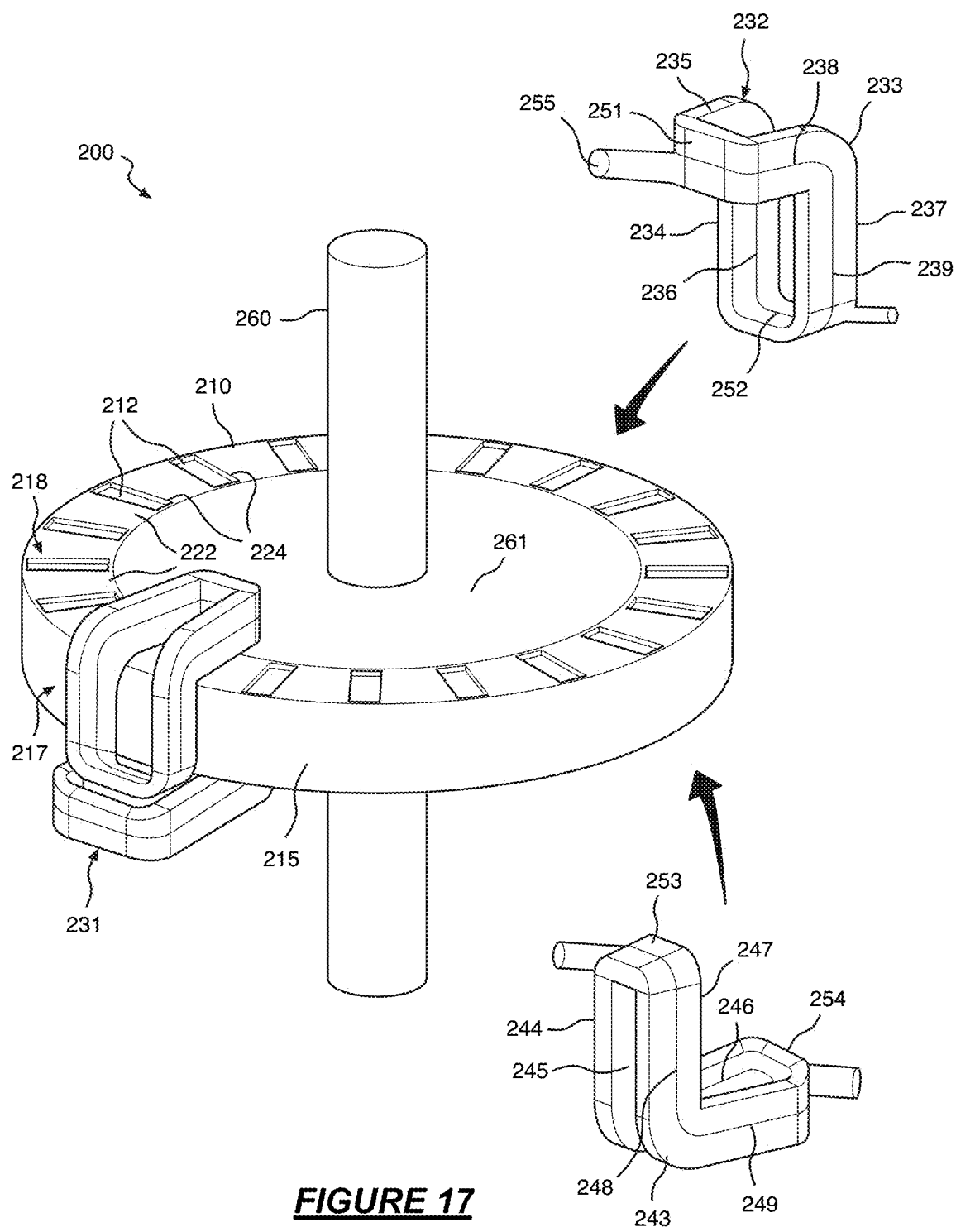
FIG. 17 is a schematic representation of the second system.
Figure 18:
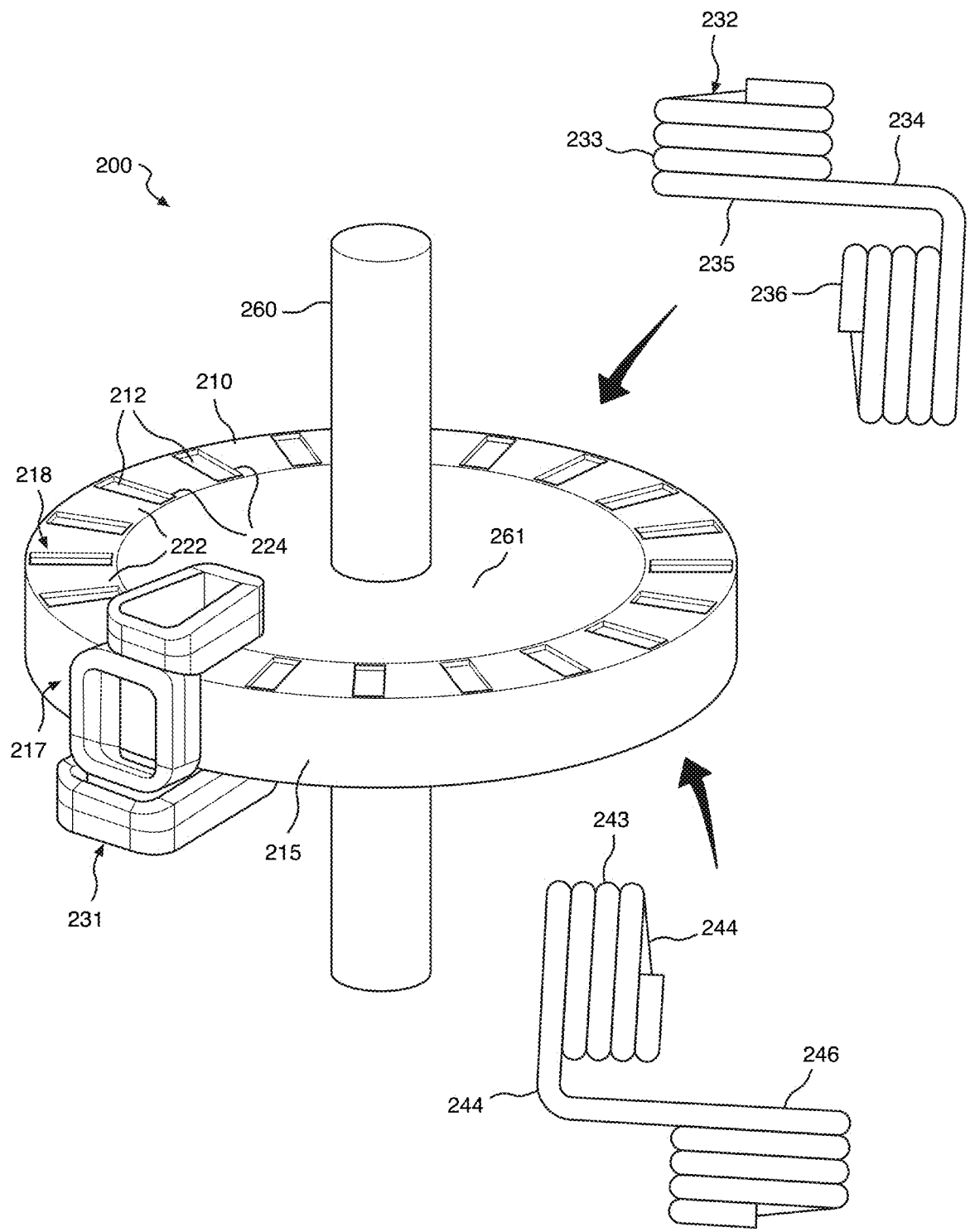
FIG. 18 is a schematic representation of the second system.
Figure 19:
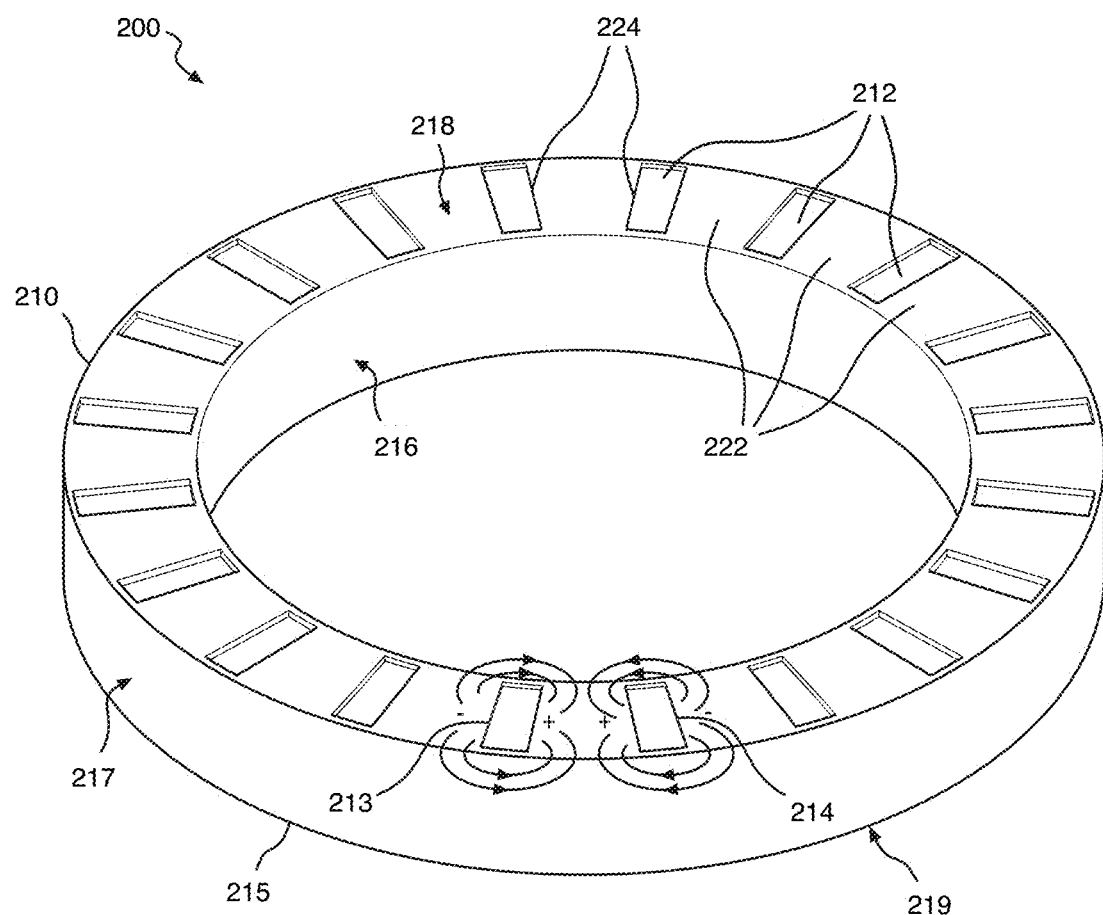
FIG. 19 is a schematic representation of the second system.

In one implementation, as observed in FIGS. 15 and 17, the system 200 includes a shaft 260 in alignment with the motor axis rigidly mounted to the rotor 210. In this implementation, the outer hook element 233 of each coil assembly couples the inner hook element 243 of each coil assembly to define a radial gap exposing a portion of the inner radial surface 216 of the rotor 210. The system 200 can then further include a disc 261 positioned within this radial gap and defining: a diameter substantially equal to an inner diameter of the body 215 of the rotor 210; and a circumference rigidly coupled to the inner radial surface 216 of the rotor 210. The shaft 260 is then rigidly coupled to the disc 261 and extends through a center of disc 261 in alignment with the motor axis, such that the shaft 260 begins to rotate in response to coupling of the magnetic elements of the rotor 210 with the magnetic field generated by the set of coil assemblies 231.

In one example, the set of coil assemblies 231 can be fabricated, such that, the disc 261 positioned within the radial gap and coupled to the rotor 210 can be located: flush with a top axial face of the rotor 210, flush with the bottom axial face of the rotor 210, or intermediate the top axial face and the bottom axial face of the rotor 210. In this example, the disc 261 can be either fabricated as an integral component of the rotor 210 or fabricated separately from the rotor 210 and then rigidly mounted (e.g., welded) to a particular height at the inner radial surface 216 of the rotor 210. The set of coil assemblies 231 can then be mounted radially about the rotor 210 to define the radial gap, such that the disc 261 can rotate freely within the radial gap (i.e., without contact to the set of coil assemblies 231).

Therefore, the disc 261: locates the shaft 260 in alignment with the motor axis of the rotor 210; and enables rotation of the shaft 260 about the motor axis with minimal components coupling the shaft 260 and the rotor 210, thereby reducing loss of torque and speed of the rotating shaft 260.

In one implementation, as observed in FIG. 15, rigidly coupling the disc 261 to the inner radial surface 216 of the rotor 210 prevents a length of the inner hook element 243 from extending entirely across the inner radial surface 216, which results in an imbalance of radial magnetic flux along the inner radial surface 216 and outer radial surface 217 of the rotor 210. In this implementation, the disc 261 includes a height tapering from a center of the disc 261 toward the circumference of the disc 261 rigidly coupled to the inner radial surface 216 of the rotor 210, thereby forming a conical profile for the disc 261. Therefore, the system 200 can: reduce transfer of the imbalance of radial forces resulting from magnetic flux coupling; and maintain the shaft 260 coupled to the rotor 210 spinning about the motor axis.

2.4 Segmented Rotor Assembly

Generally, the second system 200 includes a set of pole pieces 291 configured to assemble into a segmented rotor assembly 210 about a motor axis 205. More specifically, each pole piece 291 in the set of pole pieces 291: is formed of a ferrous material (e.g., powdered metal); defines a rim 292 extending about a periphery of the pole piece 291; defines a first recess 293 inset from a first side of the pole piece 291; and a second recess 294 inset from a second side, opposite the first side, of the pole piece 291. Thus, the second system 200 enables coupling of adjacent pole pieces 291, in the segmented rotor assembly 210, in a radial pattern about the motor axis 205, thereby forming a cylindrical structure which: defines a set of interstices interposed between the set of pole pieces 291 and configured to nest a set of magnetic elements 212; defines a set of flux distribution segments about the motor axis 205 configured to direct magnetic flux from these magnetic elements toward the stator 230; and forms a cylindrical rotor that substantially eliminates air gaps between the set of coil assemblies 231 and the set of magnetic elements 212, thereby reducing flux saturation during operation of the second system 200.

2.4.1 H-Bridge

In one implementation, each pair of adjacent pole pieces 291—in the segmented rotor assembly 210—defines an interstice configured to nest a magnetic element interposed between a pair of linearly-offset and angularly-offset rims that cooperate to define a splayed H-bridge structure in a radial array of H-bridge structures. In this implementation, the magnetic element nested between a recess (e.g., tapered recess) of a pole piece and an opposing recess (e.g., tapered recess) of an adjacent pole piece to define the tapered annular interstice. Accordingly, the splayed H-bridge structure: locates the magnetic element radially about the segmented rotor assembly 210; and is configured to direct a magnetic flux toward the rotor encompassing the segmented rotor assembly 210.

2.4.2 Tapered Recess

In one implementation, each pole piece 291—in the set of pole pieces 291—includes a tapered recess: inset from a first side of the pole piece 291; and configured to nest a rectilinear magnetic element coupled to an adjacent pole piece 291 in order to locate the adjacent pole piece 291 linearly-offset and angularly offset from the pole piece 291. Accordingly, the set of pole pieces 291 are arranged to form the radial array of splayed H-bridge structures configured to locate the set of magnetic elements 212 in a radial pattern about the motor axis 205.

In one example, a pair of pole pieces 291—in the segmented rotor assembly 210—includes a first pole piece 291: defining a first rim extending about a periphery of the first pole piece 291; and a first tapered recess arranged on a first side of the first pole piece 291. Additionally, the pair of pole pieces 291—in the segmented rotor assembly 210—can include a second pole piece 291 defining: a second rim extending about a periphery of the second pole pieces 291; and a second tapered recess arranged on a second side, facing the first side, of the first pole piece 291. Furthermore, the pair of pole pieces 291 is configured to receive a rectilinear magnetic element, in the set of magnetic elements 212, to: locate the second rim linearly-offset and angularly-offset from the first rim; and define a first tapered annular interstice in the radial array of tapered annular interstices.

Therefore, each pole piece 291—in the set of pole pieces 291—can be individually and repeatable manufactured, such as via powder metallurgy and/or press-fit-sinter techniques.

2.4.3 Tapered Magnetic Element

In another implementation, each pole piece 291—in the set of pole pieces 291—includes a rectilinear recess: inset from a first side of the pole piece 291; and configured to nest a tapered magnetic element (e.g., trapezoid) coupled to an adjacent pole piece 291 in order to locate the adjacent pole piece 291 linearly-offset and angularly offset from the pole piece 291. Accordingly, the set of pole pieces 291 are arranged to form the radial array of splayed H-bridge structures configured to locate the set of magnetic elements 212 in a radial pattern about the motor axis 205.

In one example, a pair of pole pieces 291—in the segmented rotor assembly 210—includes a first pole piece 291: defining a first rim extending about a periphery of the first pole piece 291; and a first rectilinear recess arranged on a first side of the first pole piece 291. Additionally, the pair of pole pieces 291—in the segmented rotor assembly 210—can include a second pole piece 291 defining: a second rim extending about a periphery of the second pole piece 291; and a second rectilinear recess arranged on a second side, facing the first side, of the first pole piece 291. Furthermore, the pair of pole pieces 291 is configured to receive a rectilinear magnetic element, in the set of magnetic elements 212, to: locate the second rim linearly-offset and angularly-offset from the first rim; and define a first tapered annular interstice in the radial array of tapered annular interstices.

Therefore, each pole piece—in the set of pole pieces 291—can be individually and repeatable manufactured, such as via powder metallurgy and/or press-fit-sinter techniques.

2.4.4 Lower Retention Ring

In one implementation, the second system 200 includes a lower retention ring 295 configured to couple to the set of pole pieces 291 in order to retain the segmented rotor assembly 210 concentric about the motor axis 205. In this implementation, the lower retention ring 295 defines a set of tabs configured to mate (or "engage") with retention features (e.g., dovetail retention features) across the set of pole pieces 291. More specifically, these retention features: mate with lateral sides of the set of tabs; and seat behind the set of tabs to radially locate the set of pole pieces 291 radially about the motor axis 205.

In one example, each pair of pole pieces 291 in the set of pole pieces 291 further defines a retention feature arranged on the rim 292 extending about the periphery of the pole piece 291. In this example, each pair of adjacent pole pieces 291—in the segmented rotor assembly 210—defines a pair of linearly-offset and angularly-offset retention features that cooperate to define a slot in a radial array of slots. Furthermore, in this example, the second system 200 further includes a lower retention ring 295: arranged coaxial with the motor axis 205; facing a first axial side of the segmented rotor assembly 210; and defining a set of tabs: radially offset about a periphery of the inner retention ring, such as a set of tabs forming a crenellation pattern about a periphery of the lower retention ring 295. Each tab in the set of tabs is configured to receive a slot in the radial array of slots to: mate retention features of the set of pole pieces 291 to the first axial retention ring; and retain the set of pole pieces 291 radially about the motor axis 205.

Therefore, during rotation of the segmented rotor assembly 210 about the stator 230, the set of grooves mate with the retention features of the set of pole pieces 291 to: prevent lateral motion of set of pole pieces 291 about the motor axis 205; prevent separation of the set of pole pieces 291 from the lower retention ring 295; and retain the set of pole pieces 291 in a radial arrangement about the motor axis 205.

2.4.5 Upper Retention Ring

In one implementation, the second system 200 further includes an upper retention ring 296 configured to: couple to the set of pole pieces 291; and cooperate with the lower retention ring 295 in order to retain the segmented rotor assembly 210 concentric about the motor axis 205. In this implementation, the upper retention ring 296 defines a radial tongue configured to mate (or "engage") with a radial channel across the set of pole pieces 291. More specifically, the radial tongue mates with the radial channel to: centrally locate the upper retention ring 296 within an inner radial of the segmented rotor assembly 210; and prevent lateral motion of the pole pieces 291 during rotation of the segmented rotor assembly 210 about the stator 230.

In one example, each pair of adjacent pole pieces 291—in the segmented rotor assembly 210—defines a pair of linearly-offset and angularly-offset retention features that cooperate to define a radial channel about the motor axis 205. In this example, the second system 200 further includes an upper retention ring 296: arranged coaxial with the motor axis 205; facing a second axial side, opposite the first axial side, of the segmented rotor assembly 210; including a radial tongue configured to mate with the radial channel to mate with retention features of the set of pole pieces 291 to the second axial retention ring; and cooperating with the upper retention ring 296 to retain the set of pole pieces 291 radially about the motor axis 205.

Therefore, during rotation of the segmented rotor assembly 210 about the stator 230, the lower retention ring 295 cooperates with the upper retention ring 296 to: prevent lateral motion of the set of pole pieces 291 about the motor axis 205; prevent separation of the set of pole pieces 291 from the upper retention ring 296; and retain the set of pole pieces 291 in a radial arrangement about the motor axis 205.

2.4.6 Potting Material

In one implementation, the first axial retention ring cooperates with the second axial retention ring to form a cavity within an inner radial of the segmented rotor assembly 210 that contains the retention features of the set of pole pieces 291. In this implementation, the second system 200 further includes a potting material 297 (e.g., epoxy resin, polyurethane, silicone) encapsulated within the cavity and configured to: rigidly couple the first axial retention ring and the second axial retention ring to the set of pole pieces 291; and retain the set of pole pieces 291 radially about the motor axis 205.

In one example, the lower retention ring 295 includes a first set of apertures (e.g., threaded cavities). Additionally, the upper retention ring 296 can include a second set of apertures (e.g., threaded cavities): in alignment to the first set of apertures of the lower retention ring 295; and configured to receive a fastener to couple the lower retention ring 295 to the upper retention ring 296 in order to from a cavity—within the inner radial of the segmented rotor assembly 210—that contains retention features of the set of pole pieces 291. Furthermore, the upper retention ring 296 can include potting apertures that lead into the cavity. Accordingly, during assembly of the segmented rotor assembly 210, a fluid potting material 297 can then be supplied into the cavity (i.e., via the potting apertures). After the potting material 297 cures within the cavity, the cured potting material 297 cooperates with the lower retention ring 295 and the upper retention ring 296 to concentrically and rigidly maintain the set of pole pieces 291 about the motor axis 205.

Therefore, the second system 200 can reduce a quantity of ferrous material within an inner radial of the segmented rotor assembly 210 and thus, focus distribution of magnetic flux generated from the set of magnetic elements 212 across the set of pole pieces 291 integrated into the segmented rotor assembly 210.

2.4.7 Filament+Compression Sleeve

In one implementation, the second system 200 further includes a filament 298: wound (e.g., helically wound, spirally wound) about an outer radial side of the segmented rotor assembly 210 to evenly compress the set of pole pieces 291 about the motor axis 205; and including a coating (e.g., epoxy coating) configured to electrically insulate the set of magnetic elements from the set of windings during rotation of the segmented rotor assembly 210 about the stator 230. In this implementation, once the set of pole pieces 291 are radially arranged about the motor axis 205—such as via the lower retention ring 295 and the upper retention ring 296—the filament 298 is wound about the segmented rotor assembly 210 to maintain a uniform radial configuration of the set of pole pieces 291 about the motor axis 205.

Therefore, the second system 200 can include a filament 298 wound about the segmented rotor assembly 210 that functions as a compression sleeve that evenly applies pressure about the set of pole pieces 291 to maintain concentricity of the set of pole pieces 291 about the motor axis 205 and thus, ensure uniform magnetic coupling between the set of coil assemblies 231 and the set of magnetic elements 212.

2.5 Stator

Generally, the system 200 includes a stator 230 including a set of coil assemblies 231, each including an outer hook element 233 including a first set of leads 255 and an inner hook element 243 including a second set of leads 256. The set of coil elements are arranged radially about the rotor 210 and configured to extend across each surface of the rotor 210, thereby generating a toroidal magnetic field about the rotor 210 in order to induce magnetic flux linkage across each surface of the rotor 210 and enable rotation of the rotor 210 within the set of coil assemblies 231.

2.5.1 Coil Assembly: Unitary Coil

Figure 16:
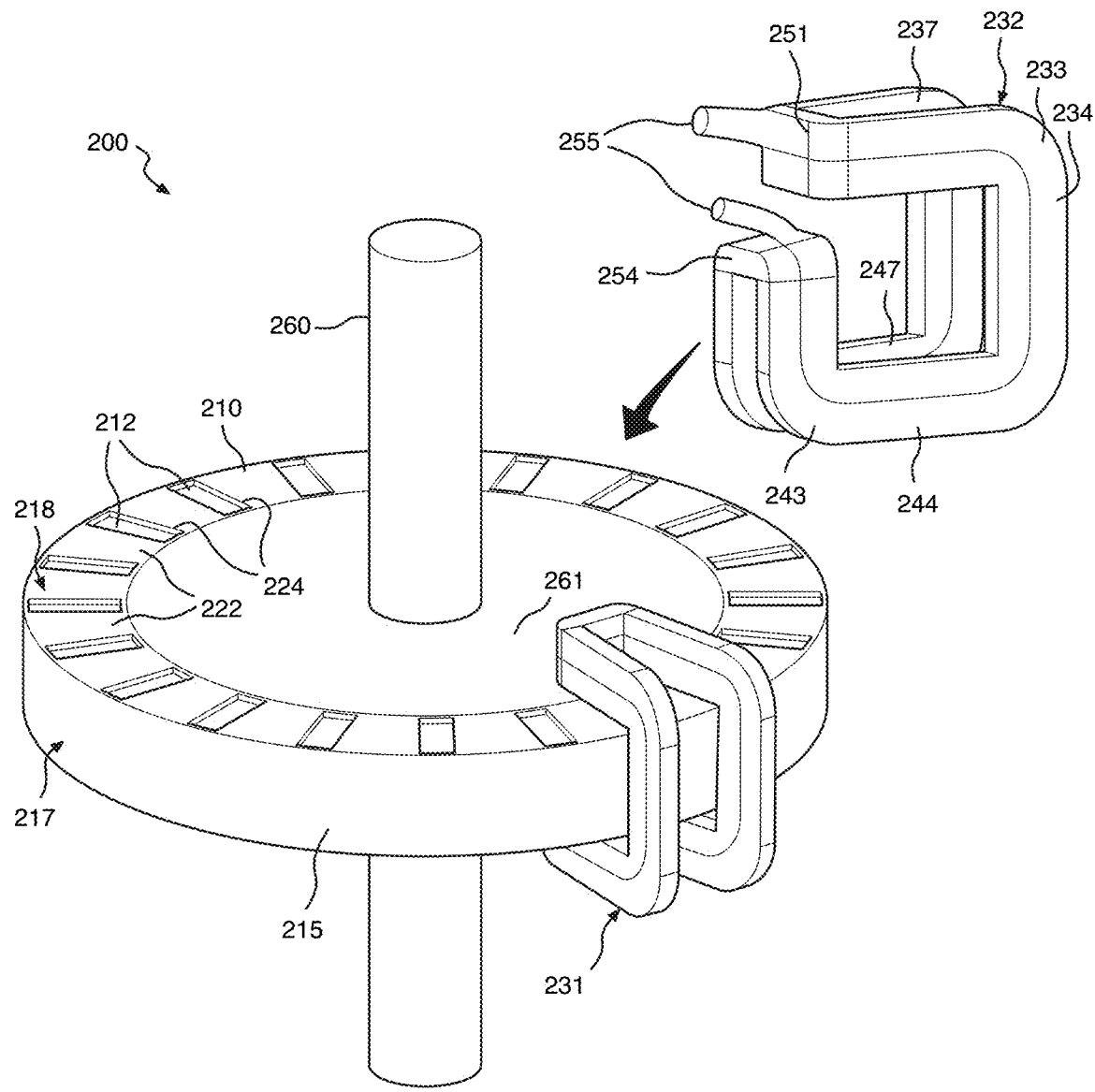
FIG. 16 is a schematic representation of the second system.

In one implementation shown in FIG. 16, each coil in the set of coil assemblies 231 defines a single unitary winding extending across all surfaces of the rotor 210. In this implementation, the outer hook element 233 and the inner hook element 243 are integrally formed into the single unitary coil winding. For example, each coil can be wound about the rotor 210 such that the coil extends across the first axial face 218, second axial face 219, outer radial surface 217, and inner radial surface 216 of the rotor 210. Additionally, each coil includes a set of leads 255 which can be connected to the controller 290 or connected to other coils in the set of coil assemblies 231 to arrange the set of coils in series and/or in parallel to each other.

2.5.2 Coil Assembly: Hook Elements

In one implementation shown in FIGS. 15 and 17, the outer hook element 233 and the inner hook element 243 of each coil assembly in the set of coil assemblies 231 defines a continuous loop of wire (e.g., laminated copper wire) extending across surfaces of the rotor 210. In particular the outer hook element 233 and the inner hook element 243 can be connected to form a hook-wound coil profile extending across each surface of the rotor 210 and define a throat to locate the rotor 210 within the coil assembly. In this implementation, the outer hook elements 233 for the set of coil assemblies 231 can initially be mounted to the rotor 210. The inner hook elements 243 for the set of coil assemblies 231 can then be mounted to the rotor 210 in alignment with the outer hook elements 233, thereby locating the rotor 210 within coil assembly. The first set of leads 255 for the outer hook elements 233 can then connected in series with the second set of leads 256 for the inner hook elements 243.

In one example, the outer hook element 233 of the coil assembly includes a first outer hook branch 234 and a second outer hook branch 237. The first outer hook branch 234 defines: a first outer coil segment 235 extending across the first axial face 218 of the rotor 210; and a second outer coil segment 236 normal the first outer coil segment 235 and extending across the outer radial surface 217 of the rotor 210. The second outer hook branch 237 is congruent (i.e., same shape and size) to the first outer hook branch 234 and defines: a third outer coil segment 238 parallel the first outer coil segment 235 and extending across the first axial face 218 of the rotor 210; and a fourth outer coil segment 239. The fourth outer coil segment 239: is normal to the third outer coil segment 238; is parallel to the second outer coil segment 236; and extends across the outer radial surface 217 of the rotor 210. Furthermore, the outer hook element 233 includes: a first neutral coil segment 251 connecting the first outer coil segment 235 and the third outer coil segment 238; and a second neutral coil segment 252 connecting the second outer coil segment 236 and the fourth outer coil segment 239 to define a first L-shaped structure.

In the foregoing example, the inner hook element 243 of the coil assembly includes a first inner hook branch 244 and a second inner hook branch 247. The first inner hook branch 244 defines: a first inner coil segment 245 extending partially across the inner radial face of the rotor 210; and a second inner coil segment 246. The second inner coil segment 246: is normal the first inner coil segment 245; extends across the second axial face 219 of the rotor 210; and is connected to the second outer coil segment 236 of the first outer hook branch 234. The second inner hook branch 247 is congruent (i.e., same size and shape) to the first inner hook branch 244 and defines: a third inner coil segment 248 parallel the first inner coil segment 245 and extending partially across the inner radial face of the rotor 210; and a fourth inner coil segment 249. The fourth inner coil segment 249: is normal to the third inner coil segment 248; is parallel to the second inner coil segment 246; extends across the second axial face 219 of the rotor 210; and is connected to the fourth outer coil segment 239 of the second outer hook branch 237. The inner hook element 243 further includes: a third neutral coil segment 253 connecting the first inner coil segment 245 and the third inner coil segment 248; and a fourth neutral coil segment 254 connecting the second inner coil segment 246 and the fourth inner coil segment 249 to define a second L-shaped structure arranged normal to the first L-shaped structure to define the throat locating the rotor 210 within the coil assembly.

Therefore, the system 200 can: locate the rotor 210 within the set of coil assemblies 231; drive current through the continuous loop of the coil assembly to generate a toroidal magnetic field in order to induce a balanced magnetic flux linkage on the opposing axial faces of the rotor 210; and thereby enable rotation of the rotor 210 within the set of coil assemblies 231.

2.5.3 Coil Assembly: Multi-Coil Geometry

In one implementation of the system 200, each coil assembly in the set of coil assemblies includes a set of coil windings: arranged across each surface of the rotor 210; and forms a hook profile defining a throat configured to locate the rotor 210 within the coil assembly; and including a set of leads. As a result, the controller 290 can, independently or sequentially, drive current to each coil winding in the set of coil windings, thereby generating magnetic fields directed to surfaces of the rotor 210 in order to induce magnetic flux coupling across each surface of the rotor 210.

For example, the outer hook element 233 for each coil assembly in the set of coil assemblies 231 can include: a first coil winding extending across the first axial face 218 of the rotor 210 and including a first lead; and a second coil winding. The second winding: is normal to the first coil winding to define a first L-shaped structure; extends across the outer radial surface 217 of the rotor 210; is connected in series to the first coil winding; and includes a second lead.

Furthermore, the inner hook element 243 for each coil assembly in the set of coil assemblies 231 can include: a third coil winding extending partially across the inner radial surface 216 of the rotor 210 and including a third lead; and a fourth coil winding. The fourth coil winding: is normal to the third coil winding to define a second-L shaped structure cooperating with the first L-shaped structure to form the throat configured to locate the rotor 210 within the coil assembly; extends across the second axial face 219 of the rotor 210; is connected in series to the third coil winding; and includes a fourth lead.

Therefore, the system 200 can: drive current to the outer hook element 233 and the inner hook element 243 independent from each other; generate a toroidal magnetic field of varying magnetic field intensity enveloping the rotor 210; and thereby achieve a target magnetic flux balance across opposing axial faces of the rotor 210 and minimize magnetic flux imbalance across the inner radial surface 216 and outer radial surface 217 of the rotor 210.

2.5.4 Stator Poles

In one implementation, the system 200 includes a stator 230 including a set of ferrous elements 281: each arranged radially and axially about the set of coil assemblies 231; supporting the set of coil assemblies 231 to maintain the hook formation and locate the rotor 210 within the set of coil assemblies 231; and defining sets of stator poles generating magnetic fields directed to each surface of the rotor 210, thereby inducing a magnetic flux linkage across surfaces of the rotor 210 in order to rotate the rotor 210 within the set of coil assemblies 231. As a result, the rotor poles of the rotor 210 continuously attempt to align with stator poles of the stator 230, in response to driving current through the set of coils, and thereby rotating the rotor 210 within the set of coil assemblies 231.

For example, the set of ferrous elements 281 can include a first ferrous element 282: coupled to axial coil segments of the outer hook element 233 for each coil assembly in the set of coil assemblies 231; defining a first set of axial stator poles configured to mate intermediate the axial coil segments of the outer hook element 233 for each coil assembly in the set of coil assemblies 231; and configured to generate magnetic fields at each stator 230 pole, in the first set of axial stator poles, directed to the first axial face 218 of the rotor 210.

Additionally in this example, the set of ferrous elements 281 can also include a second ferrous element 284 coupled to axial coil segments of the inner hook element 243, for each coil assembly in the set of coil assemblies 231, opposite the axial coil segments of the outer hook element 233. The second ferrous element 284 defines a second set of axial stator poles: arranged in alignment with the first set of axial stator poles; and configured to mate intermediate the axial coil segments of the inner hook element 243 for each coil assembly in the set of coil assemblies 231. The second ferrous element 284 is configured to generate magnetic fields at each stator pole, in the second set of axial stator poles, directed to the second axial face 219 of the rotor 210. In this example, the first ferrous element 282 defines a thickness similar to a thickness of the second ferrous element 284 thereby generating a balanced magnetic field directed to the first axial face 218 and the second axial face 219 of the rotor 210.

In the foregoing example, the set of ferrous elements 281 can also include: a third ferrous element 286: coupled to outer radial coil segments of the outer hook element 233, for each coil assembly in the set of coil assemblies 231; defining a set of outer radial stator poles 287 of a first height configured to mate intermediate the outer radial coil segments, of the outer hook elements 233, for each coil assembly in the set of coil assemblies 231; and configured to generate magnetic fields at each stator 230 pole, in the set of outer radial stator poles 287, directed to the outer radial surface 217 of the rotor 210.

Furthermore, the set of ferrous elements 281 can include a fourth ferrous element 288 coupled to inner radial coil segments of the inner hook element 243, for each coil assembly in the set of coil assemblies 231, opposite the outer radial coil segments of the outer hook element 233. The fourth ferrous element 288 can define a set of inner radial stator poles 289 of a second height less than the first height of the set of outer radial stator poles 287. The set of inner radial stator poles 289: are arranged in alignment with the set of outer radial stator poles 287; and configured to mate intermediate the inner radial coil segments of the inner hook element 243, for each coil assembly, in the set of coil assemblies 231. The fourth ferrous element 288 is configured to generate magnetic fields at each stator 230 pole, in the set of inner radial stator poles 289, directed to the inner radial surface 216 of the rotor 210. In this example, the height difference of the set of outer radial stator poles 287 and the set of inner radial stator poles 289 results in an imbalance between the magnetic fields directed to the radial surfaces of the rotor 210.

Therefore, the ferrous elements can: support the set of coil assemblies 231 to maintain engagement with the rotor 210, thereby eliminating the need for a yoke to support the rotor 210; generate magnetic fields directed to each surface of the rotor 210 to increase speed and torque output by the shaft 260; and induce balanced axial forces across each axial face of the rotor 210, thereby axially stabilizing the rotor 210 when rotating within the set of coil assemblies 231.

In one implementation, each ferrous element in the set of ferrous elements 281 can include a set of laminated ferrous sheets arranged parallel a magnetic flux distribution induced on the ferrous element and perpendicular a direction of rotation for the rotor 210, thereby reducing the number of Eddy currents formed on the ferrous element. In one example, the ferrous element can be fabricated by stacking parallel rings of laminated ferrous sheet to achieve a particular height and thickness for the set of stator poles. In another example, the ferrous element can be fabricated by compressing a strip of ferrous material into a helical spring, thereby forming the set of laminated ferrous sheets for the ferrous element.

Additionally or alternatively, the ferrous elements can be manufactured from iron powders.

2.5.5 Coil Arrangement: 180 Degrees

Figure 22:
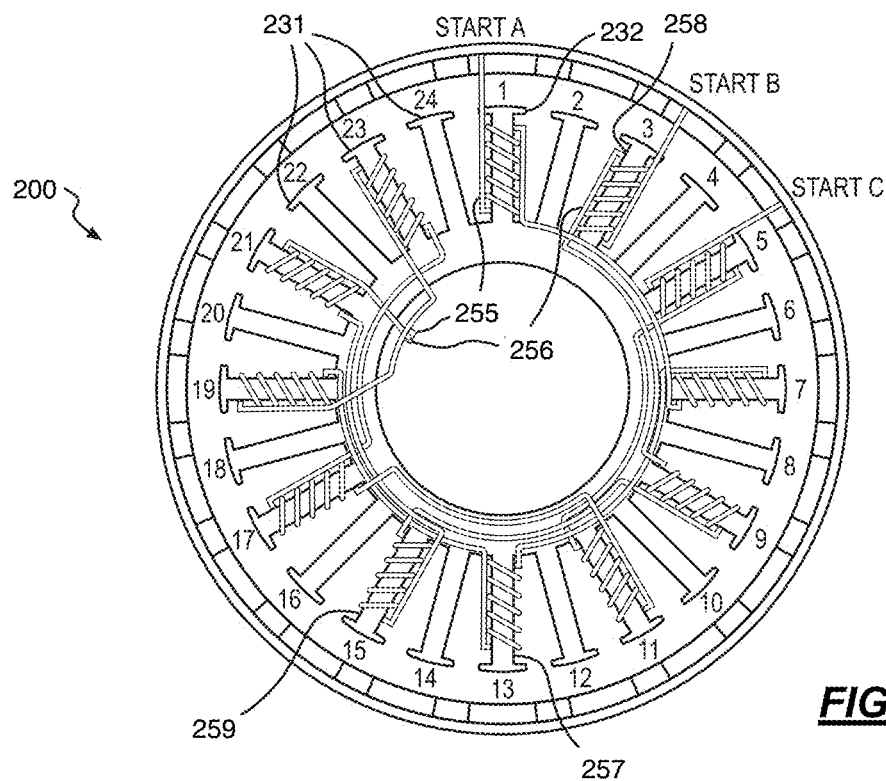
FIG. 22 is a schematic representation of the second system.

In one implementation observed in FIG. 22, the set of coil assemblies 231 can include subsets of coil assemblies arranged to form a three-phase configuration (e.g., delta configuration, wye configuration) for the stator 230. In this implementation, these subsets of coil assemblies can include coil assemblies connected in series to each other and arranged at opposing angular offsets (i.e., 180-degree offset) about the rotor 210. As a result, the controller 290 can then be configured to sequentially drive current to these subsets of coil assemblies in order to sequentially generate the magnetic fields directed to the surfaces of the rotor 210.

For example, the set of coil assemblies 231 can include a first subset of coil assemblies 231 including: a first coil assembly 232; and a second coil assembly 257 connected in series with the first coil assembly 232 and arranged 180 degrees opposite the first coil assembly 232. Additionally, the set of coil assemblies 231 can include a second subset of coil assemblies 231 including: a third coil assembly 258 angularly offset from the first coil assembly 232; and a fourth coil assembly 259 arranged 180 degrees opposite the third coil assembly 258 and connected in series with the third coil assembly 258. In this example, the controller 290 can then sequentially drive current to the first subset of coil assemblies 231 and the second subset of coil assemblies 231 to sequentially generate magnetic fields about the rotor 210 that couple the set of magnetic elements 212 in the rotor 210 to enable rotation of the rotor 210.

Additionally, the set of coil assemblies 231 can also include a third subset of coil assemblies 231 arranged in a similar configuration as described above to form the three-phase configuration for the set of coil assemblies 231 of the stator 230.

Therefore, the system 200 can: sequentially generate opposing magnetic fields at the set of coil assemblies 231 directed to each surface of the rotor 210, in order to sequentially induce magnetic flux coupling to the rotor 210 within the set of coil assemblies 231, and thereby continuously urge the rotor 210 poles of the rotor 210 to align with the stator poles of the stator 230 to rotate the rotor 210 within the set of coil assemblies 231.

2.5.6 Coil Arrangement: 120 Degrees

Figure 23:
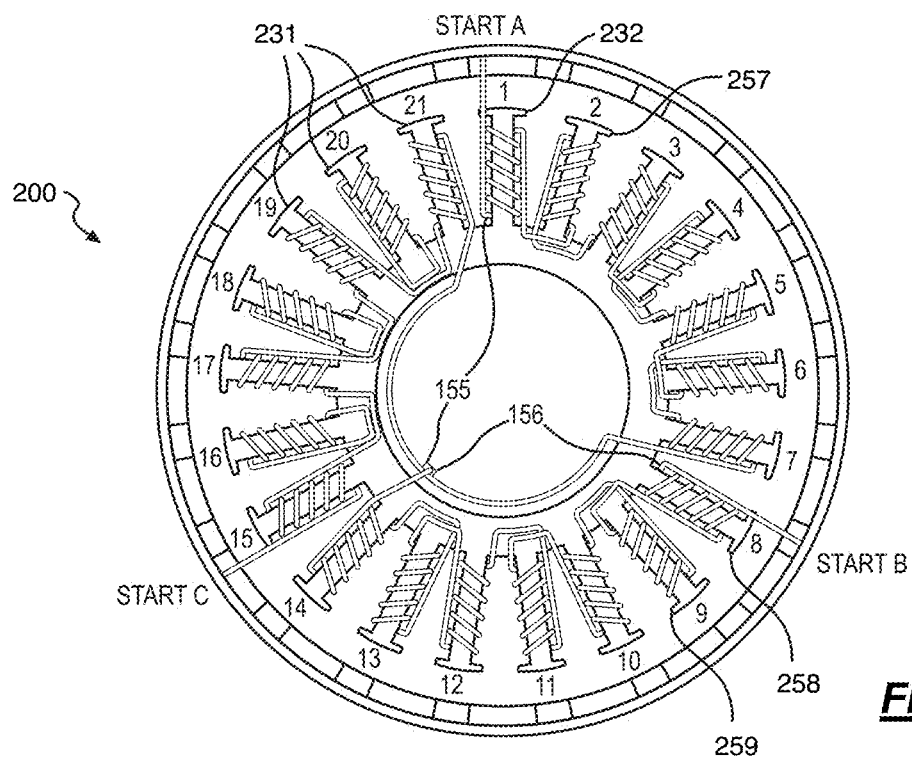
FIG. 23 is a schematic representation of the second system.
Figure 24:
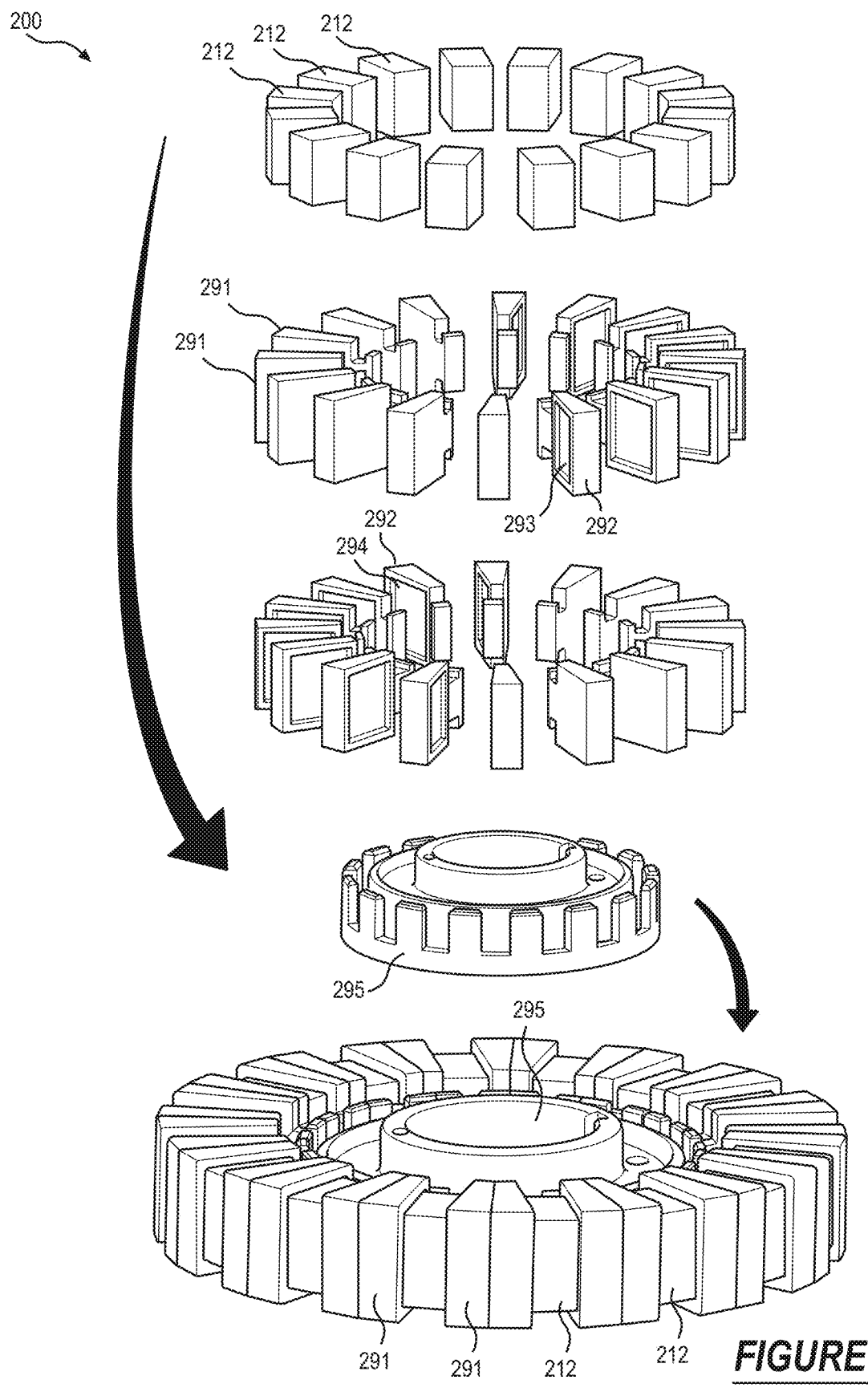
FIG. 24 is a schematic representation of the second system.
Figure 25:
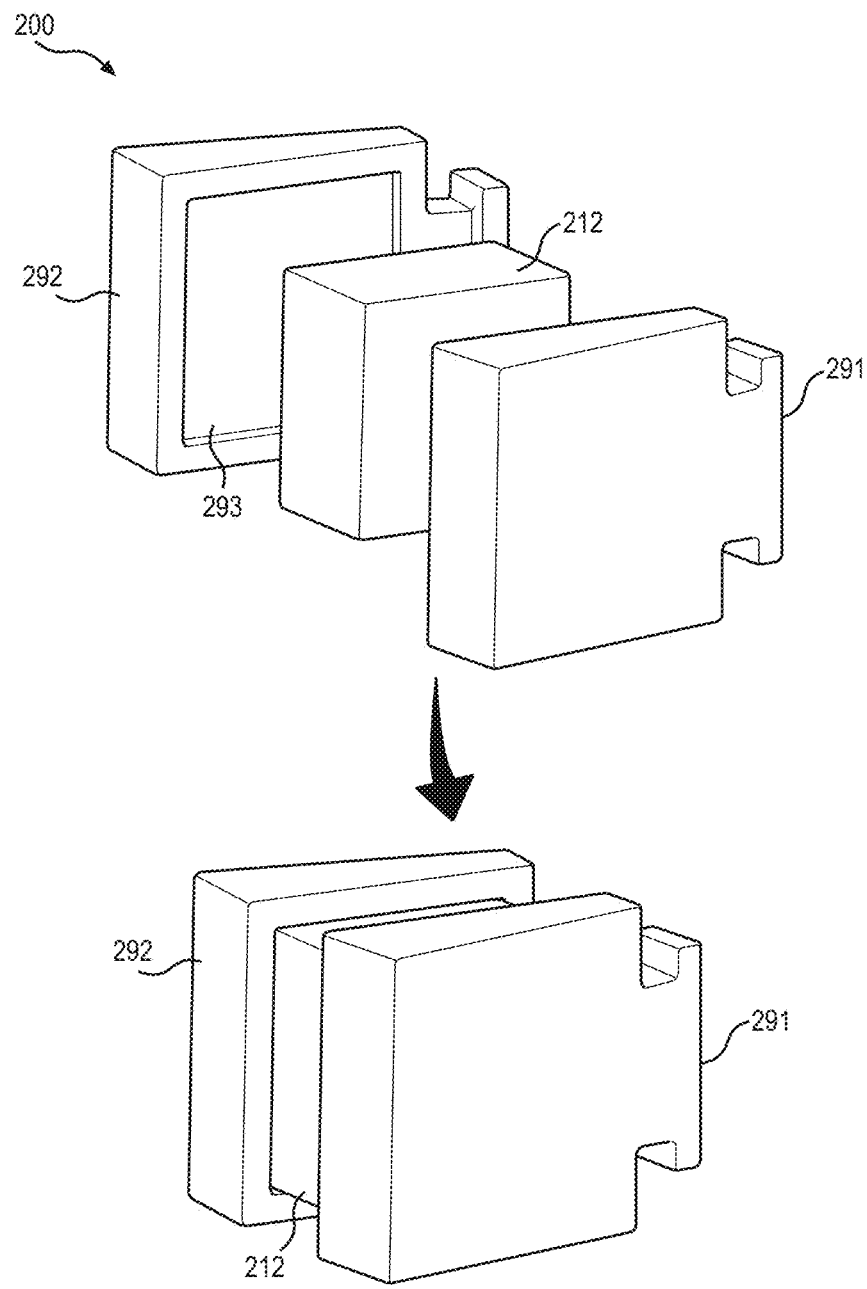
FIG. 25 is a schematic representation of the second system.
Figure 26:
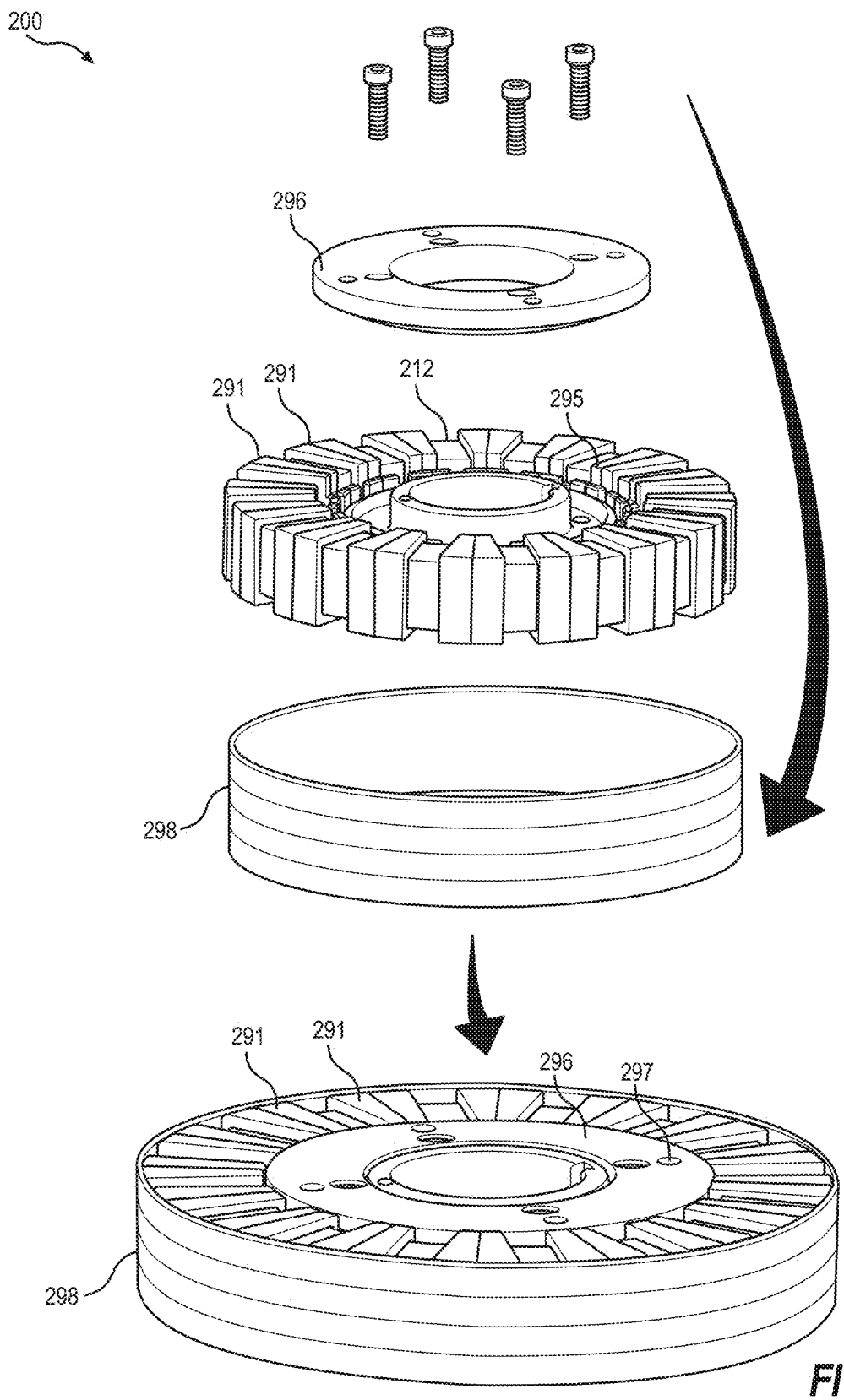
FIG. 26 is a schematic representation of the second system.

In one implementation observed in FIG. 23, the subsets of coil assemblies can include coil assemblies connected in series to each other and arranged at 120-degree offsets about the rotor 210. As a result, the controller 290 can then be configured to sequentially drive current to these subsets of coil assemblies in order to sequentially generate the magnetic fields directed to the surfaces of the rotor 210.

For example, the set of coil assemblies 231 can include a first subset of coil assemblies 231 including: a first coil assembly 232; and a second coil assembly 257 connected in series with the first coil assembly 232 and arranged adjacent the first coil assembly 232. Additionally, the set of coil assemblies 231 includes a second subset of coil assemblies 231 including: a third coil assembly 258 angularly offset 120 degrees from the first coil assembly 232; and a fourth coil assembly 259 connected in series with the third coil assembly 258 and arranged adjacent the third hook assembly. In this example, the controller 290 can then be configured to sequentially drive current to the first subset of coil assemblies 231 and the second subset of coil assemblies 231 to sequentially generate magnetic fields about the rotor 210 that couple the set of magnetic elements 212 and enable rotation of the rotor 210 within the set of coil assemblies 231.

Additionally, the set of coil assemblies 231 can also include a third subset of coil assemblies 231 arranged in a similar configuration as described above to form the three-phase configuration for the stator 230.

Therefore, the system 200 can: sequentially generate magnetic fields at offsets of 120-degrees directed to each surface of the rotor 210, in order to sequentially induce magnetic flux coupling to the rotor 210 within the set of coil assemblies 231, and thereby continuously urge the rotor poles of the rotor 210 to align with the stator poles of the stator 230 to rotate the rotor 210 within the set of coil assemblies 231.

2.5.7 Coil Leads

In one implementation, the first set of leads 255 of the outer hook element 233 is connected in series with a second set of leads 256 for the inner hook element 243. For example, the first set of leads 255 can include a start lead and a first connecting lead. Additionally, the second set of leads 256 can include a second connecting lead and an end lead. In this example, the first connecting lead and the second connecting lead can be connected in series, thereby connecting the outer hook element 233 and the inner hook element 243 in series. Therefore, the set of coil assemblies 231 includes a start lead and an end lead; and the controller 290 can drive a current signal through the start lead to generate magnetic fields at the outer hook element 233 and the inner hook element 243.

In this example, a three-phase configuration including a first subset of coil assemblies 231, a second subset of coil assemblies 231, and a third subset of coil assemblies 231 will result in a set of 3 start leads and 3 end leads for a total of 6 leads.

In another implementation, the first set of leads 255 of the outer hook element 233 is connected parallel with the second set of leads 256 of the inner hook element 243. For example, the first set of leads 255 can include a first start lead and a first end lead each connected to the controller 290. Additionally, the second set of leads 256 can include a second start lead and a second end lead, each connected to the controller 290. Therefore, the controller 290 can: drive a first current signal of a first amplitude through the first set of leads 255 to generate a first magnetic field of a first strength at the outer hook element 233; and drive a second current signal of a second amplitude, greater than the first amplitude, through the second set of leads 256 to generate a second magnetic field of a second strength at the inner hook element 243; and thereby direct magnetic fields of varying field strength across all surfaces of the rotor 210.

In the aforementioned example, a three-phase configuration including a first subset of coil assemblies 231, a second subset of coil assemblies 231, and a third subset of coil assemblies 231 will result in a set of 6 start leads and 6 end leads for a total of 12 leads In this implementation, the set of leads can be grouped together and connected to a terminal casing, which can be located externally from the rotor 210 and stator 230. The leads in the terminal casing can then be configured into a particular three-phase configuration (e.g., delta connection, wye connection) for the subsets of coil assemblies. Therefore, the system 200 can group all connections for the stator 230 to a particular location and thereby mitigate exposure to elements (e.g., water) and conditions (e.g., high-temperatures), which can compromise operation of the system 200.

2.6 Housing

In one implementation, the system 200 includes a housing 272 defining a cavity locating the rotor 210 and the stator 230 within the cavity of the housing 272. In this implementation the housing 272 supports the set of ferrous elements 281 of the stator 230 on all sides (i.e., axial sides and radial sides) in order to secure the rotor 210 within the set of coil assemblies 231 and mitigate radial imbalances resulting from offset magnetic flux linkage induced from the inner radial stator poles and the outer radial stator poles.

For example, the housing 272 can include: a base 273 defining an inner circumference and an outer circumference; an inner radial wall 275 arranged about the inner circumference of the base 273; an outer radial wall 274 arranged about the outer circumference of the base 273; and a cover 276 arranged over the inner radial wall 275 and the outer radial wall 274 opposite the base 273 and defining the cavity within the housing 272. Therefore, in this example, the housing 272 can define a toroidal cylinder with the cavity configured to locate the rotor 210 and stator 230 within the housing 272.

Furthermore, in this example, to maintain the set of coil assemblies 231 in engagement with the rotor 210, the stator 230 within the cavity of the housing 272 can locate: the first ferrous element 282 in abutting engagement with the cover 276 of the housing 272; the second ferrous element 284 in abutting engagement with the base 273 of the housing 272; the third ferrous element 286 in abutting engagement with the outer radial wall 274 of the housing 272; and the fourth ferrous element 288 in abutting engagement with the inner radial wall 275 of the housing 272.

Therefore, the housing 272: rigidly locates the stator 230 and the coil within the cavity of the housing 272; and can eliminate the need for a yoke mounted to the rotor 210 in order to support the rotor 210 within the housing 272. Furthermore, the housing 272 can stabilize the offset imbalanced radial forces of the rotor 210, resulting from the set of inner radial stator poles 289 and outer radial stator poles, by rigidly supporting the stator 230 between the inner radial wall 275 and outer radial wall 274 of the housing 272.

Additionally, the system 200 can include an external cooling system (e.g., air cooling, liquid cooling) configured to apply coolant to outer surfaces of the housing 272 and thereby reduce the internal temperature of the housing 272 due to convection between the housing 272 and the internally located rotor 210 and stator 230.

In one implementation, the inner radial gap of the housing 272 defines a radial gap in alignment with the radial gap formed by the set of coil assemblies 231 mounted about the stator 230. In this implementation, the disc 261 can extend through the radial gap of the housing 272 and the radial gap of the set of coil assemblies 231 in order to rigidly couple the inner radial surface 216 of the rotor 210.

In one implementation, the set of leads for the set of coil assemblies 231 can be grouped together and connected to an internal terminal casing located within the cavity of the housing 272 or connected to an external terminal casing mounted to an outer surface of the housing 272.

2.7 Controller

In one implementation, the system 200 includes the controller 290 configured to drive current (e.g., AC current, DC current) through the set of coil assemblies 231 to generate a magnetic field at the set of stator poles coupling the magnetic elements within the body 215 of the rotor 210, thereby rotating the rotor 210 within the set of coil assemblies 231.

In one example, the controller 290 can be configured to switch polarity of current supplied to the set of coil assemblies 231 in order to enable rotation of the rotor 210. Furthermore, the controller 290 can be configured to modulate frequency and amplitude of the current supplied to the set of coil assemblies 231, thereby modifying speed and direction of rotation for the shaft 260 coupled to the rotor 210 in order to satisfy a particular mode of operation (e.g., pump motor operation, vehicle motor operation) for the electric motor.

2.8 Example: Submerged Pump Motor

In one implementation, the system 200 is configured to function as a submerged pump motor, such as a 4500-rpm pump motor operating at 25 kilowatts, for municipal applications. In this implementation, the housing 272 is submerged in water and, therefore, the rotor 210 and stator 230 within the cavity of the housing 272 must be sealed within the housing 272 to prevent water from interacting with the set of stator coils resulting in failure of operation for the motor. The cavity of the housing 272 can then be filed with a lubricating fluid (e.g., silicon oil) configured to fill the cavity within the housing 272 and envelop the rotor 210 and stator 230 within the housing 272.

In one example, the housing 272 includes: a base 273; an outer radial wall 274 extending from the base 273; and a cover 276 arranged over the base 273 and coupled to the outer radial wall 274 extending from the base 273 to define a cavity configured to locate the rotor 210 and the stator 230 within the housing 272. Additionally, the housing 272 can include: a first inner radial wall extending from the base 273; and a second inner radial wall extending from the cover 276 to define a radial gap in alignment with the radial gap formed by the set of coil assemblies 231 exposing a portion of the inner radial surface 216 of the rotor 210.

In this example, the disc 261, rigidly coupled to the inner radial surface 216 of the rotor 210 and supporting the shaft 260, is positioned within the radial gap of the housing 272 and the radial gap formed by the set of coil assemblies 231. As a result, the radial gap along the inner radial wall 275 of the housing 272 can allow for water to enter the cavity of the housing 272 and, thereby, short stator 230 within the housing 272. To prevent water from entering through this radial gap, the system 200 can include: a first bearing 277 arranged about the first inner radial wall of the housing 272 and coupled to a first face of the disc 261; and a second bearing 278 arranged about the second inner radial wall of the housing 272 and coupled to a second face of the disc 261 opposite the first face.

Therefore, the bearings coupled to the housing 272 enable the disc 261 to rotate freely about the inner radial of the housing 272 while sealing the radial gap of the housing 272, thereby preventing liquids and debris from entering the cavity of the housing 272 and interacting with the stator 230 within the housing 272.

Furthermore, the fluid (e.g., silicon oil) is disposed within the housing 272 and configured to fill the cavity locating the rotor 210 and the stator 230 within the housing 272. Therefore, in the event of the water entering the cavity of the housing 272, the density of the fluid within the cavity will prevent water from interacting with the stator 230 located within the housing 272.

2.9 Variation: Tubular Shaft

In one variation, as observed in FIGS. 20 and 21, the system 200 includes a tubular shaft 262 rigidly mounted to the first axial face 218 of the rotor 210. In this implementation, the outer hook element 233 of each coil assembly couples the inner hook element 243 of each coil assembly to define a radial gap exposing a portion of the first axial face 218 of the rotor 210. The tubular shaft 262 can then be positioned within this radial gap and defines: a shaft 260 diameter greater than an inner diameter of the rotor 210 and less than an outer diameter of the rotor 210; and a first end rigidly coupled to the first axial face 218 of the rotor 210. The tubular shaft 262, rigidly coupled to the rotor 210, rotates about the motor axis in response to coupling of the magnetic elements of the rotor 210 with the magnetic field generated by the set of coil assemblies 231.

2.9.1 Coil Assembly: Tubular Shaft

In one implementation of this variation of the system 200, each coil assembly in the set of coil assemblies 231 includes: an outer hook element 233 including a first set of leads 255 and an inner hook element 243 including a second set of leads 256. The inner hook element 243 is arranged normal to the outer hook portion to define a throat locating the rotor 210 within the set of coil assembly. In this variation, the outer hook element 233 and the inner hook element 243 extend across each surface of the rotor 210 to generate a toroidal magnetic field in order to induce: a balanced magnetic flux linkage across the inner radial surface 216 and outer radial surface 217 of the rotor 210; and an imbalanced magnetic flux linkage across opposing axial faces of the rotor 210.

For example, the outer hook element 233 for the coil assembly includes a first outer hook branch 234 and a second outer hook branch 237. The first outer hook branch 234 defines: a first outer coil segment 235 extending partially across the first axial face 218 of the rotor 210; and a second outer coil segment 236 normal to the first outer coil segment 235 and extending across the outer radial surface 217 of the rotor 210. The second outer hook branch 237 is congruent (i.e., same shape and size) to the first outer hook branch 234 and defines: a third outer coil segment 238 parallel to the first outer coil segment 235 and partially extending across the first axial face 218 of the rotor 210; and a fourth outer coil segment 239. The fourth outer coil segment 239: is normal to the third outer coil segment 238; is parallel to the second outer coil segment 236; and extends across the outer radial surface 217 of the rotor 210. The outer hook element 233 further includes: a first neutral coil segment 251 connecting the first outer coil segment 235 and the third outer coil segment 238; and a second neutral coil segment 252 connecting the second outer coil segment 236 and the fourth outer coil segment 239 to define a first L-shaped structure.

In this foregoing example, the inner hook element 243 for the coil assembly includes a first inner hook branch 244 and a second inner hook branch 247. The first inner hook branch 244 defines: a first inner coil segment 245 extending across the inner radial face of the rotor 210; and a second inner coil segment 246. The second inner coil segment 246: is normal to the first inner coil segment 245; and extends across the second axial face 219 of the rotor 210. The second inner hook branch 247 is congruent (i.e., same shape and size) to the first inner hook branch 244 and defines: a third inner coil segment 248 parallel to the first inner coil segment 245 and extending across the inner radial face of the rotor 210; and a fourth inner coil segment 249. The fourth inner coil segment 249: is normal to the third inner coil segment 248; is parallel to the second inner coil segment 246; and extends across the second axial face 219 of the rotor 210. The inner hook element 243 further includes a third neutral coil segment 253 connecting the first inner coil segment 245 and third inner coil segment 248; and a fourth neutral coil segment 254 connecting the second inner coil segment 246 and the fourth inner coil segment 249 to define a second L-shaped structure arranged normal to the first L-shaped structure to define the throat locating the rotor 210 within the coil assembly.

Therefore, the system 200 can: locate the rotor 210 within the set of coil assemblies 231; drive current through the continuous loop of the coil assembly to generate a toroidal magnetic field in order to induce a balanced magnetic flux linkage on the inner radial surface 216 and outer radial surface 217 of the rotor 210; and, thereby, enable rotation of the rotor 210 within the set of coil assemblies 231.

2.9.2 Stator Poles: Tubular Shaft

In one implementation, as described above, the system 200 includes a stator 230 including a set of ferrous elements 281: each arranged radially and axially about the set of coil assemblies 231; supporting the set of coil assemblies 231 to maintain the hook formation and locate the rotor 210 within the set of coil assemblies 231; and defining sets of stator poles generating magnetic fields directed to each surface of the rotor 210, thereby inducing a magnetic flux linkage across surfaces of the rotor 210 in order to rotate the rotor 210 within the set of coil assemblies 231. In this variation of the system 200, the ferrous elements arranged about an outer radial and inner radial of the set of coil assemblies 231 define a similar height, such that balanced radial forces are applied to the rotor 210. Furthermore, the ferrous elements arranged about the top axial side and bottom axial side of the set of coil assemblies 231 each define a particular thickness, such that imbalanced axial forces are applied to the rotor 210.

For example, the set of ferrous elements 281 can include a first ferrous element 282: coupled to axial coil segments of the outer hook element 233, for each coil assembly in the set of coil assemblies 231; defining a first set of axial stator poles of a first thickness configured to mate intermediate the axial coil segments, of the outer hook element 233, for each coil assembly in the set of coil assemblies 231; and configured to generate magnetic fields at each stator 230 pole, in the first set of axial stator poles, directed to the first axial face 218 of the rotor 210.

Additionally, the set of ferrous elements 281 can include a second ferrous element 284: coupled to axial coil segments of the inner hook element 243, for each coil assembly in the set of coil assemblies 231, opposite the axial coil segments of the outer hook element 233; and defining a second set of axial stator poles of a second thickness greater than the first thickness of the first set of axial stator poles. The second set of axial stator poles: are arranged in alignment with the first set of axial stator poles; and configured to mate intermediate the axial coil segments of the inner hook element 243, for each coil assembly, in the set of coil assemblies 231. In this example, the second set of axial stator poles are configured to generate magnetic fields at each stator 230 pole, in the second set of axial stator poles, directed to the second axial face 219 of the rotor 210, and, thereby, induces an imbalanced magnetic flux linkage across axial faces of the rotor 210.

In the foregoing example, the set of ferrous elements 281 can include a third ferrous element 286: coupled to outer radial coil segments of the outer hook element 233, for each coil assembly in the set of coil assemblies 231; defining a set of outer radial stator poles 287 configured to mate intermediate the outer radial coil segments of the outer hook element 233, for each coil assembly, in the set of coil assemblies 231; and configured to generate magnetic fields at each stator 230 pole, in the set of outer radial stator poles 287, directed to the outer radial surface 217 of the rotor 210.

Furthermore, the set of ferrous elements 281 can include a fourth ferrous element 288: coupled to inner radial segments of the inner hook element 243, for each coil assembly in the set of coil assemblies 231, opposite the outer radial segments of the outer hook element 233; and defining a set of inner radial stator poles 289. The set of inner radial stator poles 289: are arranged in alignment with the set of outer radial stator poles 287; and configured to mate intermediate the inner coil segments of the inner hook element 243 for each coil assembly, in the set of coil assemblies 231. In this example, the set of inner radial stator poles 289 are configured to generate magnetic fields at each stator 230 pole, in the set of inner radial stator poles 289, directed to the inner radial surface 216 of the rotor 210, and thereby induces a balanced magnetic flux linkage across radial surfaces of the rotor 210.

Therefore, in this variation of the system 200, the ferrous elements can: support the set of coil assemblies 231 to maintain engagement with the rotor 210, thereby eliminating the need for a yoke to support the rotor 210; generate magnetic fields directed to each surface of the rotor 210 to increase speed and torque output by the shaft 260; and induce balanced radial forces across each radial face of the rotor 210, thereby stabilizing the rotor 210 in the radial direction when rotating within the set of coil assemblies 231.

2.9.3 Housing: Tubular Shaft

In one implementation, the system 200 can include a housing 272: locating the tubular structure on a top axial face of the housing 272; and configured to stabilize imbalanced axial forces of the rotor 210 resulting in vertical propagation of the rotor 210 within the cavity of the housing 272.

In one example, the housing 272 can include: a base 273 defining an inner circumference and an outer circumference; an inner radial wall 275 arranged about the inner circumference of the base 273; an outer radial wall 274 arranged about the outer circumference of the base 273; and a cover 276 arranged over the inner radial wall 275 and the outer radial wall 274 opposite the base 273 and defining a cavity within the housing 272 and a radial gap cooperating with a radius of the tubular structure.

In this example, the stator 230 is located within the housing 272 and locates: the first ferrous element 282 in abutting engagement with the cover 276 of the housing 272; the second ferrous element 284 in abutting engagement with the base 273 of the housing 272; the third ferrous element 286 in abutting engagement with the outer radial wall 274 of the housing 272; and the fourth ferrous element 288 in abutting engagement with the inner radial wall 275 of the housing 272.

As described above, the varying thickness of the first ferrous element 282 and the second ferrous element 284 results in offset axial forces acting upon the rotor 210 within the set of coil assemblies 231, causing the rotor 210 and stator 230 to propagate vertically within the housing 272. Therefore, the tubular structure can extend through the radial gap and couple to the cover 276 via a thrust bearing 279 configured to stabilize vertical propagation of the rotor 210 resulting from imbalanced axial forces.

The first systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
 a segmented rotor assembly comprising a set of pole pieces arranged radially about a motor axis:
  each pole piece in the set of pole pieces defining:
   a rim extending about a periphery of the pole piece;
   a first recess arranged on a first side of the pole piece; and
   a second recess arranged on a second side, opposite the first side, of the pole piece; and
  each pair of adjacent pole pieces, in the segmented rotor assembly, defining a pair of linearly-offset and angularly-offset rims that cooperate to define a tapered annular interstice in a radial array of tapered annular interstices;
 a set of magnetic elements, each magnetic element in the set of magnetic elements nested within a tapered annular interstice in the radial array of tapered annular interstices; and
 a stator:
  encompassing the segmented rotor assembly; and
  comprising a set of windings configured to inductively couple to the set of magnetic elements to rotate the segmented rotor assembly about the motor axis.

2. The system of claim 1, wherein each magnetic element in the set of magnetic elements is nested within a tapered annular interstice, in the radial array of tapered annular interstices, to define a splayed H-bridge structure in a radial array of splayed H-bridge structures.

3. The system of claim 1, wherein each pair of adjacent pole pieces in the segmented rotor assembly:
 comprises:
  a first pole piece defining:
   a first rim extending about a periphery of the first pole piece; and
   a first tapered recess arranged on a first side of the first pole piece; and
  a second pole piece defining:
   a second rim extending about a periphery of the second pole piece; and
   a second tapered recess arranged on a second side of the second pole piece, the second side facing the first side of the first pole piece; and
 is configured to receive a rectilinear magnetic element, in the set of magnetic elements, nested between the first tapered recess and the second tapered recess to:
  locate the second rim linearly-offset and angularly-offset from the first rim; and
  define a first tapered annular interstice in the radial array of tapered annular interstices.

4. The system of claim 1, wherein each pair of adjacent pole pieces in the segmented rotor assembly:
 comprises:
  a first pole piece defining:
   a first rim extending about a periphery of the first pole piece; and
   a first rectilinear recess arranged on a first side of the first pole piece; and
  a second pole piece defining:
   second rim extending about a periphery of the second pole piece; and
   a second rectilinear recess arranged on a second side of the second pole piece, the second side facing the first side of the first pole piece; and
 is configured to receive a tapered magnetic element, in the set of magnetic elements, nested between the first rectilinear recess and the second rectilinear recess to:
  locate the second rim linearly-offset and angularly-offset from the first rim; and
  define a first tapered annular interstice in the radial array of tapered annular interstices.

5. The system of claim 1:
 wherein each pole piece in the set of pole pieces further defines a retention feature arranged on the rim extending about the periphery of the pole piece;
 wherein each pair of adjacent pole pieces, in the segmented rotor assembly, defines a pair of linearly-offset and angularly-offset retention features that cooperate to define a slot in a radial array of slots; and
 further comprising a first axial retention ring:
  arranged coaxial with the motor axis;
  facing a first axial side of the segmented rotor assembly; and
  defining a set of tabs:
   radially offset about a periphery of the inner retention ring; and
   each tab in the set of tabs configured to receive a slot in the radial array of slots to:
    mate retention features of the set of pole pieces to the first axial retention ring; and
    retain the set of pole pieces radially about the motor axis.

6. The system of claim 5:
 wherein the first axial retention ring further defines a bore coaxial with the motor axis; and
 further comprising a shaft:
  extending through the bore of the first axial retention ring; and
  configured to rotate about the motor axis during magnetic coupling between the set of magnetic elements and the set of windings.

7. The system of claim 5:
 wherein each pair of adjacent pole pieces, in the segmented rotor assembly, defines a pair of linearly-offset and angularly-offset retention features that cooperate to define a radial channel about the motor axis; and
 further comprising a second axial retention ring:
  arranged coaxial with the motor axis;
  facing a second axial side, opposite the first axial side, of the segmented rotor assembly;

comprising a radial tongue configured to mate with the radial channel to mate with retention features of the set of pole pieces to the second axial retention ring; and cooperating with the first axial retention ring to retain the set of pole pieces radially about the motor axis.

8. The system of claim 7:

wherein the first axial retention ring cooperates with the second axial retention ring to form a cavity within an inner radial of the segmented rotor assembly that contains the retention features of the set of pole pieces; and further comprising a potting material encapsulated within the cavity and configured to:

rigidly couple the first axial retention ring and the second axial retention ring to the set of pole pieces; and retain the set of pole pieces radially about the motor axis.

9. The system of claim 1, further comprising a filament:

wound about an outer radial side of the segmented rotor assembly to evenly compress the set of pole pieces about the motor axis; and extending across a height of the segmented rotor assembly; and comprising a coating configured to electrically insulate the set of magnetic elements from the set of windings during rotation of the segmented rotor assembly about the stator.

10. The system of claim 1, wherein each pair of windings in the set of windings comprises:

a first winding extending across a first axial side and an outer radial side of the segmented rotor assembly; and a second winding:

extending across the second axial side, opposite the first axial side, of the segmented rotor assembly;

arranged orthogonal to the third coil winding; and coupling the first winding to form a C-shaped winding structure enveloping the body.

11. The system of claim 1, wherein each pair of windings in the set of windings comprises:

a first winding extending across a first axial side and an outer radial side of the segmented rotor assembly to form a first L-shaped structure; and a second winding:

extending across a second axial side, opposite the first axial side, of the segmented rotor assembly;

extending across an inner radial side of the segmented rotor assembly; and arranged orthogonal the third coil winding to form a second L-shaped structure that cooperates with the first L-shaped structure to envelop the segmented rotor assembly.

* * * * *